(12) United States Patent
Chai et al.

(10) Patent No.: US 10,691,913 B2
(45) Date of Patent: Jun. 23, 2020

(54) DISPLAY PANEL AND DISPLAY APPARATUS

(71) Applicant: Shanghai Tianma Micro-Electronics Co., Ltd., Shanghai (CN)

(72) Inventors: Huiping Chai, Shanghai (CN); Yang Zeng, Shanghai (CN); Kang Yang, Shanghai (CN); Hong Ding, Shanghai (CN); Lihua Wang, Shanghai (CN); Lingxiao Du, Shanghai (CN); Liang Xie, Shanghai (CN); Qing Zhang, Shanghai (CN)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 167 days.

(21) Appl. No.: 15/703,111

(22) Filed: Sep. 13, 2017

(65) Prior Publication Data

US 2018/0005006 A1 Jan. 4, 2018

(30) Foreign Application Priority Data

Jun. 27, 2017 (CN) .......................... 2017 1 0500423

(51) Int. Cl.
*G06K 9/00* (2006.01)
*G06K 9/20* (2006.01)
*G09G 3/3225* (2016.01)

(52) U.S. Cl.
CPC .......... *G06K 9/0004* (2013.01); *G06K 9/2027* (2013.01); *G06K 9/2036* (2013.01); *G09G 3/3225* (2013.01)

(58) Field of Classification Search
CPC ......... G09G 3/3225; G09G 2310/0262; G09G 2320/064; G09G 2354/00; G09G 3/3406;
(Continued)

(56) References Cited

U.S. PATENT DOCUMENTS

2003/0183019 A1 10/2003 Chae
2004/0252867 A1* 12/2004 Lan ...................... G06K 9/0004
382/124
(Continued)

FOREIGN PATENT DOCUMENTS

CN 104751155 A 7/2015
CN 106055162 A 10/2016
(Continued)

*Primary Examiner* — Mekonen T Bekele
*Assistant Examiner* — Michael J Vanchy, Jr.
(74) *Attorney, Agent, or Firm* — Anova Law Group PLLC

(57) ABSTRACT

A display panel and a display apparatus are provided. The display panel comprises an array substrate, a plurality of light emitting units disposed on the array substrate, each having a plurality of sub-light emitting units, and a plurality of fingerprint recognition units, configured to recognize fingerprints based on light reflected by a touch object to the fingerprint recognition units. Each fingerprint recognition unit is configured in coordination with at least one sub-light emitting unit. An orthogonal projection of each fingerprint recognition unit on the array substrate and an orthogonal projection of a corresponding sub-light emitting structure on the array substrate overlap with each other.

20 Claims, 46 Drawing Sheets

(58) Field of Classification Search
CPC ......... H01L 2251/5338; H01L 27/3234; H01L 27/3244; H01L 51/0097; H01L 27/3211; H01L 27/323; G06K 9/0004; G06K 9/00912

See application file for complete search history.

(56) References Cited

U.S. PATENT DOCUMENTS

| | | | |
|---|---|---|---|
| 2006/0011913 A1 | 1/2006 | Yamazaki | |
| 2008/0242959 A1* | 10/2008 | Xu | A61B 5/145 600/323 |
| 2014/0217384 A1 | 8/2014 | Nakamura et al. | |
| 2015/0165479 A1* | 6/2015 | Lasiter | B06B 1/0666 310/322 |
| 2017/0315293 A1* | 11/2017 | Bang | G02B 6/102 |

FOREIGN PATENT DOCUMENTS

| | | | | |
|---|---|---|---|---|
| CN | 106056099 A | | 10/2016 | |
| CN | 106295611 A | | 1/2017 | |
| CN | 106355160 A | * | 1/2017 | ....... G02F 1/133605 |
| CN | 106355160 A | | 1/2017 | |

\* cited by examiner

DISPLAY PANEL AND DISPLAY APPARATUS

CROSS-REFERENCES TO RELATED APPLICATIONS

This application claims the priority of Chinese Patent Application No. CN201710500423.3, filed on Jun. 27, 2017, the entire contents of which are incorporated herein by reference.

FIELD OF THE DISCLOSURE

The present disclosure generally relates to the display technology and, more particularly, relates to a display panel and a display apparatus.

BACKGROUND

Fingerprints, as a form of human biometrics, inherently identify a person. As the technology advances, the market is full of display apparatus with fingerprint recognition function, such as smart phone, tablet computer, and smart wearable device, etc. When a user operates a display apparatus with a fingerprint recognition function, the user only needs to use fingers to touch the display apparatus to authenticate the identity. Thus, the identity authentication process is simplified.

The existing display panels with the fingerprint recognition function all include a plurality of light emitting units and a plurality of fingerprint recognition units. The fingerprint recognition unit may recognize fingerprints based on the reflected light where the light emitted from the light emitting unit is reflected by a touch object or a finger. When the dislocation or deviation occurs between the boundary of each light emitting unit and the boundary of the corresponding fingerprint recognition unit, i.e., the boundary of each light emitting unit and the boundary of the corresponding fingerprint recognition unit misalign, the Moiré pattern is likely to occur, and the precision of the fingerprint recognition by the display panel is substantially affected.

The disclosed display substrate and display panel are directed to solve one or more problems set forth above and other problems.

BRIEF SUMMARY OF THE DISCLOSURE

One aspect of the present disclosure provides a display panel, comprising an array substrate, a plurality of light emitting units disposed on the array substrate, each having a plurality of sub-light emitting units, and a plurality of fingerprint recognition units, configured to recognize fingerprints based on light reflected by a touch object to the fingerprint recognition units. Each fingerprint recognition unit is configured in coordination with at least one sub-light emitting unit. An orthogonal projection of each fingerprint recognition unit on the array substrate and an orthogonal projection of a corresponding sub-light emitting structure on the array substrate overlap with each other.

Another aspect of the present disclosure provides a display apparatus, comprising a disclosed display panel.

Another aspect of the present disclosure provides a fingerprint recognition method for a display panel having an array substrate; a plurality of light emitting units disposed on the array substrate, each having a plurality of sub-light emitting units; and a plurality of fingerprint recognition units, configured to recognize fingerprints based on light reflected by a touch object to the fingerprint recognition units, wherein each fingerprint recognition unit is configured in coordination with at least one sub-light emitting unit; and an orthogonal projection of each fingerprint recognition unit on the array substrate and an orthogonal projection of a corresponding sub-light emitting structure on the array substrate overlap with each other, the method, the method comprising: in a fingerprint recognition phase, controlling organic light emitting structures to emit light in a shifting mode according to a first light emitting dot array, and recognizing a fingerprint by a fingerprint recognition array based on light reflected by a touch object on a light emitting side of a glass cover to the fingerprint recognition array.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

FIG. 1b illustrates a cross-sectional view along the QQ' direction in FIG. 1a;

FIG. 3b illustrates a cross-sectional view along the RR' direction in FIG. 3a;

FIG. 7b illustrates a cross-sectional view along the LL' direction in FIG. 7a;

FIG. 8b illustrates a cross-sectional view along the MM' direction in FIG. 8a;

FIG. 8d illustrates a schematic view of a geometric relationship of an expansion distance of an exemplary angle limiting film in FIG. 8a;

FIG. 9b illustrates a cross-sectional view along the NN' direction in FIG. 9a;

FIG. 10c illustrates a schematic view of a geometric relationship of the expansion distance of the angle limiting film in FIG. 10a;

FIG. 11b illustrates a cross-sectional view along the PP' direction in FIG. 11a;

FIG. 12b illustrates a cross-sectional view along the EE' direction in FIG. 12a;

FIG. 19b illustrates a cross-sectional view along the FF' direction in FIG. 19a;

FIG. 20b illustrates an enlarged view of S1 area in FIG. 20a;

FIG. 20c illustrates a cross-sectional view along the GG' direction in FIG. 20a;

FIG. 20e illustrates another enlarged view of S1 area in FIG. 20a;

FIG. 31b illustrates a partial top-down view of the display panel in FIG. 31a;

FIG. 31d illustrates a detailed schematic view of the display panel in FIG. 31a;

DETAILED DESCRIPTION

Figure 1A:
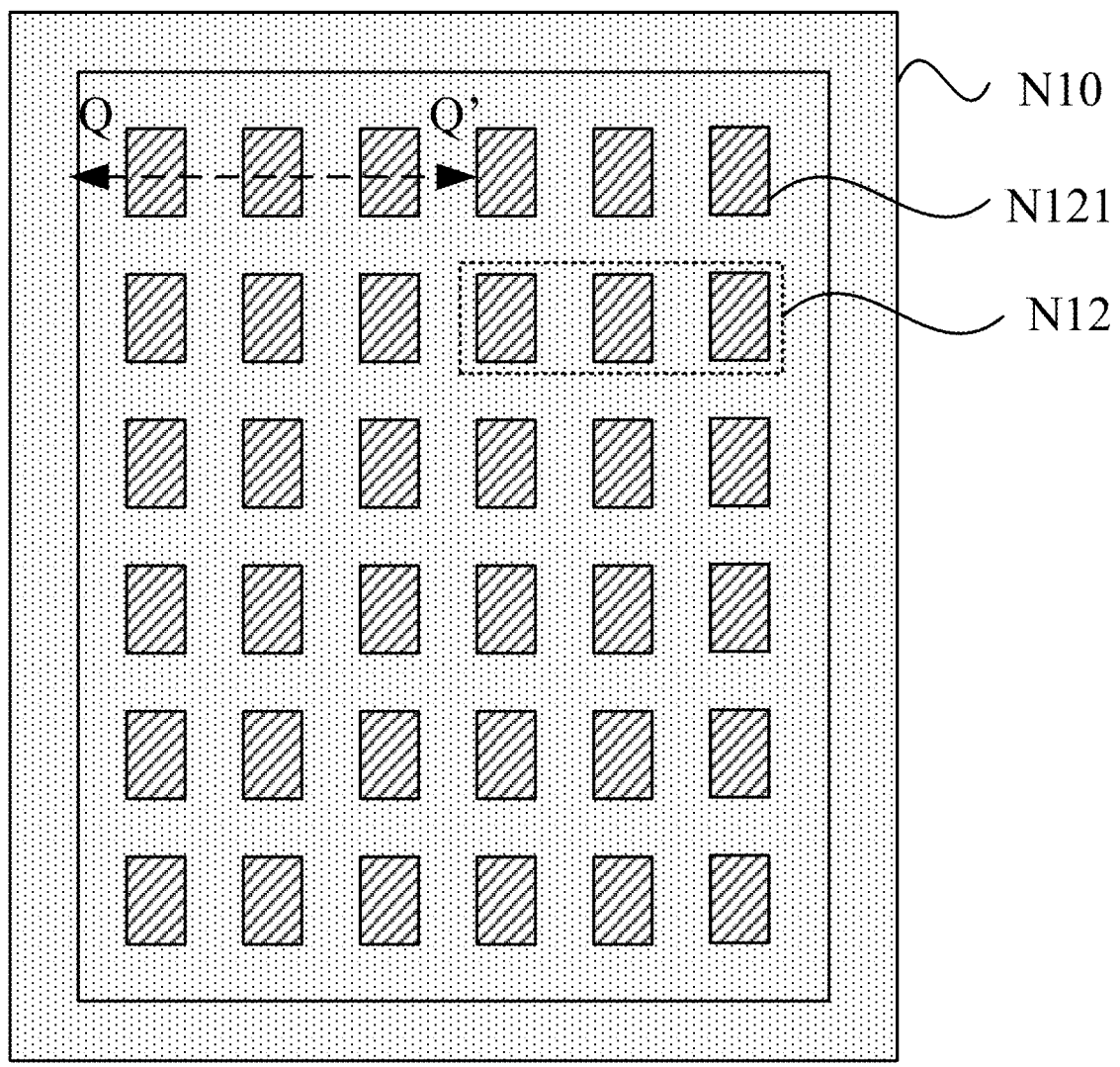
FIG. 1a illustrates a top-down view of an exemplary display panel according to the disclosed embodiments.

Reference will now be made in detail to exemplary embodiments of the disclosure, which are illustrated in the accompanying drawings. Wherever possible, the same reference numbers will be used throughout the drawings to refer to the same or like parts. It should be understood that the exemplary embodiments described herein are only intended to illustrate and explain the present invention and not to limit the present invention. In addition, it should also be noted that, for ease of description, only part, but not all, of the structures associated with the present invention are shown in the accompanying drawings. Other embodiments obtained by those skilled in the art without making creative work are within the scope of the present invention.

The present disclosure provides a display panel. The display panel may include an array substrate, a plurality of fingerprint recognition units, and a plurality of light emitting units disposed on the array substrate. Each light emitting unit may include a plurality of sub-light emitting units. The fingerprint recognition unit may be used to recognize fingerprints based on light that a touch object reflects to the fingerprint recognition unit. Each fingerprint recognition unit may be configured with at least one sub-light emitting unit. The fingerprint recognition unit and the corresponding sub-light emitting unit may have overlapped orthogonal projections on the array substrate.

Each person's skin ridges including fingerprint may be different in terms of pattern, dot, and bifurcation, and the uniqueness may remain unchanged through the person's life. Based on this fact, a person may be matched with his or her fingerprints by comparing his or her fingerprints with pre-stored fingerprint data and authenticating his or her real identity. This technology is called fingerprint recognition. Benefited from the electronic integrated circuit manufacturing technology and rapid and reliable algorithm researches, one of the fingerprint recognition technologies, optical fingerprint recognition technology, has entered in our daily life. The optical fingerprint recognition technology may be the most researched, most widely used, and most mature technology in biometric recognition.

The optical fingerprint recognition technology may operate as follows. The light source embedded in the display panel may illuminate a touch object (e.g., a finger). The finger may reflect the light. The reflected light (i.e., fingerprint signal light) may be transmitted to a fingerprint recognition unit. The fingerprint recognition unit may receive the optical signal that irradiates on the fingerprint recognition unit. Due to the specific pattern of the fingerprint, different positions of the finger may reflect the light with different intensity. In the end, each fingerprint recognition unit may receive different optical signal. Thus, the true identity of the user may be determined.

The existing display apparatus with fingerprint recognition function may include a plurality of light emitting units and a plurality of fingerprint recognition units. The fingerprint recognition units may recognize fingerprints based on the reflected light that is formed when the light emitted from the light source is reflected by the touch object. Each light emitting unit may have a boundary that does not coincide with a boundary of a corresponding fingerprint recognition unit. That is, along a direction that is perpendicular to a plane where the display panel is located, the boundary of the light emitting unit does not align with the boundary of the corresponding fingerprint recognition unit.

When regularly arranged detail patterns (for example, braided lines or closely parallel lines) exist in the two layers, the patterns in the two layers may superimpose with each other, and water wave like stripes may appear in the positions where the patterns overlap. This is called Moiré pattern. In the existing technology, because the light emitting unit and the corresponding fingerprint recognition unit misalign with each other, Moiré pattern may appear in the finally formed fingerprint recognition image. In extreme cases, no useful information for fingerprint recognition may be extracted from the finally formed fingerprint recognition image. Thus, the precision of fingerprint recognition in the display panel may be substantially affected.

In the present disclosure, each fingerprint recognition unit may be configured with at least one sub-light emitting unit, and the fingerprint recognition unit may have an orthogonal projection on the array substrate coinciding with an orthogonal projection of the corresponding sub-light emitting unit on the array substrate. That is, each fingerprint recognition unit and the corresponding sub-light emitting unit have a same shape and a same size, and the boundary of each fingerprint recognition unit completely aligns with the boundary of the corresponding sub-light emitting unit in the direction perpendicular to the plane where the array substrate is located. Thus, Moiré pattern caused by the misalignment between the fingerprint recognition unit and the corresponding sub-light emitting unit may be effectively avoided, and the precision of the fingerprint recognition in the display panel may be improved.

The above described the ideas of the present disclosure. The technical solutions of the present disclosure will now be described in detail, with the accompanying drawings. In accordance with embodiments of the present disclosure, other embodiments obtained by those of ordinary skill in the art without departing from the creative work are within the scope of the present invention.

Figure 1B:
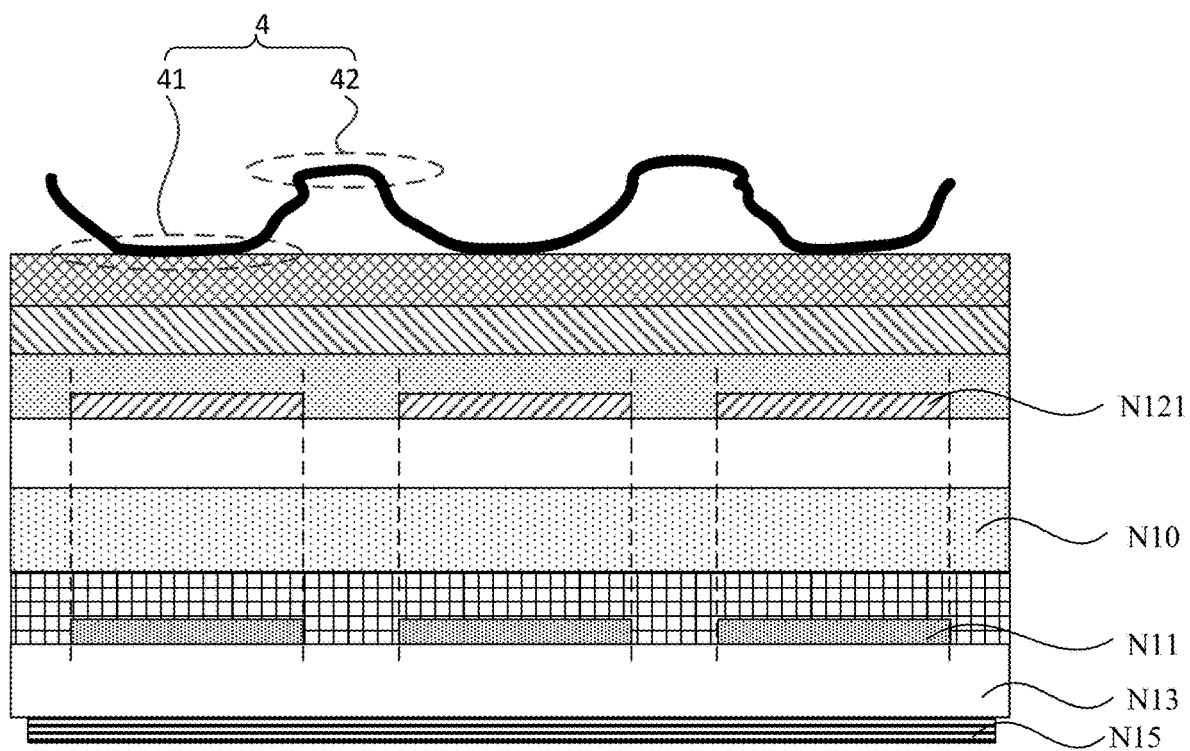
Figure 1C:
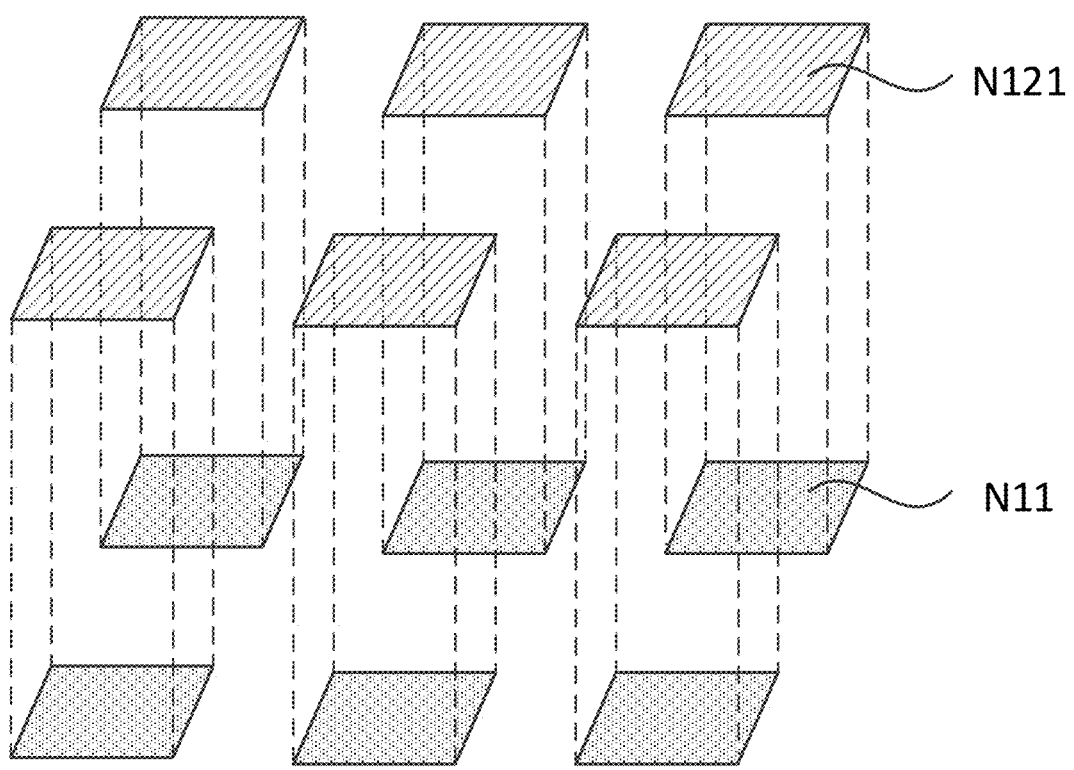
FIG. 1c illustrates a three dimensional view of a structural relationship between an exemplary fingerprint recognition unit and an exemplary sub-light emitting unit according to the disclosed embodiments.

FIG. 1a illustrates a top-down view of an exemplary display panel according to the present disclosure. FIG. 1b illustrates a cross-sectional view along the QQ' direction in FIG. 1a. FIG. 1c illustrates a three dimensional view of a structural relationship between an exemplary fingerprint recognition unit and an exemplary sub-light emitting unit according to the present disclosure.

Referring to FIG. 1a, FIG. 1b, and FIG. 1c, the display panel may include an array substrate N10, a plurality of fingerprint recognition units N11, and a plurality of light emitting units N12 disposed on the array substrate N10. Each light emitting unit N12 may include a plurality of sub-light emitting units N121. For illustrative purposes, each light emitting unit N12 may includes three sub-light emitting units N121, as shown in FIG. 1a. The fingerprint recognition unit N11 may be used to recognize fingerprints based on the light reflected by a touch object 4 to the fingerprint recognition unit N11. Each fingerprint recognition unit N11 may be configured with at least one corresponding sub-light emitting unit N121. For illustrative purposes, each fingerprint recognition unit N11 may be configured with one corresponding sub-light emitting unit N121, as shown in FIG. 1b and FIG. 1c. The orthogonal projection of the fingerprint recognition unit N11 on the array substrate N10 may overlap with the orthogonal projection of the sub-light emitting unit N121 on the array substrate N10.

Specifically, as shown in FIG. 1b and FIG. 1c, the orthogonal projection of the fingerprint recognition unit N11 on the array substrate N10 may overlap with the orthogonal projection of the sub-light emitting unit N121 on the array substrate N10. That is, the fingerprint recognition unit N11 and the corresponding sub-light emitting unit N121 have a same shape and a same size, and the boundary of the fingerprint recognition unit N11 completely aligns with the boundary of the corresponding sub-light emitting unit N121 in the direction perpendicular to the plane where the array substrate N10 is located. Thus, Moiré pattern caused by the misalignment between the fingerprint recognition unit and the corresponding sub-light emitting unit may be effectively avoided, and the precision of the fingerprint recognition in the display panel may be improved.

Figure 2:
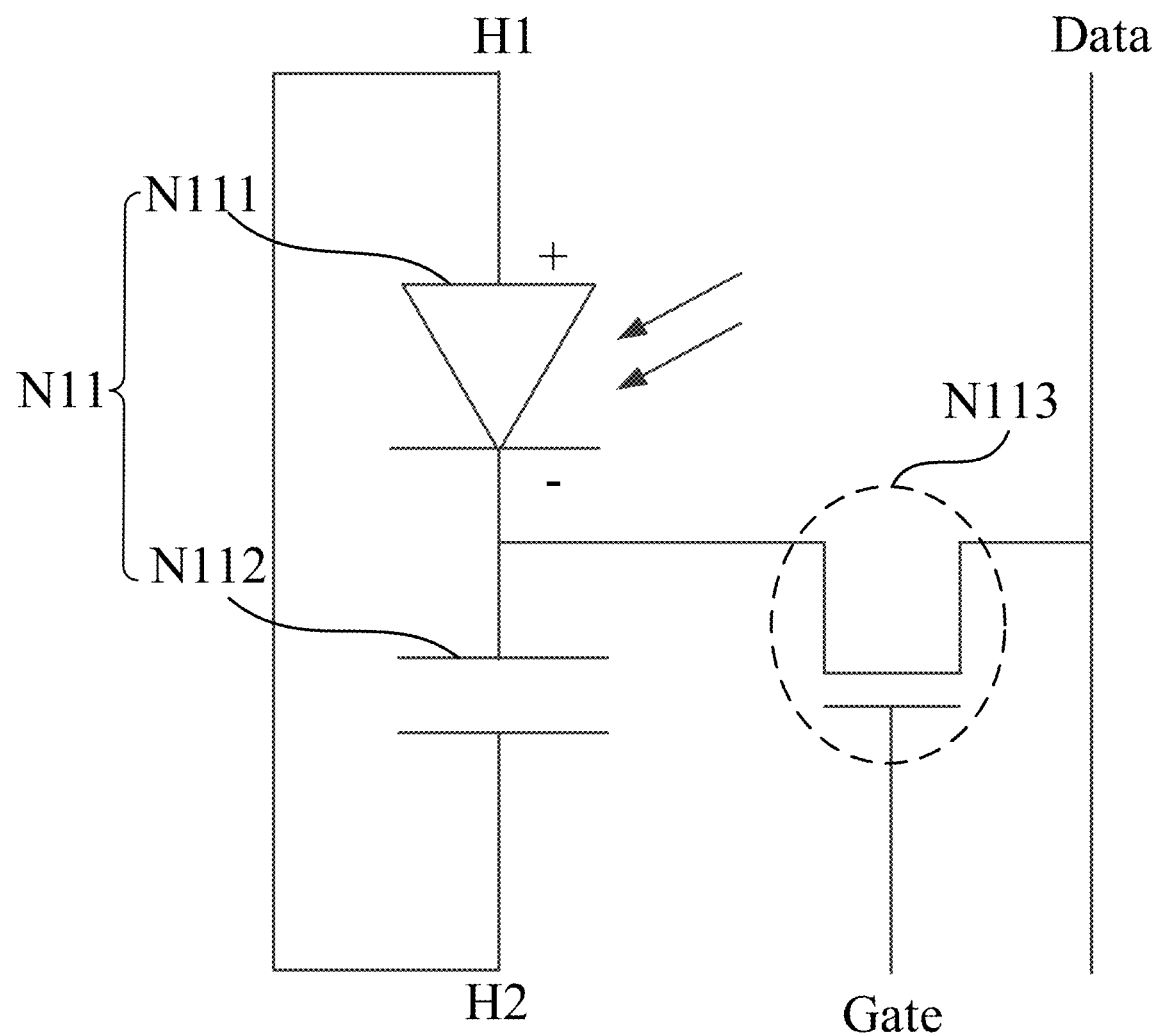
FIG. 2 illustrates a circuit diagram of an exemplary fingerprint recognition unit according to the disclosed embodiments.

FIG. 2 illustrates a circuit diagram of an exemplary fingerprint recognition unit according to the present disclosure. The operation principle of the fingerprint recognition unit N11 is described in the following with reference to FIG. 1b and FIG. 2.

The fingerprint recognition unit N11 may include a photo diode N111, a storage capacitor N112, and a thin-film-transistor N113. The photo diode N111 and the storage capacitor N112 may form a loop. A drain electrode of the thin-film-transistor N113 may be electrically connected to a negative electrode of the photo diode N111. A gate electrode may be electrically connected to a switching control line Gate. A source electrode may be electrically connected to a signal line Data. Generally, the photo diode N111 may include two metal electrodes, and a PIN junction between the two metal electrodes. The PIN junction may be photo sensitive, and may be unidirectionally conductive.

When no light is irradiated on the display panel, PIN junction may have a substantially small saturated reverse leakage current, i.e., a dark current. In this case, the photo diode N111 may be turned off. When light is irradiated on the display panel, the saturated reverse leakage current at the PIN junction may increase substantially to form a photo current. Because ridges 41 and valleys 42 of the touch object 4 (e.g., a finger) have different distances to the fingerprint recognition unit N11, the fingerprint recognition unit N11 may receive the reflected light formed in the ridges 41 and the reflected light formed in the valleys 42 with different intensities. Accordingly, the converted photo currents may be different. By converting the light reflected by the touch object 4 to the fingerprint recognition unit N11 into current signals, fingerprint recognition may be achieved.

Specifically, in the fingerprint recognition phase, a low voltage signal (e.g., a −5V constant voltage signal) may be applied to a node H1, and a high voltage signal (e.g., a 1.5V constant voltage signal) may be applied to a signal line Data. A complete fingerprint recognition phase may include a preparation phase, a fingerprint signal acquisition phase, and a fingerprint signal detection phase. In the preparation phase, a driver chip (not shown) that is electrically connected to the fingerprint recognition unit N11 may turn on a thin-film-transistor N113 through a switching control line Gate, and may charge a storage capacitor N112 until the storage capacitor N112 is completely charged.

In the fingerprint signal acquisition phase, the thin-film-transistor N113 may be turned off through the switching control line Gate. When a user presses the display panel, the light emitted from the light source may irradiate the finger of the user, and the light may be reflected by the surface of the finger to the fingerprint recognition unit N11. The photo diode N111 in the fingerprint recognition unit N11 may receive the reflected light to form the photo current. The photo current may flow from a node H2 to the node H1, and may change the voltage at the node H2.

In the fingerprint signal detection phase, the voltage change at the node H2 may be detected to determine the photo current, thus achieving the fingerprint recognition function of the display panel. For illustrative purposes, in the fingerprint signal detection phase, the thin-film-transistor N113 may be turned on through the switching control line Gate. The voltages at the two electrodes of the storage capacitor N122 may be different. The storage capacitor N112 may be in a charging state. The amount of charge added to the storage capacitor N112 may be detected to determine the photo current, thus achieving the fingerprint recognition function of the display panel.

Figure 3A:
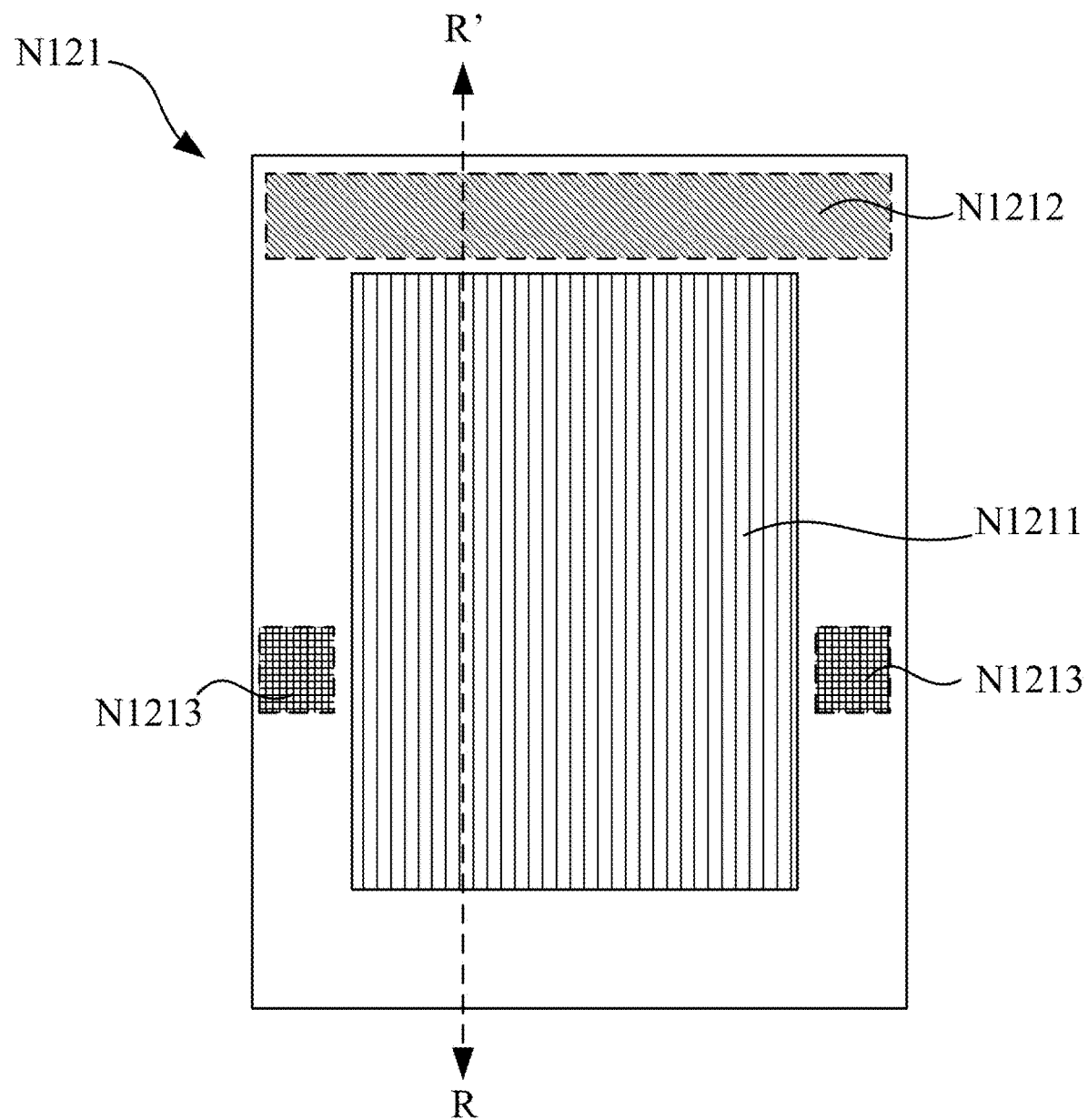
FIG. 3a illustrates a schematic view of an exemplary sub-light emitting unit according to the disclosed embodiments.
Figure 3B:
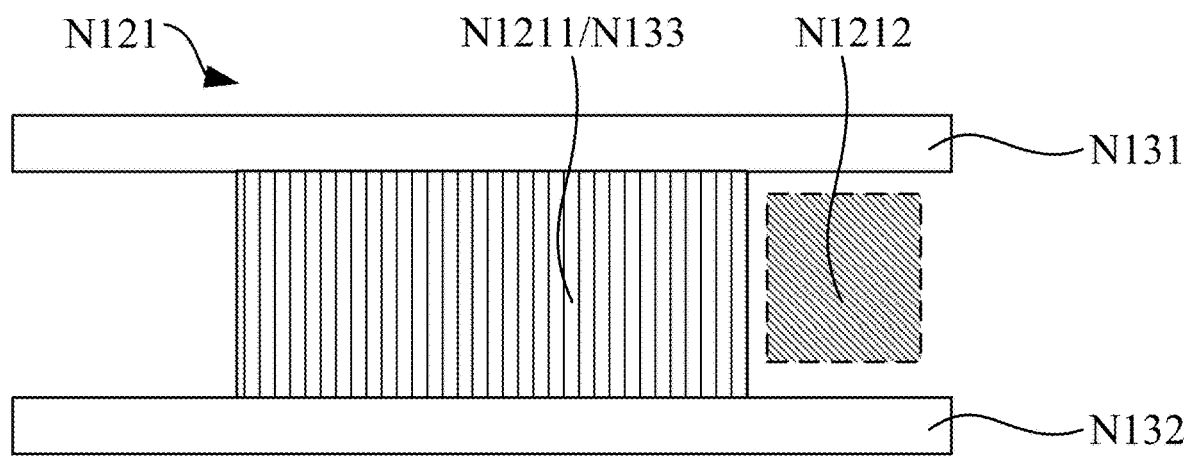

FIG. 3a illustrates a schematic view of an exemplary sub-light emitting unit according to the present disclosure. FIG. 3b illustrates a cross-sectional view along the RR' direction in FIG. 3a. Referring to FIG. 3a and FIG. 3b, each sub-light emitting unit N121 may also include an effective light emitting region N1211 and a first light transmittance region N1212. The first light transmittance region N1212 may be a light transmittance region that has the largest area in the sub-light emitting unit N121.

Each fingerprint recognition unit N11 may include a photo diode N111. The fingerprint recognition unit N11 may be used to recognize fingerprints based on the light reflected by the touch object to the photo diode N111. The photo diode N111 of each fingerprint recognition unit N11 may have the orthogonal projection on the array substrate N10 overlapping with the orthogonal projection of the first light transmittance region N1212 of the sub-light emitting unit N121 corresponding to the fingerprint recognition unit N11 on the array substrate N10.

Specifically, as shown in FIG. 3b, the sub-light emitting unit N121 may include an anode N131, a cathode N132, and a light emitting function layer N133 disposed between the anode N131 and the cathode N132. The sub-light emitting unit N121 may further include a hole transport layer, and an electron transport layer, etc. (not shown in FIG. 3b) disposed on both sides of the light emitting function layer N133. When a voltage is applied to the anode N131 and the cathode N132, the holes may be moved to the light emitting function layer N133 through the hole transport layer, and the electrons may be moved to the light emitting function layer N133 through the electron transport layer. The two carriers, the holes and the electrons, may be recombined in the light emitting function layer N133. The excitons in the light emitting function layer N133 may migrate from the excited state to the ground state. The area corresponding to the light emitting function layer N133 in the sub-light emitting unit N121 may be the effective light emitting region N1211.

In addition, the display panel may also include a plurality of thin-film-transistors. The non-transparent metal electrodes in the thin-film-transistors may affect the light transmittance of the sub-light emitting units N121. To maximize the light transmittance area in the sub-light emitting unit N121, in the fabrication process of the display panel, the metal electrodes of the thin-film-transistor, such as the gate electrode, the source electrode, and the drain electrode, etc. may be formed together. That is, the non-transparent metal electrodes may be concentrated in a certain area. Excluding the metal electrode concentrated area, the first light transmittance region N1212 may be a largest area in the sub-light emitting unit N121 for continuous light transmittance.

For illustrative purposes, as shown in FIG. 3a, the sub-light-emitting unit N121 may be in a rectangular shape. In addition to the effective light emitting region N1211, the rectangular sub-light emitting unit N121 may also include two long peripheral areas on the left side and the right side, and two short peripheral areas on the top side and the bottom side. When the non-transparent metal electrodes are grouped together and disposed in the two long peripheral areas on the left side and the right side, the first light transmittance region N1212 may be the largest continuous light transmittance area in the two short peripheral areas.

Figure 3C:
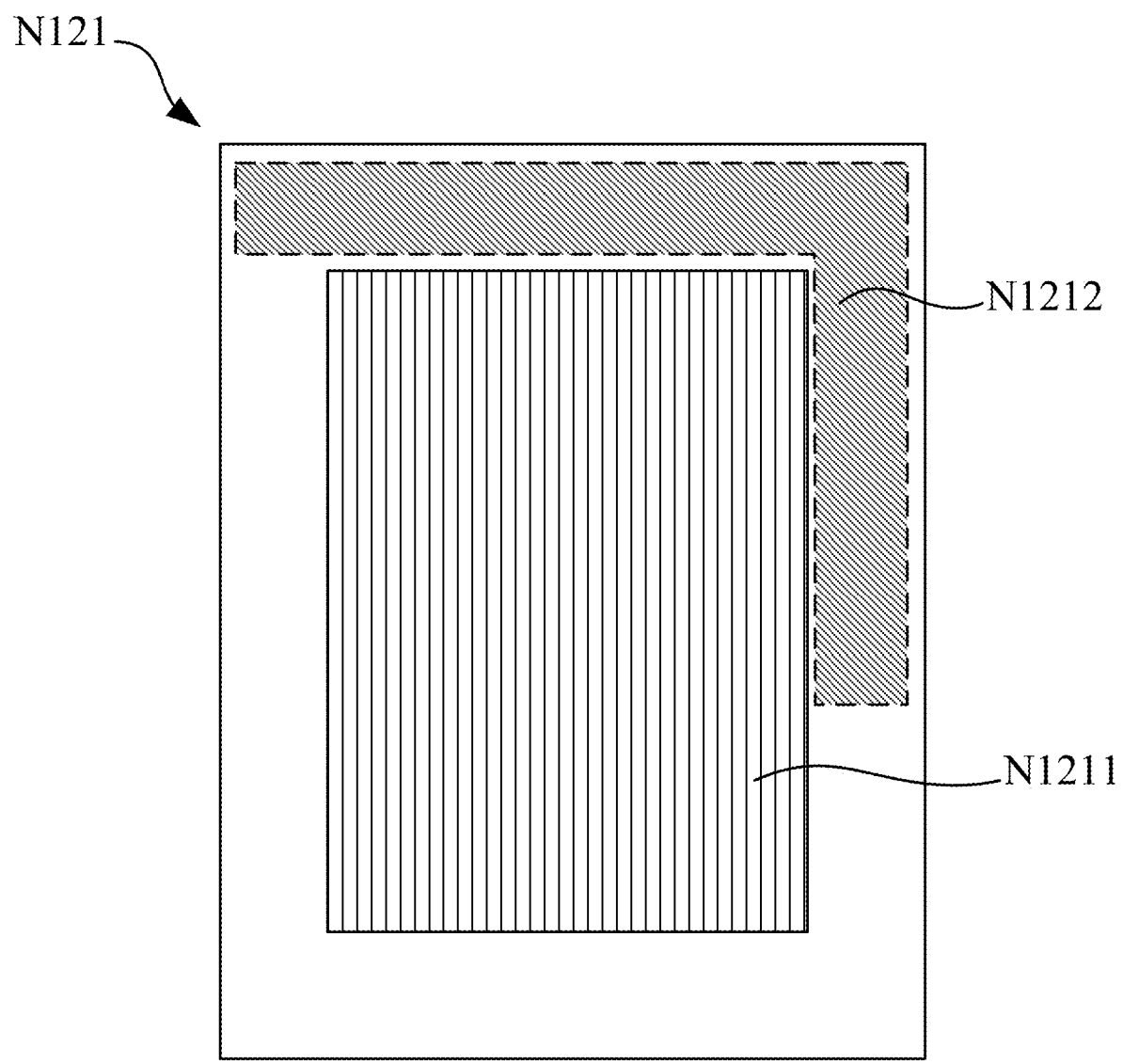
FIG. 3c illustrates a schematic view of another exemplary sub-light emitting unit according to the disclosed embodiments.
Figure 3D:
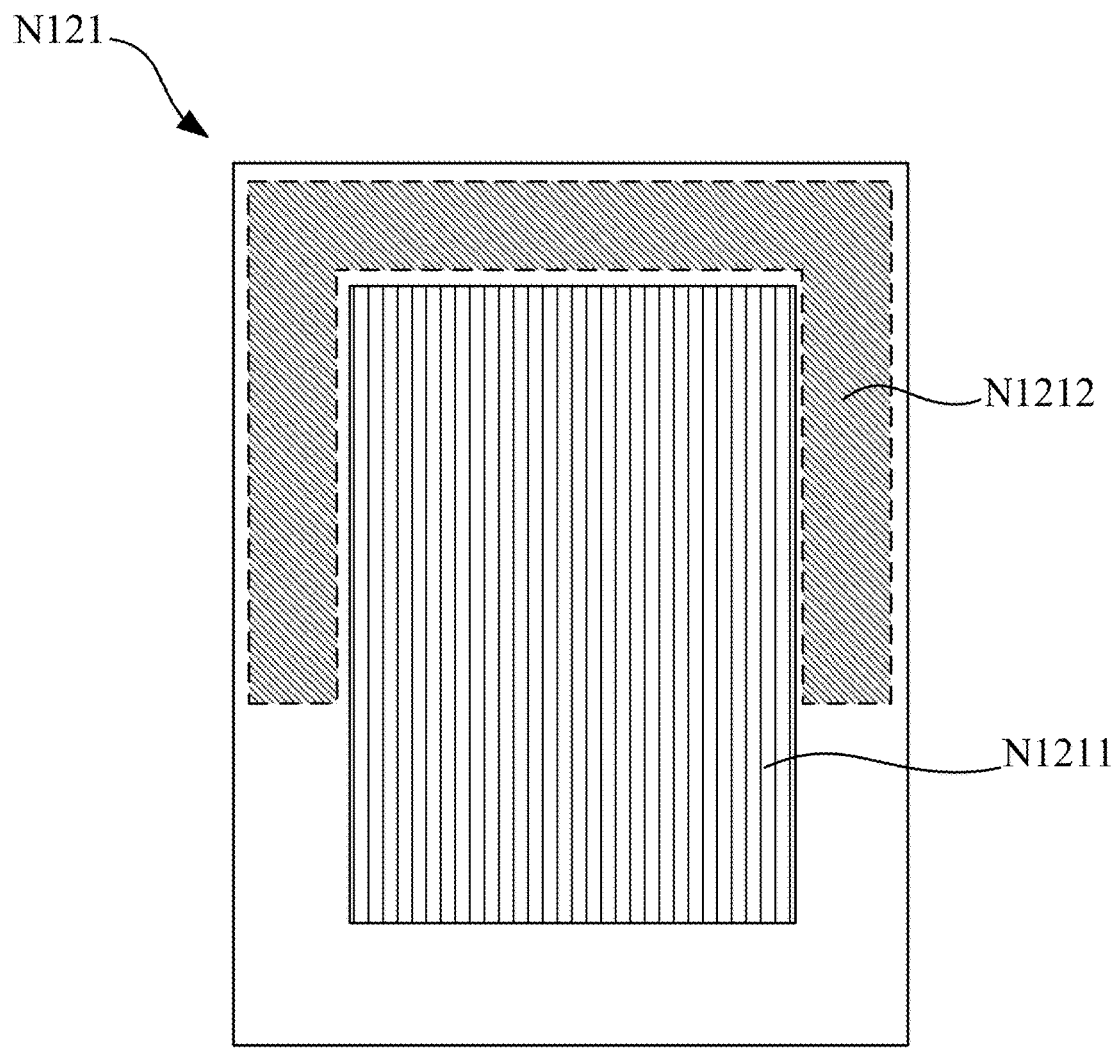
FIG. 3d illustrates a schematic view of another exemplary sub-light emitting unit according to the disclosed embodiments.

It should be noted that the first light transmittance region N1212 may be configured in the rectangular shape as shown in FIG. 3a for illustrative purposes. The first light transmittance region N1212 may be in an L shape, as shown in FIG. 3c. Alternatively, the first light transmittance region N1212 may be in a π shape, as shown in FIG. 3d. The first light transmittance region N1212 may be in other shapes, which are not limited by the present disclosure.

In one embodiment, the orthogonal projection of the photo diode N111 in each fingerprint recognition unit N11 on the array substrate N10 may overlap with the orthogonal projection of the first light transmittance region N1212 of the sub-light emitting unit N121 in the corresponding fingerprint recognition unit N11 on the array substrate N10. For illustrative purposes, the photo diode N111 may include a positive electrode, a negative electrode, and a PIN junction disposed between the positive electrode and the negative electrode. The PIN junction may be used to receive light irradiated on the photo diode N111, and may convert the received light into electrical signals, thus achieving the fingerprint recognition function.

The PIN junction of the photo diode N111 may be equivalent to the photo diode N111. That is, the orthogonal projection of the PIN junction of the photo diode N111 configured in each finger print recognition unit N11 on the array substrate N10 may overlap with the orthogonal projection of the first light transmittance region N1212 of the sub-light emitting unit N121 in the corresponding fingerprint recognition unit N11 on the array substrate N10.

Figure 4:
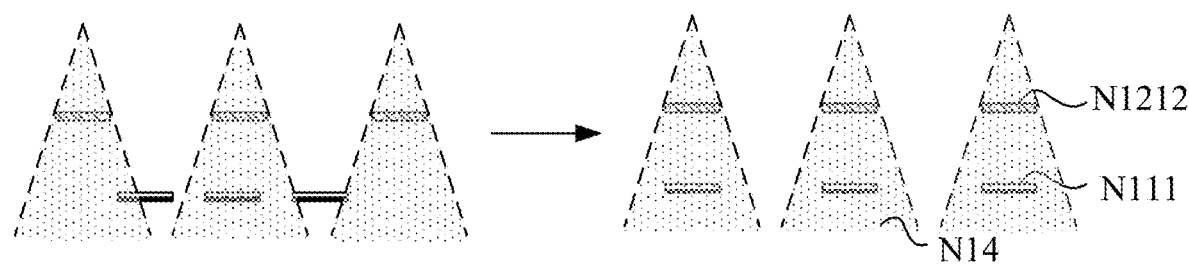
FIG. 4 illustrates a schematic view of a position relationship between an exemplary first light transmission region and an exemplary photo diode according to the disclosed embodiments.

Specifically, a lower portion of the sub-light emitting unit N121 in the fingerprint recognition unit N11 may be examined for illustrative purposes. FIG. 4 illustrates a schematic view of a position relationship between an exemplary first light transmission region and an exemplary photo diode according to the present disclosure. As shown in FIG. 4, only regions N14 in dashed line triangles may receive light. The existing technology (shown on the left in FIG. 4) does not provide any matching relationship between PIN junctions of the photo diodes N111 and first light transmittance regions N1212. Certain PIN junctions may receive more light while certain other PIN junctions may receive less or no light. The PIN junctions may not receive light uniformly. The inconsistent exposure to light by the PIN junctions may cause severe Moiré patterns in fingerprint images acquired by the display panel.

In the present disclosure (on the right in FIG. 4), the orthogonal projections of the PIN junctions of the photo diodes N111 configured in each fingerprint recognition unit N11 on the array substrate N10 may overlap with the orthogonal projections of the first light transmittance regions N1212 of the sub-light emitting unit N121 in the corresponding fingerprint recognition unit N11 on the array substrate N10. As such, the PIN junctions of the photo diodes N111 may receive equal amount of light. That is, the PNI junction may receive light uniformly. Thus, Moiré patterns may be effectively avoided, and the precision of the fingerprint recognition by the display panel may be improved.

In one embodiment, referring to FIG. 1a, FIG. 1b, and FIG. 4, the light emitting unit N12 may provide detection light. The fingerprint recognition unit N11 may recognize fingerprints based on the reflected light that is formed when the detection light emitted from the light emitting unit N12 is reflected by the touch object 4 to the fingerprint recognition unit N11. For illustrative purposes, the display panel may include a light emitting side and a non-light emitting side. The light emitting side may be a side of the light emitting unit N12 facing away from the array substrate N10. The non-light emitting side may be a side of the light emitting unit N12 adjacent to the array substrate N10. Light emitted from the light emitting unit N12 toward the non-light emitting side may cause crosstalk in the fingerprint recognition process.

Referring to the left side in FIG. 4, when the PIN junction of the photo diode N111 misalign with the first light transmittance region N1212 of the light emitting unit N121, the light emitted from the light emitting unit N12 toward both the light emitting side and the non-light emitting side may cause the Moiré patterns in the fingerprint recognition images. When light emitted from the light emitting unit N12 toward the light emitting side and the light emitted from the light emitting unit N12 are combined, more severe Moiré patterns may occur in the fingerprint recognition images.

On the other hand, referring to the right side in FIG. 4, the orthogonal projections of the PIN junctions of the photo diodes N111 configured in each fingerprint recognition unit N11 on the array substrate N10 may overlap with the orthogonal projections of the first light transmittance regions N1212 of the sub-light emitting unit N121 in the corresponding fingerprint recognition unit N11 on the array substrate N10. When the light emitting unit N12 provides the detection light for the fingerprint recognition unit N11, the light emitted from the light emitting unit N12 toward either the light emitting side or the non-light emitting side may not form any Moiré patterns in the fingerprint recognition images. Thus, the precision of the fingerprint recognition by the display panel may be substantially improved.

In addition, when the orthogonal projections of the PIN junctions of the photo diodes N111 configured in each fingerprint recognition unit N11 on the array substrate N10 overlap with the orthogonal projections of the first light transmittance regions N1212 of the sub-light emitting unit N121 in the corresponding fingerprint recognition unit N11 on the array substrate N10, the PIN junctions of the photo diodes may have the largest areas to receive the detection light that passes through the first light transmittance regions N1212 and irradiates on the fingerprint recognition unit N111. Thus, the precision of the fingerprint recognition by the display panel may be improved.

Referring to FIG. 4, for illustrative purposes, the orthogonal projections of the PIN junctions of the photo diodes N111 configured in each fingerprint recognition unit N11 on the array substrate N10 may overlap with the orthogonal projections of the first light transmittance regions N1212 of the sub-light emitting unit N121 in the corresponding fingerprint recognition unit N11 on the array substrate N10. In another embodiment, the orthogonal projection of the PIN junction of the photo diode N111 configured in each fingerprint recognition unit N11 on the array substrate N10 may have a larger area than and enclose the orthogonal projection of the first light transmittance region N1212 of the sub-light emitting unit N121 in the corresponding fingerprint recognition unit N11 on the array substrate N10. Similarly, while the Moiré patterns are eliminated, the area for the fingerprint recognition unit N11 to receive the detection light may be increased, and the precision of the fingerprint recognition by the display panel may be improved. In this case, the operation principle is similar to what is shown in FIG. 4, and is not repeated.

The shape of the first light transmittance regions as shown in FIG. 4 is for illustrative purposes. The first light transmittance regions N1212 may be in any other shapes, and may not be disposed in the positions as shown in FIG. 4. The area, shape, and location of the first light transmittance regions N1212 are not limited by the present disclosure.

In another embodiment, as shown in FIG. 3a, each sub-light emitting unit N121 may also include a plurality of second light transmittance regions N1213. The second light transmittance region N1213 may have a smaller area than the first light transmittance region N1212. The orthogonal projection of the photo diode N111 on the array substrate N10 may cover the orthogonal projection of the second light transmittance region N1213 of the sub-light emitting unit N121 in the corresponding fingerprint recognition unit N11 on the array substrate N10.

Specifically, referring to the description for the first light transmittance region N1212, the non-transparent metal electrodes may be grouped together and formed in a certain area in the fabrication process of the display panel. Excluding the area for the metal electrodes, the first light transmittance region N1212 may be the largest continuous area in the sub-light emitting unit N121. In addition to the first light transmittance region N1212, other light transmittance areas may exist in the sub-light emitting unit N121. Because the metal electrodes occupy a certain area, the other light transmittance areas may be separated by the metal electrodes and broken into smaller areas, i.e., the second light transmittance regions N1213. However, the detection light from the light source may still pass through the second light transmittance regions N1213, and may irradiate on the photo diode N111 in the fingerprint recognition unit N11.

Thus, when the orthogonal projection of the photo diode N111 on the array substrate N10 covers the orthogonal projection of the second light transmittance region N1213 of the sub-light emitting unit N121 in the corresponding fingerprint recognition unit N11 on the array substrate N10, the area for the fingerprint recognition unit N11 to receive the detection light may be increased while the Moiré patterns are eliminated, and the precision of the fingerprint recognition by the display panel may be improved. In this case, the operation principle is similar to what is shown in FIG. 4, and is not repeated. The area, shape, and location of the second light transmittance region N1213 are not limited by the present disclosure.

In another embodiment, referring to FIG. 1a and FIG. 1b, the display panel may also include a fingerprint recognition light source N15. The fingerprint recognition light source N15 may be disposed on a side of the arrays substrate N10 facing away from the light emitting unit N12. The fingerprint recognition unit N11 may recognize fingerprints based on the reflected light that is formed when the light emitted from the fingerprint recognition light source N15 is reflected by the touch object 4 to the fingerprint recognition unit N11. In this case, the operation principle of the fingerprint recognition may be similar to the case where the light emitting unit N12 is used as the light source, and is not repeated.

In another embodiment, the fingerprint recognition light source N15 may be a collimated light source or a surface light source. Compared with the use of the surface light source, the use of the collimated light source may reduce crosstalk caused by the light that is reflected by the finger of the user and is received by different fingerprint recognition units N11, and may improve the precision of the fingerprint recognition by the display panel. However, because the collimated light source is thicker than the surface light source, the use of the collimated light source may increase the thickness of the display panel.

Figure 5:
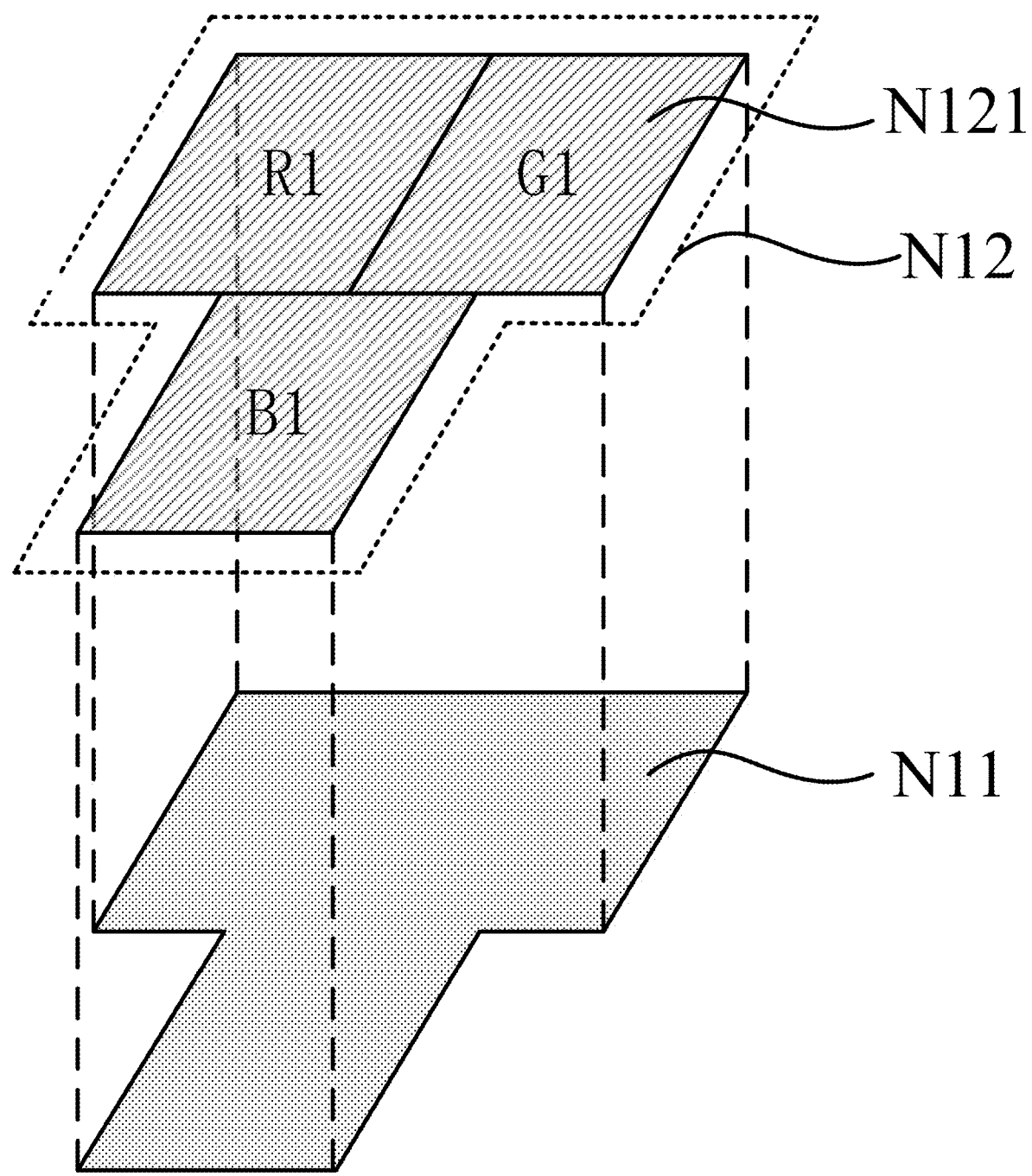
FIG. 5 illustrates a three dimensional view of another structural relationship between an exemplary fingerprint recognition unit and an exemplary sub-light emitting unit according to the disclosed embodiments.

FIG. 5 illustrates a three dimensional view of another structural relationship between an exemplary fingerprint recognition unit and an exemplary sub-light emitting unit according to the present disclosure. As shown in FIG. 5, each fingerprint recognition unit N11 may be configured with a corresponding light emitting unit N12. The fingerprint recognition unit N11 and the light emitting unit N12 may have orthogonal projections on the array substrate N10 overlapping with each other. Each light emitting unit N12 may include a plurality of sub-light emitting units N121. For illustrative purposes, the light emitting unit N12 may include three sub-light emitting units N121, as shown in FIG. 5. The three sub-light emitting units N121 in the light emitting unit N12 may be a red sub-light emitting unit R1, a green sub-light emitting unit G1, and a blue sub-light emitting unit B1.

Each fingerprint recognition unit N11 may be configured with a corresponding light emitting unit N12. The fingerprint recognition unit N11 and the light emitting unit N12 may have the orthogonal projections on the array substrate N10 coinciding with each other. Not only the Moiré patterns may be avoided, but also the number of fingerprint recognition units N11 in the display panel may be secured. That is, while the precision of the fingerprint recognition by the display panel is ensured, the number of light emitting units N12 or the number of sub-light emitting units N121 in the display panel may be increased, and the resolution of the display panel may be improved. For illustrative purposes, the sub-light emitting units N121 may be arranged in a T shape in the light emitting unit N12, as shown in FIG. 5. The sub-light emitting units N121 may be arranged in other shapes, which is not limited by the present disclosure.

In addition, the sub-light emitting unit N121, the fingerprint recognition unit N11, the first light transmittance region N1212, and the PIN junction of the photo diode N111, may not be limited to the shapes, sizes, and locations, as shown in the illustrative drawings. The actual requirement for the product manufacturing may determine that the sub-light emitting units N121, the fingerprint recognition unit N11, the first light transmittance region N1212, and the PIN junction of the photo diode have other shapes, sizes, and locations, which are not limited by the present disclosure.

In one embodiment, referring to FIG. 1a and FIG. 1b, the display panel may also include a first substrate N13. The first substrate N13 may be disposed on a side of the array substrate N10 facing way from the light emitting unit N12. The fingerprint recognition unit N11 may be configured between the array substrate N10 and the first substrate N13. In another embodiment, when the display panel includes a fingerprint recognition light source N15, and the fingerprint recognition unit N11 recognizes fingerprints based on the reflected light which is formed when the light emitted from the fingerprint recognition light source N15 is reflected by the touch object 4 to the fingerprint recognition unit N11, the fingerprint recognition light source N15 may be configured on a side of the first substrate N13 facing away from the fingerprint recognition unit N11. For illustrative purposes, the fingerprint recognition unit N11 may be bonded to the first substrate N13 by an optical glue. In another embodiment, the first substrate N13 may be a glass substrate or a flexible substrate. That is, the first substrate N13 may be a rigid substrate or a flexible substrate to make the display panel a flexible display.

Figure 6A:
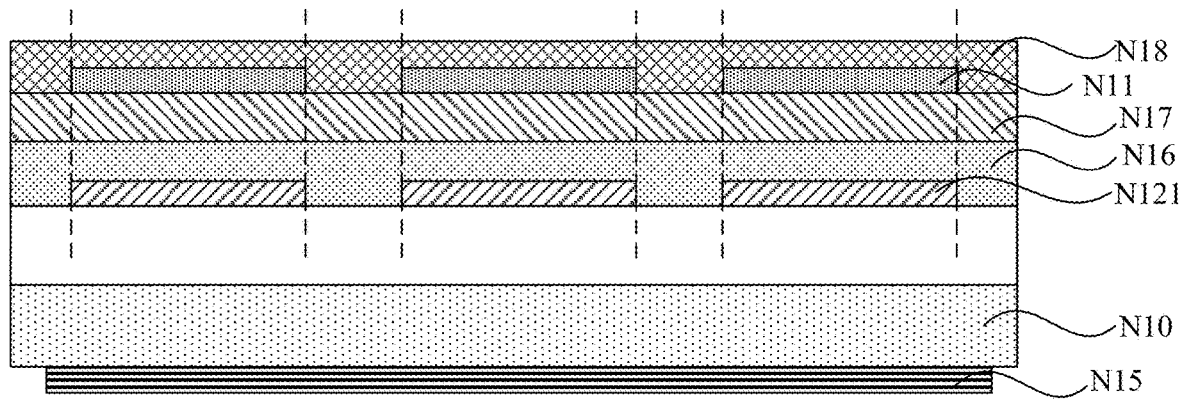
FIG. 6a illustrates a cross-sectional view of another exemplary display panel according to the disclosed embodiments.

FIG. 6a illustrates a cross-sectional view of another exemplary display panel according to the present disclosure. Referring to FIG. 1a and FIG. 6a, the fingerprint recognition unit N11 may be configured on a side of the light emitting unit N12 facing away from the array substrate N10. The fingerprint recognition unit N11 may recognize fingerprints based on the reflected light that is formed when the light emitted from the light emitting unit N12 or the independently configured fingerprint recognition light source N13 is reflected. Similarly, each fingerprint recognition unit N11 may be configured with at least one corresponding sub-light emitting unit N121. The fingerprint recognition unit N11 and the corresponding sub-light emitting unit N121 may have the orthogonal projections coinciding with each other to eliminate the Moiré patterns and to improve the precision of the fingerprint recognition by the display panel.

As shown in FIG. 6a, along a direction away from the array substrate N10, the display panel may also include an encapsulation layer N16, a polarizer layer N17, and a cover glass N18, which are configured on the sub-light emitting unit N121 in this sequence. For illustrative purposes, as shown in FIG. 6a, the fingerprint recognition unit N11 may be configured between the polarizer layer N17 and the cover glass N18. The fingerprint recognition unit N11 may also be configured between the encapsulation layer N16 and the polarizer layer N17.

Figure 6B:
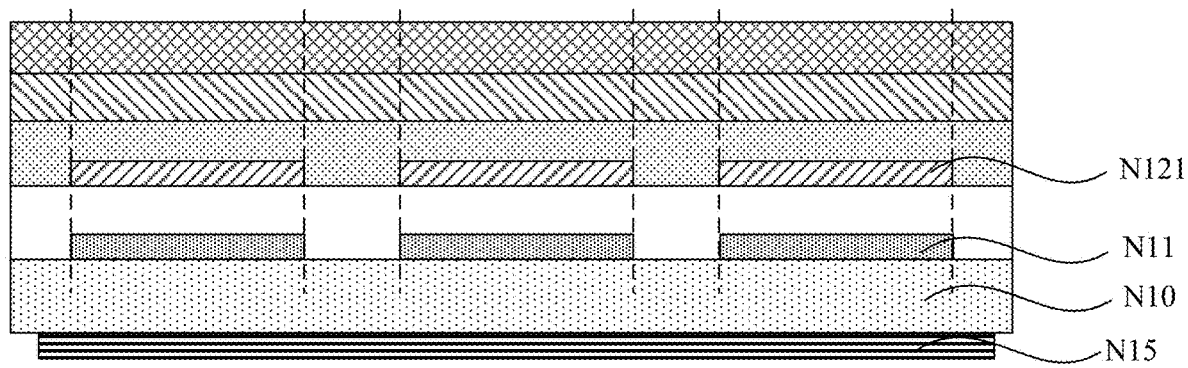
FIG. 6b illustrates a cross-sectional view of another exemplary display panel according to the disclosed embodiments.

FIG. 6b illustrates a cross-sectional view of another exemplary display panel according to the present disclosure. Referring to FIG. 1a and FIG. 6b, the fingerprint recognition unit N11 may be configured on a side of the light emitting unit N12 adjacent to the array substrate N10. The fingerprint recognition unit N11 may recognize fingerprints based on the reflected light that is formed when the light emitted from the light emitting unit N12 or the independently configured fingerprint recognition light source N13 is reflected. Similarly, each fingerprint recognition unit N11 may be configured with at least one corresponding sub-light emitting unit N121. The fingerprint recognition unit N11 and the corresponding sub-light emitting unit N121 may have the orthogonal projections coinciding with each other to eliminate the Moiré patterns and to improve the precision of the fingerprint recognition by the display panel.

In certain embodiments, the fingerprint recognition unit N11 may be configured with at least one corresponding sub-light emitting unit N121, and the fingerprint recognition unit N11 and the corresponding sub-light emitting unit N121 may have the orthogonal projections coinciding with each other. That is, each fingerprint recognition unit N11 and the corresponding sub-light emitting unit N121 may have the same shape and size, and in a direction perpendicular to the plane where the array substrate N10 is located, each fingerprint recognition unit N11 and the corresponding sub-light emitting unit N121 may have the exactly matching boundaries. Thus, the Moiré patterns caused by the misalignment between the fingerprint recognition unit N11 and the sub-light emitting unit N121 may be avoided, and the precision of the fingerprint recognition by the display panel may be improved.

In certain embodiments, the light emitting unit may include an organic light emitting structure, a first light transmittance region, and a second light transmittance region. Each fingerprint recognition nit may be configured with at least one sub-light emitting unit. The fingerprint recognition unit and the corresponding sub-light emitting unit may have the orthogonal projections on the array substrate coinciding with each other. Thus, the orthogonal projection of the organic light emitting structure in the sub-light emitting unit on the array substrate may have an area smaller than the area of the orthogonal projection of the fingerprint recognition unit on the array substrate. The orthogonal projection of the fingerprint recognition unit on the array substrate may cover the orthogonal projection of the organic light emitting structure of the corresponding sub-light emitting unit on the array substrate.

In certain other embodiments, the orthogonal projection of the organic light emitting structure of the sub-light emitting unit on the array substrate may be an area smaller than the orthogonal projection of the fingerprint recognition unit on the array substrate. The orthogonal projection of the fingerprint recognition unit on the arrays substrate may cover the orthogonal projection of the organic light emitting structure of the corresponding sub-light emitting unit on the array substrate. The organic light emitting structure may often include an anode, a cathode, and a light emitting function layer between the anode and the cathode. In this case, the organic light emitting structure may be the corresponding portion of the light emitting function layer.

Figure 7A:
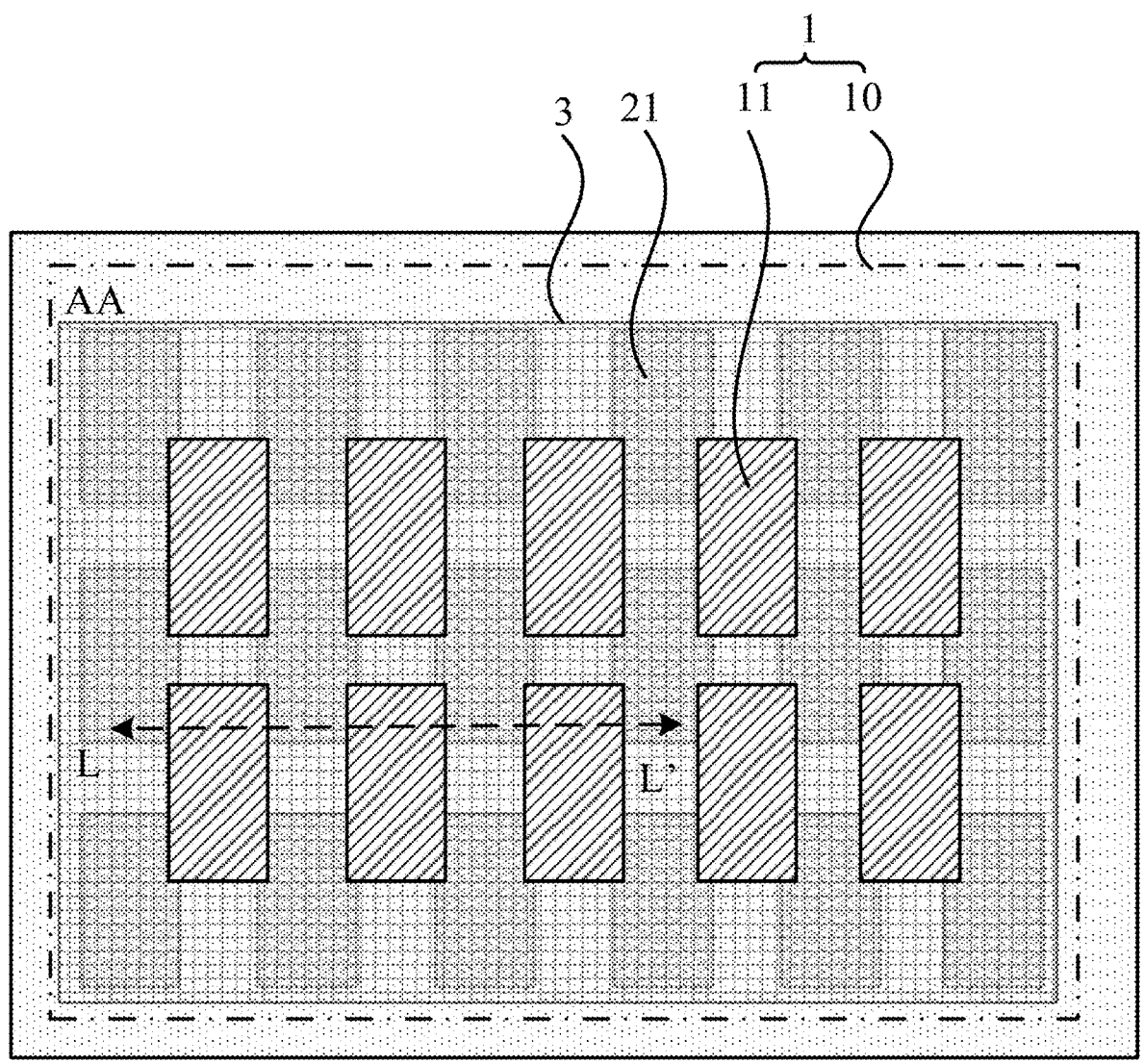
FIG. 7a illustrates a top-down view of another exemplary display panel according to the disclosed embodiments.
Figure 7B:
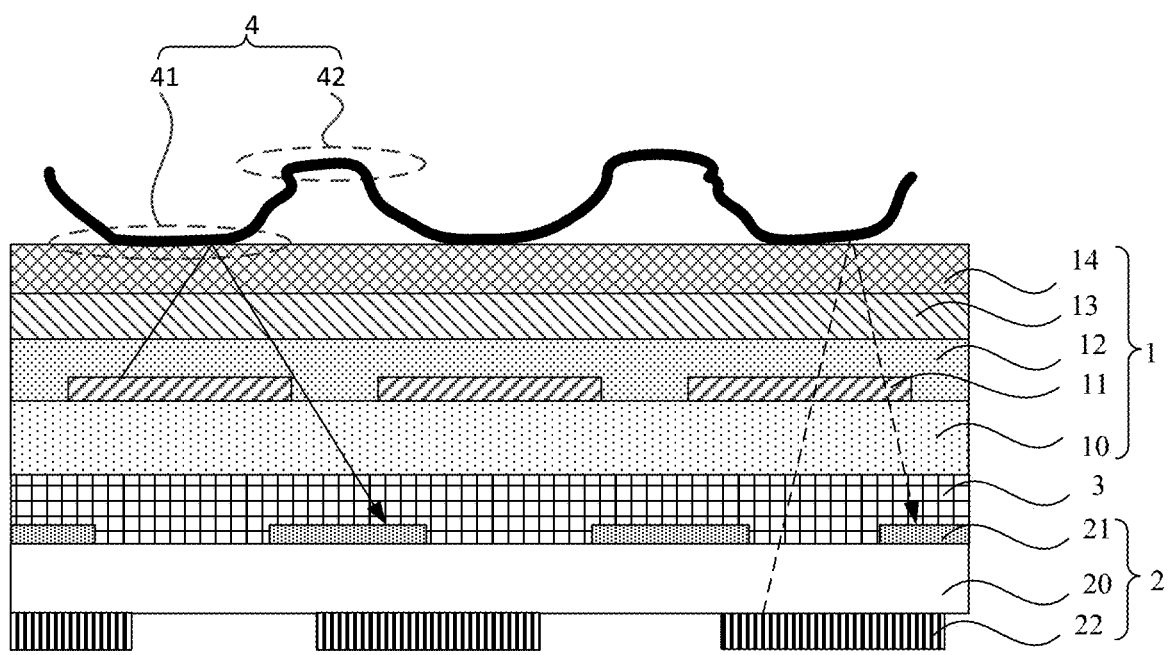

FIG. 7a illustrates a top-down view of another exemplary display panel according to the present disclosure. FIG. 7b illustrates a cross-sectional view along the LL' direction in FIG. 7a. Referring to FIG. 7a and FIG. 7b, the display panel may include a display module 1, a fingerprint recognition module 2, and an angle limiting film 3. The display module 1 may include an array substrate 10, and a plurality of organic light emitting structures 11 disposed on the array substrate 10. The fingerprint recognition module 2 may be disposed in a display region AA on a side of the array substrate facing away from the organic light emitting structures 11, and may include a first substrate 20, and at least one fingerprint recognition unit 21. The angle limiting film 3 may be disposed between the display module 1 and the fingerprint recognition module 2.

The fingerprint recognition module 2 may recognize fingerprints based on the light reflected by the touch object 4 to the fingerprint recognition unit 21. The light reflected by the touch object 4 to the fingerprint recognition unit 21 may pass through the angle limiting film 3, which has a passing angle. When the reflected light has an angle of incidence with respect to the angle limiting film 3 smaller than the passing angle, the light transmittance may be $A_1$. When the reflected light has an angle of incidence with respect to the angle limiting film 3 greater than the passing angle, the light transmittance may be $A_2$. $A_1 > A_2 > 0$.

When the incident light is perpendicular to the angle limiting film 3, the light transmittance may be A. The passing angle of the angle limiting film 3 may be the angle of incidence, where the incident light has a light transmittance of kA, and $0<k<1$. In one embodiment, k may be configured to 0.1. That is, the passing angle of the angle limiting film 3 may be the angle of incidence, where the incident light has a light transmittance of 0.1 A.

As shown in FIG. 7b, the light emitted from the light source may irradiate on the touch object 4. The optical path in the solid line and the optical path in the dashed line may represent different sources of light, as shown in FIG. 7b. The fingerprint recognition unit 21 may recognize fingerprints based on the reflection of light from any sources.

In one embodiment, the touch object 4 may often be a finger. A fingerprint may include a series of ridges 41 and valleys 42. Because the distance between a ridge 41 and the fingerprint recognition unit 21 is different from the distance between a valley 42 and the fingerprint recognition unit 21, the fingerprint recognition unit 21 may receive light reflected by the ridge 41 and the valley 41 with different intensities. As a result, the light reflected by the ridge 41 and the light reflected by the valleys 42 may be converted to different current signals. Thus, fingerprints may be recognized based on different current signal levels. In another embodiment, the touch object 4 may be a palm, etc. In this case, palmprints may be used to achieve the detection and recognition function.

Specifically, the light that is reflected by the touch object 4 to the fingerprint recognition unit 21, and has an angle of incidence with respect to the angle limiting film 3 smaller than the passing angle of the angle limiting film 3 may be considered as fingerprint recognition detection light. The light that has angle of incidence with respect to the angle limiting film 3 greater than the passing angle of the angle limiting film 3 may still pass the angle limiting film 3 and irradiate on the fingerprint recognition unit 21. In this case, because of $A_1 > A_2$, the light may only form a dim background pattern in the final fingerprint recognition image. The fingerprint recognition detection light may be still clear enough. That is, the fingerprint may be recognized from the fingerprint recognition image formed by the light that has an angle of incidence with respect to the angle limiting film 3 smaller than the passing angle of the angle limiting film 3.

Compared to the existing technology, where light reflected by the touch object 4 at different positions to the same fingerprint recognition unit 21 causes crosstalk, the present disclosure may improve the accuracy and precision of fingerprint recognition. At the same time, without affecting fingerprint recognition, the display panel and display apparatus provided by the embodiments of the present disclosure may reduce the fabrication complexity and difficulty of the angle limiting film 3, increase the transmittance for the light that has an angle of incidence with respect to the angle limiting film 3 smaller than the passing angle of the angle limiting film 3, and further improve the precision of fingerprint recognition.

In one embodiment, it is configured that $A_1 > 1.5 A_2$. Light reflected by the touch object 4 to the fingerprint recognition unit 21 may pass through the angle limiting film 3. The reflected light that has an angle of incidence with respect to the angle limiting film 3 smaller than the passing angle of the angle limiting film 3 may have a transmittance of $A_1$, and may become the fingerprint recognition detection light. The reflected light that has an angle of incidence with respect to the angle limiting film 3 greater than the passing angle of the angle limiting film 3 may have a transmittance of $A_2$, and may only form a dim background pattern in the final fingerprint recognition image. The configuration of $A_1 > 1.5 A_2$ may further increase the contrast between the finally formed fingerprint recognition images and background images, and may improve the accuracy and precision of the fingerprint recognition process.

In one embodiment, the organic light emitting structure 11 may be the light source for the fingerprint recognition module 2. The fingerprint recognition unit 21 may recognize fingerprints based on the reflected light that is formed when the light emitting from the organic light emitting structure 11 is reflected by the touch object 4 to the fingerprint recognition unit 21, which is represented in the optical path in solid line as shown in FIG. 7b. The light emitting from the organic light emitting structure 11 may be reflected by the touch object 4 to the fingerprint recognition unit 21, and may pass through the angle limiting film 3. The reflected light that has an angle of incidence with respect to the angle limiting film 3 smaller than the passing angle of the angle limiting film 3 may have a transmittance of $A_1$. The reflected light that has an angle of incidence with respect to the angle limiting film 3 greater than the passing angle of the angle limiting film 3 may have a transmittance of $A_2$. $A_1 > A_2$.

The finally formed fingerprint recognition image may include a dim background pattern. Without affecting the fingerprint recognition, the present disclosure may effectively avoid the crosstalk caused by the reflected light that is formed when the light emitted from the organic light emitting structure 11 is reflected by the touch object 4 at different positions to the fingerprint recognition unit 21. Thus, the accuracy and precision of fingerprint recognition by the fingerprint recognition module 2 may be improved.

In one embodiment, the light that is perpendicular to the touch object 4, passes through the display module 1, and irradiates on the fingerprint recognition unit 21 may have a transmittance greater than 1%. Specifically, when the fingerprint recognition unit 21 recognizes fingerprints based on the light emitted from the organic light emitting structure 11, and the light that is perpendicular to the touch object 4, passes through the display module 1, and irradiates on the fingerprint recognition unit 21 has a substantially small transmittance, the light that received by the fingerprint recognition unit 21 may be substantially weak, which affects the precision of fingerprint recognition. For illustrative purposes, the transmittance of the light that is perpendicular to the touch object 4, passes through the display module 1, and irradiates on the fingerprint recognition unit 21 may be adjusted by adjusting the thickness of the layers that the light passes through.

In one embodiment, the display panel may include a light emitting side and a non-light emitting side. The light emitting side may be the side of the organic light emitting structure 11 facing away from the array substrate 10, and the non-light emitting side may be the side of the array substrate 10 facing away from the organic light emitting structure 11. When the fingerprint recognition unit 21 recognizes fingerprints based on the light emitted from the organic light emitting structure 11, the light intensity ratio of the light emitting side over the non-light emitting side may be greater than 10:1.

The light emitted from the non-light emitting side of the display panel may affect the fingerprint recognition process performed by the fingerprint recognition unit 21 based on the reflected light that is formed when the light emitting from the organic light emitting structure 11 is reflected by the touch object 4 to the fingerprint recognition unit 21, and may cause crosstalk of the light detected by the fingerprint recognition unit 21. When the light emitted from the non-light emitting side of the display panel is too bright, the precision of fingerprint recognition may be severely affected.

For illustrative purposes, the organic light emitting structure 11 and the fingerprint recognition unit 21 may be configured at the relative positions as shown in FIG. 7a and FIG. 7b. The relative positions between the organic light emitting structure 11 and the fingerprint recognition unit 21 are not limited by the present disclosure, as long as the light emitted from the organic light emitting structure 11 is reflected by the touch object 4 to the fingerprint recognition unit 21.

In one embodiment, the fingerprint recognition module 2 may also include a fingerprint recognition light source 22. The fingerprint recognition light source 22 may be located on a side of the first substrate 20 facing away from the fingerprint recognition unit 21. The fingerprint recognition unit 21 may recognize fingerprints based on the reflected light that is formed when the light emitted from the fingerprint recognition light source 22 is reflected by the touch object 4 to the fingerprint recognition unit 21, as represented in the optical path in dashed line as shown in FIG. 7b. In another embodiment, the light emitted from the fingerprint recognition light source 22 may pass between two adjacent fingerprint recognition units 21 and irradiate on the touch object 4.

In another embodiment, the light emitted from the fingerprint recognition light source 22 may pass between two adjacent fingerprint recognition units 21 and irradiate on the touch object 4. The light that is perpendicular to the touch object 4, is reflected by the touch object 4, passes through the display module 1, and irradiates on the fingerprint recognition unit 21 may have a transmittance greater than 10%. Specifically, when the reflected light that is perpendicular to the touch object 4, passes through the display module 1, and irradiates on the fingerprint recognition unit 21 has substantially small transmittance, the intensity of the light that is received by the fingerprint recognition unit 21 may be substantially small, and the precision of fingerprint recognition may be affected.

In addition, when the fingerprint recognition by the fingerprint recognition unit 21 based on the light emitted from the organic light emitting structure 11 and the finger recognition by the fingerprint recognition unit 21 based on the light emitted from the fingerprint recognition light source 22 are compared, the light that is emitted from the fingerprint recognition light source 22 and irradiates on the fingerprint recognition unit 21 may pass more layers, i.e., a thicker total thickness of the layers. Thus, the light that is perpendicular to the touch object 4, is reflected by the touch object 4, passes through the display module 1, and irradiates on the fingerprint recognition unit 21 may have a smaller transmittance.

The position and type of the fingerprint recognition light source 22 may not be limited by the present disclosure. The fingerprint recognition light source 22 may be a point light source or a surface light source, as long as the light emitted from the fingerprint recognition light source 22 is reflected by the touch object 4 to the fingerprint recognition unit 21. At the same time, for illustrative purposes, the optical paths in the solid line and the dashed line as shown in FIG. 7b may represent only one ray of the light emitted from the organic light emitting structure 11 or the fingerprint recognition light source 22. The light emitted from the organic light emitting structure 11 and the fingerprint recognition light source 22 may diverge.

In addition, the type of light source is not limited by the present disclosure. The light source may be the organic light emitting structure 11, or the externally attached fingerprint recognition light source 22, as long as the light emitted from the light source is reflected by the touch object 4 to the fingerprint recognition unit 21 for fingerprint recognition.

Figure 8A:
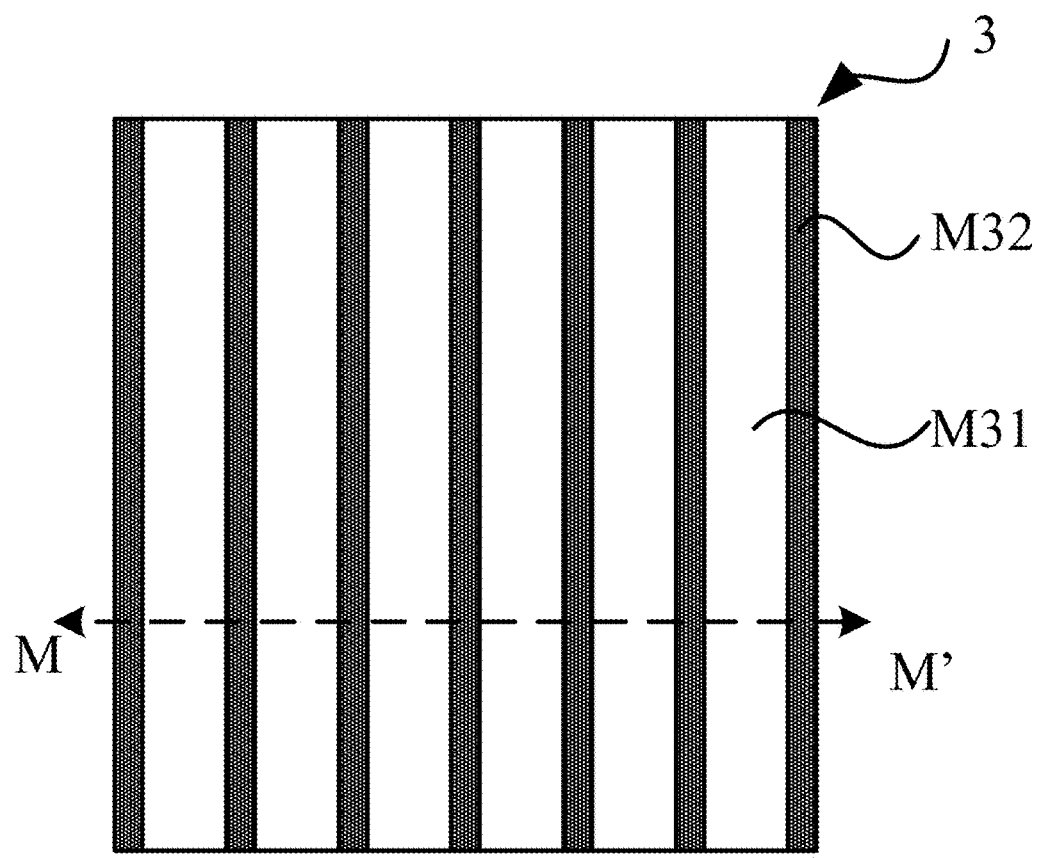
FIG. 8a illustrates a top-down view of an exemplary angle limiting film according to the disclosed embodiments.
Figure 8B:
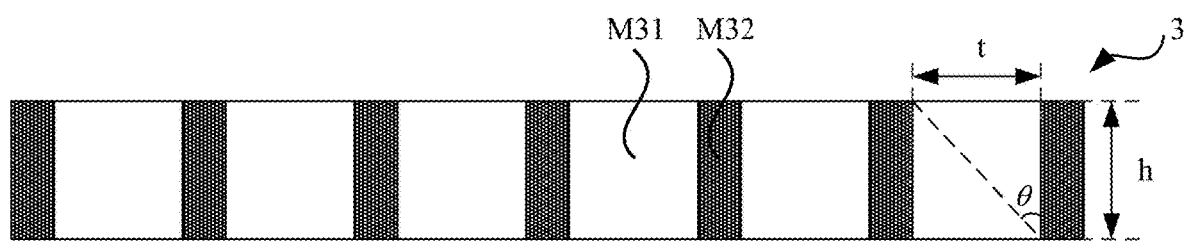

FIG. 8a illustrates a top-down view of an exemplary angle limiting film according to the present disclosure. FIG. 8b illustrates a cross-sectional view along the MM' direction in FIG. 8a. Referring to FIG. 8a and FIG. 8b, the angle limiting film 3 may include a plurality of partial transparent regions M32 and transparent regions M31, that are arranged alternately in a same direction parallel to the plane where the first substrate is located. The partial transparent regions M32 may be configured with a light-absorbing material. The transparent regions M31 may have a light transmittance greater than the light transmittance of the partial transparent regions M32.

Specifically, the partial transparent regions M32 may be configured with a light-absorbing material. The light reflected by the touch object 4 may pass through the angle limiting film 3 and irradiate on the fingerprint recognition unit 21. The light that has an angle of incidence with respect to the angle limiting film 3 smaller than the passing angle of the angle limiting film 3 may have the maximum transmittance, and may be used for fingerprint detection. That is, the light may be the fingerprint recognition detection light.

In addition, because the partial transparent regions M32 may be configured with the light-absorbing material, only a portion of the light that irradiates on the partial transparent regions M32 may pass the angle limiting film 3 and irradiate on the fingerprint recognition unit 21 by adjusting the thickness of the partial transparent regions M32. That is, the light transmittance in the transparent regions M31 may be greater than the light transmittance in the partial transparent regions M32. Although the light that has an angle of incidence with respect to the angle limiting film 3 greater than the passing angle of the angle limiting film 3 may partially pass through the angle limiting film 3 and irradiate on the fingerprint recognition unit 21, the light that passes through the partial transparent regions M32 and irradiates on the fingerprint recognition unit 21 may only form a dim background pattern in the finally formed fingerprint recognition image, and may not affect the retrieval of the fingerprint image. Thus, the crosstalk problem in the existing technology, caused by the reflected light that is reflected by the touch object 4 at different positions to the same fingerprint recognition unit 21, may be resolved.

In addition, the partial transparent regions M32 may be configured thicker than the transparent regions M31 along the MM' direction. That is, the thickness of the transparent regions M31 may be increased in the MM' direction. The configuration may increase the transmittance for the light that has an angle of incidence with respect to the angle limiting film 3 smaller than the passing angle of the angle limiting film 3, increase the precision of fingerprint recognition, and reduce the fabrication difficulty and complexity of the angle limiting film 3.

As shown in FIG. 8b, because the light transmittance in the transparent regions M31 is greater than the light transmittance in the partial transparent regions M32, the passing angle of the angle limiting film 3 may satisfy the equation below:

$$\theta = \arctan\frac{t}{h},$$

where $\theta$ is the passing angle of the angle limiting film 3, t is the width of the transparent regions M31 in the direction the transparent regions M31 are arranged, and h is the thickness of the angle limiting film 3. As shown in FIG. 8b, $\theta$, t, and h has the relationship, $$\tan\theta = \frac{t}{h}.$$

Thus, the passing angle of the angle limiting film 3 may satisfy the above equation.

The light that is irradiated on the partial transparent regions M32 may be absorbed by the light-absorbing material in the region. That is, the light that has an angle of incidence with respect to the angle limiting film 3 greater than the passing angle θ may be partially absorbed. The weakened light may form a uniform and dim background pattern in the finally formed fingerprint recognition image, and may not affect the fingerprint recognition process.

In one embodiment, the angle limiting film 3 may include a plurality of partial transparent regions M32 and transparent regions M31 that are arranged alternately in the same direction parallel to the plane where the first substrate N20 is located. The partial transparent regions M32 may be configured with a light-absorbing material. When the light transmittance in the transparent regions M31 is greater than the light transmittance in the partial transparent regions M32, a divergent distance of the angle limiting film 3 may be defined in the equation below:

$$\Delta X = \frac{t(H+h)}{h},$$

where ΔX is the divergent distance of the angle limiting film 3, and H is a thickness of the display module 1.

The divergent distance of the angle limiting film 3 may be defined as a distance between a reflection point on the touch object 4 that reflects an actual detection light to a fingerprint recognition unit 21 and a reflection point on the touch object 4 that reflects an interfering detection light to the same fingerprint recognition unit 21. An actual detection light is the reflection light that has the smallest angle of incidence with respect to the fingerprint recognition unit 21. An interfering detection light is the reflection light that has an angle of incidence with respect to the fingerprint recognition unit 21 greater than the angle of incidence with respect to the fingerprint recognition unit 21 of the actual detection light.

Figure 8C:
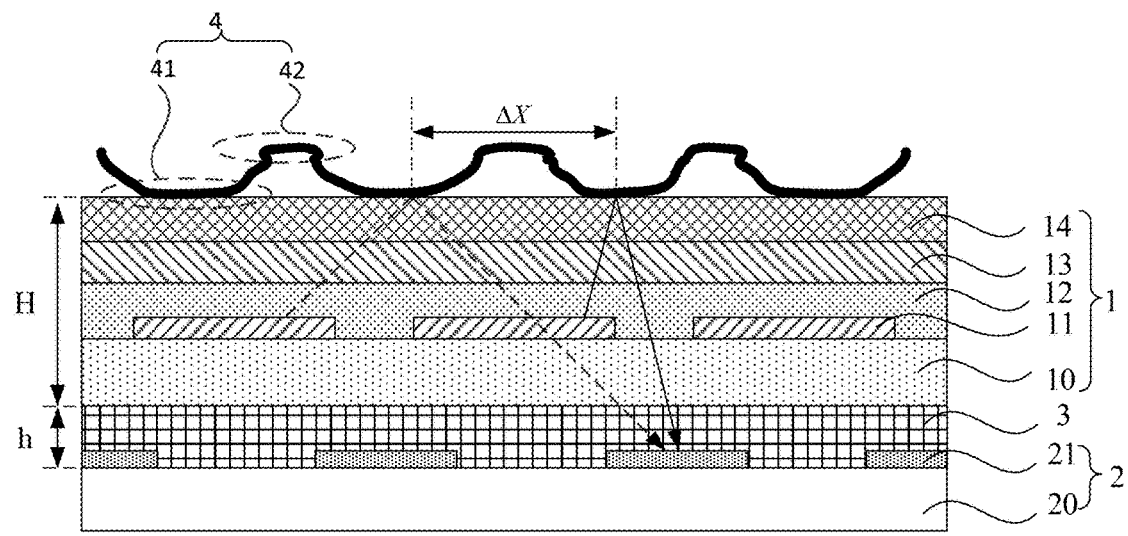
FIG. 8c illustrates a cross-sectional view of another exemplary display panel according to the disclosed embodiments.

For illustrative purposes, as shown in FIG. 8c, the light emitted from the organic light emitting structure 11 may be reflected by the touch object 4 to the fingerprint recognition unit 21, and the fingerprint recognition unit 21 may use the reflected light to recognize fingerprints. As shown in FIG. 8c, the optical path in solid line may represent the reflected light that has the smallest angle of incidence with respect to the fingerprint recognition unit 21, i.e., the actual detection light. As shown in FIG. 8c, the optical path in the dashed line may represent the reflected light that has an angle of incidence with respect to the fingerprint recognition unit 21 greater than the angle of incidence with respect of the fingerprint recognition unit 21 of the actual detection light, i.e., the interfering detection light.

When the angle limiting film 3 is absent, the actual detection light and the interfering detection light may be reflected by the touch object 4 at two different positions, e.g., two adjacent ridges 41, to irradiate on the same fingerprint recognition unit 21. That is, the crosstalk exists in the fingerprint recognition process.

Figure 8D:
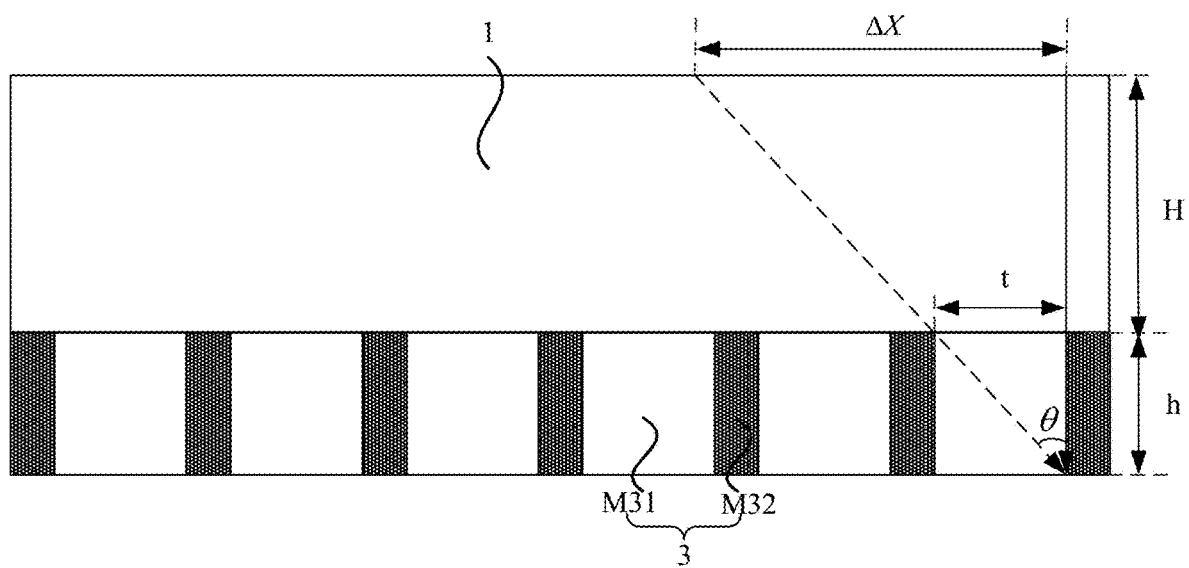

At this point, the divergent distance of the angle limiting film 3 may be the distance between the two reflection points on the touch object 4, corresponding to the actual detection light and the interfering detection light, as shown in FIG. 8c. For illustrative purposes, as shown in FIG. 8d, the actual detection light may have a near 0° angle of incidence with respect to the fingerprint recognition unit 21. The smallest angle of incidence with respect to the fingerprint recognition unit 21 for the interfering detection light passing through the angle limiting film 3 may be the passing angle of the angle limiting film 3. Therefore, the equation $$\tan\theta = \frac{t}{h} = \frac{\Delta X}{H+h}$$

holds true. Thus, the divergent distance of the angle limiting film 3 may satisfy the equation. The longer the divergent distance of the angle limiting film 3, the lower the accuracy and precision of the fingerprint recognition by the display panel.

Figure 8E:
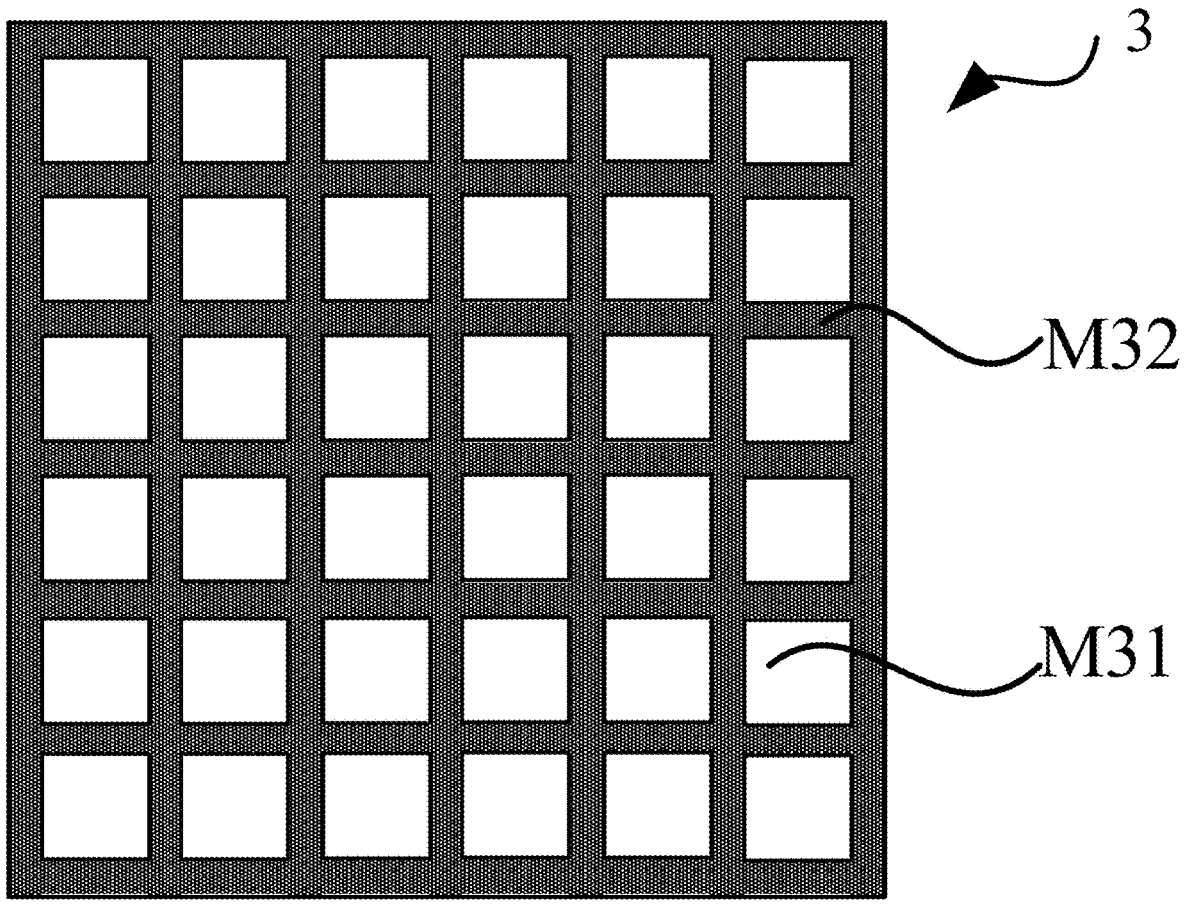
FIG. 8e illustrates a cross-sectional view of another exemplary display panel according to the disclosed embodiments.

For illustrative purposes, the angle limiting film 3 may be configured as a one-dimension structure, as shown in FIG. 8a. The transparent regions M31 and the partial transparent regions M32 may be arranged alternately in the horizontal direction in FIG. 8a. The angle limiting film 3 may also be configured as a two dimension structure, as shown in FIG. 8e. The transparent regions M31 and the partial transparent regions M32 may be arranged alternately in the diagonal direction of the angle limiting film 3, as shown in FIG. 8e. The angle limiting film 3 may filter light that has various angels of incidence with respect to the fingerprint recognition unit 21, and may improve the accuracy and precision of the fingerprint recognition process.

For illustrative purposes, in various embodiments, the thickness of the partial transparent regions M32 may be adjusted to control light passing through the partial transparent regions M32. Alternatively, the light-absorbing material may be configured in the partial transparent regions M32 to control light passing through the partial transparent regions M32. The methods for controlling light passing through the partial transparent regions M32 are not limited by the present disclosure.

Figure 9A:
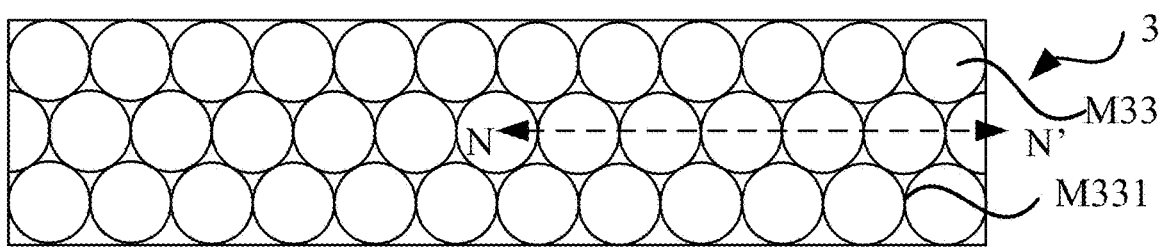
FIG. 9a illustrates a top-down view of another exemplary angle limiting film according to the disclosed embodiments.
Figure 9B:
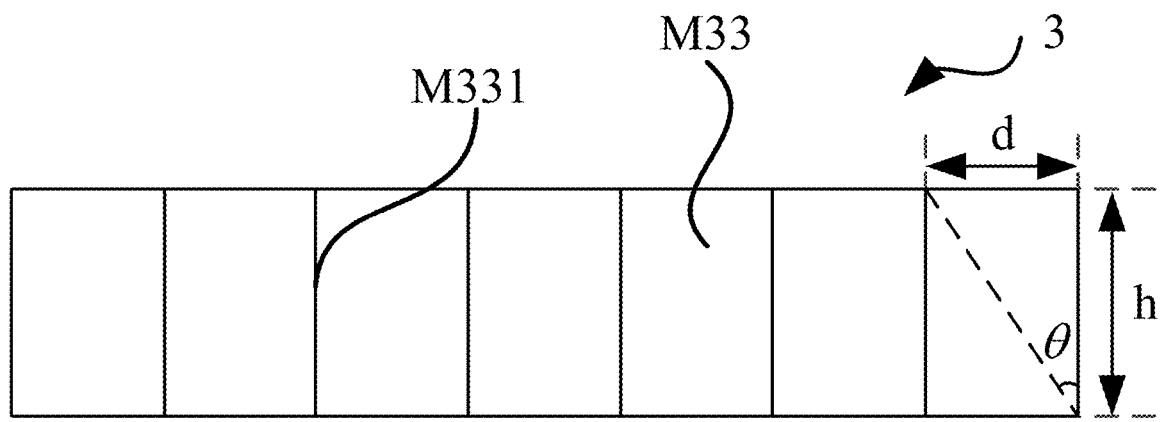

FIG. 9a illustrates a top-down view of another exemplary angle limiting film according to the present disclosure. FIG. 9b illustrates a cross-sectional view along the NN' direction in FIG. 9a. Referring to FIG. 9a and FIG. 9b, the angle limiting film 3 may include a porous structure M33. The side wall M331 of the porous structure M33 may partially absorb light irradiated on the side wall M331. For illustrative purposes, the porous structure M33 may be a glass capillary structure. The side wall M331 of the glass capillary may be coated by a black light-absorbing material so that the light irradiated on the side wall M331 may be partially absorbed by the side wall M331. In one embodiment, a light-absorbing material may be configured between adjacent porous structures M33. In certain other embodiments, no light-absorbing material may be configured between adjacent porous structures M33.

Specifically, because the side wall M331 of the porous structure M33 may partially absorb the light irradiated on the side wall M331, the light that has an angle of incidence with respect to angle limiting film 3 smaller than the passing angle of the angle limiting film 3 may have the greatest transmittance, and may be used for fingerprint detection. That is, the light may be the fingerprint recognition detection light. Although the light that has an angle of incidence with respect to the angle limiting film 3 greater than the passing angle of the angle limiting film 3 may partially pass through the angle limiting film 3 and may irradiate on the fingerprint recognition unit 21, the light that is bounced by the side wall M331 and irradiates on the fingerprint recognition unit 21 may only form a dim background pattern in the finally formed fingerprint recognition image, and may not affect the retrieval of the fingerprint image.

Because the side wall M331 of the porous structure M33 may partially absorb the light irradiated on the side wall M331, the passing angle of the angle limiting film 3 may be defined in the equation below:

$$\theta = \arctan\frac{d}{h},$$

where θ is the passing angle of the angle limiting film 3, d is diameter of the porous structure M33, and h is the thickness of the angle limiting film 3. As shown in FIG. 9b, θ, d, and h may have the relationship as described in the equation $$\tan\theta = \frac{d}{h}.$$

Thus, the passing angle of the angle limiting film 3 may satisfy the equation.

In one embodiment, when the angle limiting film 3 is a porous structure M33, and the side wall M331 of the porous structure M33 partially absorbs the light irradiated on the side wall M331, the divergent distance of the angle limiting film 3 may be defined the equation below:

$$\Delta X = \frac{d(H+h)}{h},$$

where ΔX is the divergent distance of the angle limiting film 3, and H is the thickness of the display module 1. The derivation of this equation is similar to the derivation of the divergent distance of the angle limiting film 3 having the structure shown in FIG. 8a, and will not be repeated here. Similarly, the longer the divergent distance of the angle limiting film 3 is, the lower the accuracy and precision of fingerprint recognition by the display panel may be.

Figure 9C:
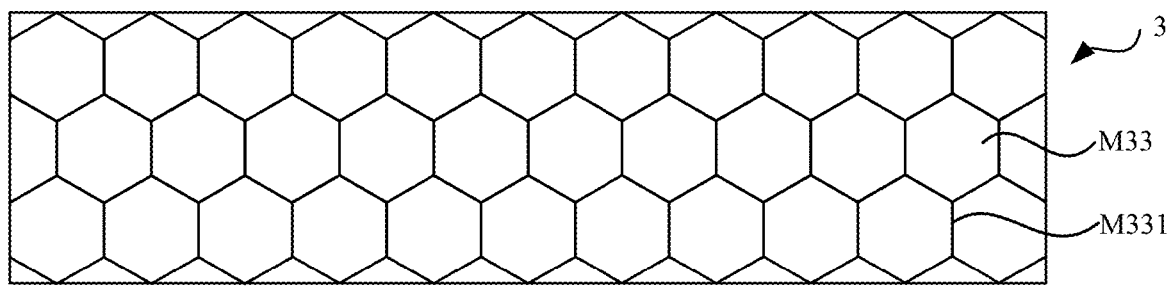
FIG. 9c illustrates a top-down view of another exemplary angle limiting film according to the disclosed embodiments.

In one embodiment, from the top-down view of the angle limiting film 3, the porous structure M33 may correspond to the circular structure as shown in FIG. 9a. In another embodiment, the porous structure M33 may correspond to the hexagon structure as shown in FIG. 9c. The shapes of the porous structure M33 from the top-down view are not limited by the present disclosure.

Figure 10A:
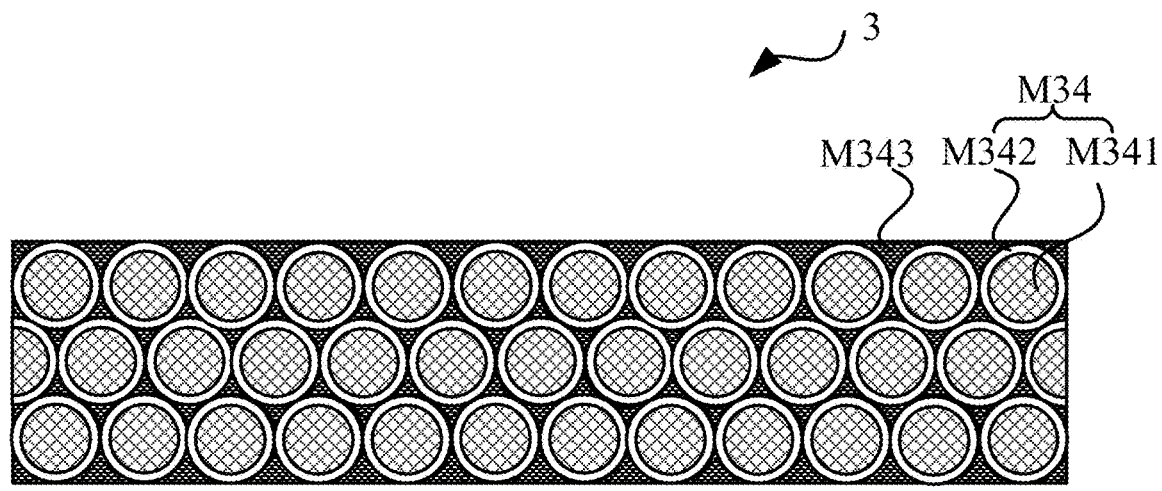
FIG. 10a illustrates a top-down view of another exemplary angle limiting film according to the disclosed embodiments.
Figure 10B:
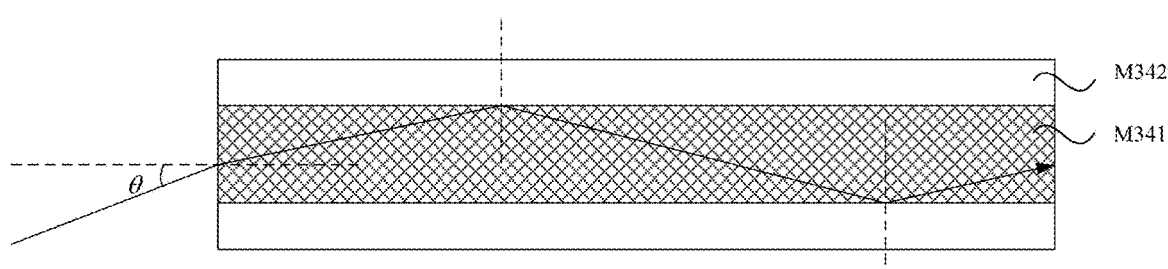
FIG. 10b illustrates a cross-sectional view of an exemplary optical fiber in the extension direction according to the disclosed embodiments.

FIG. 10a illustrates a top-down view of another exemplary angle limiting film according to the present disclosure. As shown in FIG. 10a, the angle limiting film 3 may include a plurality of optical fiber structures M34 that are arranged in a same direction. FIG. 10b illustrates a cross-sectional view of an exemplary optical fiber in the extension direction according to the present disclosure. Referring to FIG. 10a and FIG. 10b, the optical fiber structure M34 may include an inner core M341 and a cladding M342. Light-absorbing material M343 may be configured between every two adjacent optical fiber structures M34. Light escaped from the optical fiber structures M34 into the gap between the adjacent optical fiber structures M34 may be absorbed by the light-absorbing material M343 configured between adjacent optical fiber structures M34. The light transmittance in the inner core M341 may be greater than the light transmittance in the light-absorbing material M343.

Specifically, the inner core M341 and the cladding M342 of the optical fiber structure M34 may have different indices of refraction. The passing angle of the angle limiting film 3 may be defined in the equation below:

$$n\cdot\sin\theta = \sqrt{n_{core}^2 - n_{clad}^2},$$

where θ is the passing angle of the angle limiting film 3, n is the index of refraction for the layer in display module 1, which is in contact with the angle limiting film 3, $n_{core}$ is the index of refraction of the inner core M341 of the optical fiber structure M34, and $n_{clad}$ is the index of refraction of the cladding M342 of the optical fiber structure M34.

As shown in FIG. 10b, when the light reflected by the touch object 4 has an angle of incidence with respect to the angle limiting film 3 formed by the optical fiber structures M34 greater than θ, the total reflection may not occur in the optical fiber structure M34. That is, the light escaped from the optical fiber structure M34 may be partially absorbed by the light-absorbing material M343 between adjacent optical fiber structures M34. The attenuated light may still pass through the angle limiting film 3 and irradiate on the fingerprint recognition unit 21. However, the attenuated light may only form a dim background pattern in the corresponding fingerprint image, and may not affect the recognition of the fingerprint image.

Because the light transmittance in the inner core M341 is greater than the light transmittance in the light-absorbing material M343, the present disclosure may resolve the crosstalk problem in the existing technology, caused by the light reflected by the touch object 4 at different positions to the same fingerprint recognition unit 21. In one embodiment, the thickness of the gap filled by the light-absorbing material M343 may be configured to be smaller than the diameter of the inner core M341 of the optical fiber structure M34. That is, the diameter of the inner core M341 of the optical fiber M34 is relatively increased, which in turn relatively increases the transmittance of the light that has an angle of incidence with respect to the angle limiting film 3 smaller than the passing angle of the angle limiting film 3. Thus, the precision of fingerprint recognition may be improved, and the fabrication difficulty and complexity of the angle limiting film 3 may be reduced.

In one embodiment, the angle limiting film 3 may include a plurality of optical fiber structures M34 arranged in a same direction. The indices of refraction in the inner core M341 and the cladding M342 of the optical fiber structure M34 may be different. The light-absorbing material M343 may be configured between every two adjacent optical fiber structures M34. When the light transmittance in the inner core M341 is greater than the light transmittance in the light-absorbing material M343, the divergent distance of the angle limiting film 3 may be defined in the equation below:

$$\Delta X = H\cdot\tan\theta,$$

where ΔX is the divergent distance of the angle limiting film 3, and H is the thickness of the display module 1.

Figure 10C:
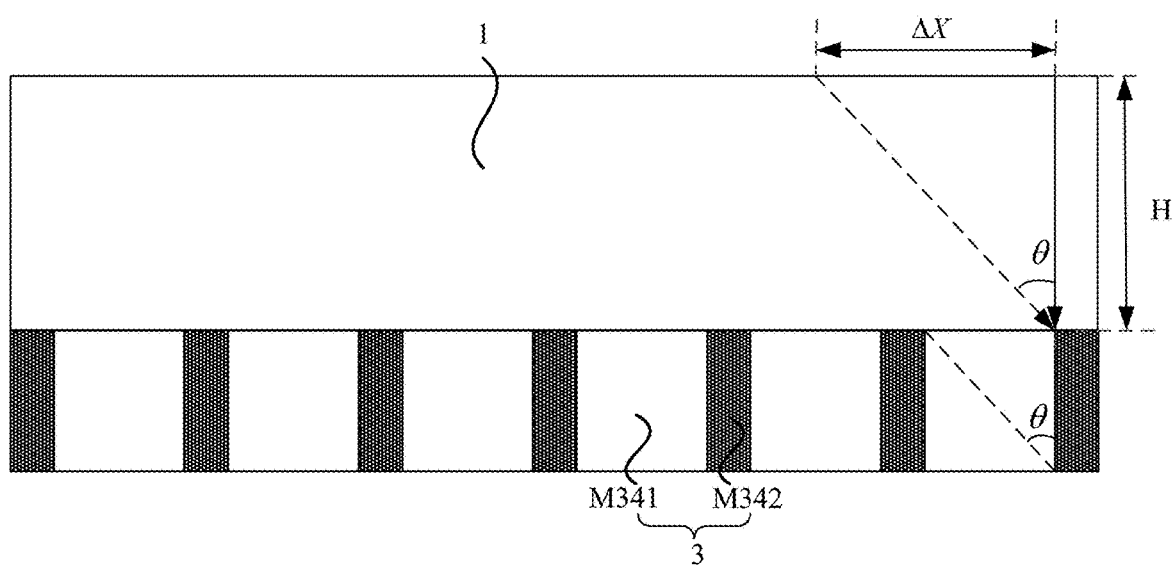

For illustrative purposes, as shown in FIG. 10c, the actual detection light may have a near 0° angle of incidence with respect to the fingerprint recognition unit 21. The interfering light that is able to pass the angle limiting film 3 may have a minimum angle of incidence with respect to the fingerprint recognition unit 21 equal to the passing angle of the angle limiting film 3, that is, the angle of incidence of the total reflection of the light in the optical fiber structures M34. Thus, the equation $$\tan\theta = \frac{\Delta X}{H}$$

may hold true. Similarly, the longer the divergent distance is, the lower the accuracy and precision of fingerprint recognition by the display panel may be.

Figure 11A:
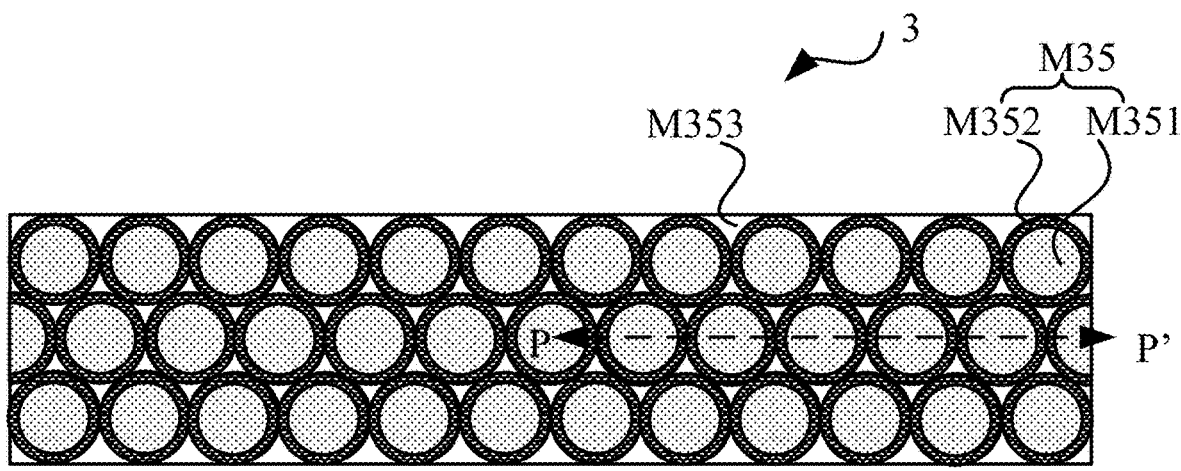
FIG. 11a illustrates a top-down view of another exemplary angle limiting film according to the disclosed embodiments.
Figure 11B:
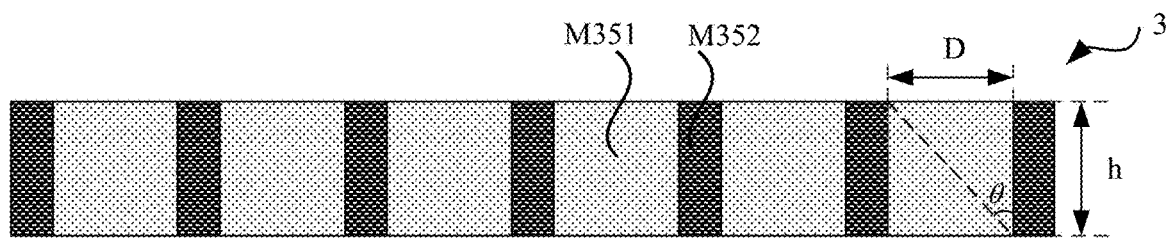

FIG. 11a illustrates a top-down view of another exemplary angle limiting film according to the present disclosure. FIG. 11b illustrates a cross-sectional view along the PP' direction in FIG. 11a. Referring to FIG. 11a and FIG. 11b, the angle limiting film 3 may include a plurality of columnar structures M35 arranged in a same direction. The columnar structure M35 may include an inner core M351 and a outer shell M352. The inner core M351 and the outer shell M352 may have s same index of refraction. The outer shell M352 may be made of light-absorbing material M353. The light transmittance in the inner core M351 may be greater than the light transmittance in the outer shell M352. In one embodiment, a light-absorbing material M353 may be configured between adjacent columnar structures M35. In another embodiment, no light-absorbing material M353 may be configured between adjacent columnar structures M35.

Specifically, the light transmittance in the inner core M351 may be greater than the light transmittance in the light-absorbing material M353. Thus, the passing angle of the angle limiting film 3 may be defined in the equation below:

$$\theta = \arctan\frac{D}{h},$$

where θ is the passing angle of the angle limiting film 3, D is the diameter of the inner core M351, and h is the thickness of the angle limiting film 3. As can be seen from FIG. 11b, θ, D, and h may have the relationship as defined in the equation $$\tan\theta = \frac{D}{h}.$$

Thus, the passing angle of the angle limiting film 3 may satisfy the equation.

In one embodiment, the angle limiting film 3 may include a plurality of columnar structures arrange in a same direction. The columnar structure M35 may include the inner core M351 and the outer shell M352. The inner core M351 and the outer shell M352 may have a same index of refraction. The outer shell M352 may be made of a light-absorbing material M353. When the light transmittance in the inner core M351 is greater than the light transmittance in the light-absorbing material M353, the divergent distance of the angle limiting film 3 may be defined in the equation below:

$$\Delta X = \frac{D \cdot (H+h)}{h},$$

where ΔX is the divergent distance of the angle limiting film 3, and H is the thickness of the display module 1. The derivation of the equation may be similar to the derivation of the divergent distance of the angle limiting film 3 for the structure as shown in FIG. 8a, and will not be repeated here. Similarly, the longer the divergent distance is, the lower the accuracy and precision of fingerprint recognition by the display panel may be.

From the top-down view of the angle limiting film 3, the columnar structure M35 may correspond to the circular structure as shown in FIG. 11a. The columnar structure M35 may correspond to other shape structures. The shapes of the columnar structure M35 are not limited by the present disclosure.

In one embodiment, the divergent distance of the angle limiting film 3 may be smaller than 400 μm. The longer the divergent distance of the angle limiting film 3 is, the longer the distance between the reflection points on the touch object 4 for the interfering detection light and the actual detection light may be. When the distance between the reflection points on the touch object 4 for the interfering detection light and the actual detection light is greater than the distance between adjacent ridge 41 and valley 42 in the fingerprint, errors may occur in the fingerprint recognition process by the display panel, and the fingerprint recognition may fail. Thus, the accuracy and precision of fingerprint recognition by the display panel may be severely affected.

In one embodiment, the organic light emitting structure 11 may provide light source for the fingerprint recognition module 2. When the fingerprint recognition unit 21 is recognizing fingerprint based on the reflected light that is formed when the light emitting from the organic light emitting structure 11 is reflected by the touch object 4 to the fingerprint recognition unit 21, only one organic light emitting structure 11 may be needed to emit light within the range of two times the divergent distance of the angle limiting film 3 in the fingerprint recognition phase.

Specifically, only one organic light emitting structure 11 may be configured within the range of two times the divergent distance of the angle limiting film 3 so that the probability that the light emitted from different organic light emitting structures 11 are reflected by the touch object 4 to the same fingerprint recognition unit 21 may be reduce. Thus, the crosstalk symptom that the light emitted from the fingerprint recognition light source 22 is reflected by the touch object 4 at different positions to the same fingerprint recognition unit 21 may be minimized, and the accuracy and precision of fingerprint recognition may be improved.

In one embodiment, an optical adhesive layer may be provided between the fingerprint module 2 and the angle limiting film 3 to bond the fingerprint recognition module 2 and the angle limiting film 3. In another embodiment, the fingerprint recognition unit 21 may include an optical fingerprint sensor. The optical fingerprint sensor may detect and recognize fingerprints based on the light reflected by the touch object 4. For illustrative purposes, the fingerprint recognition unit 21 may be made of light-absorbing materials such as amorphous silicon, arsenic gallium, and arsenic sulfide. The fingerprint recognition unit 21 may also be made of other light-absorbing material. The material of the fingerprint recognition unit 21 will not be limited by the present disclosure.

In one embodiment, as shown in FIG. 7b and FIG. 8c, the display panel may also include the encapsulation layer 12, the polarizer layer 13, and the glass cover 14 disposed on the organic light emitting structures 11. The encapsulation layer 12 may be an encapsulation glass or a thin film encapsulation layer. When the encapsulation layer 12 is an encapsulation glass, the display panel may not be bent. When the encapsulation layer 12 is a thin film encapsulation layer, the display panel may be bent. In another embodiment, the first substrate 20 for the fingerprint recognition unit 21 may be a glass substrate or a flexible substrate. For illustrative purposes, the glass cover 14 may be bonded with the polarizer layer 13 by an optical adhesive layer.

In one embodiment, the display panel may also include a touch-control electrode layer. The touch-control electrode layer may be disposed between the encapsulation layer 12 and the polarizer layer 13, or alternatively between the glass cover 14 and the polarizer layer 13. The display panel with the integrated touch-control electrode layer may provide display function as well as the touch-control function.

It should be noted that the drawings for the disclosed embodiments are showing the sizes of individual components and the thicknesses of individual layers for illustrative purposes, which do not represent the actual sizes of the components and the actual thicknesses of the layers.

In the present disclosure provided by various embodiments, the angle limiting film 3 may be configured between the display module 1 and the fingerprint recognition module 2. The light reflected by the touch object 4 may pass through the angle limiting film 3 and may irradiate on the fingerprint recognition unit 21. The light that has an angle of incidence with respect to the angle limiting film 3 greater than the passing angle of the angle limiting film 3 may have a transmittance $A_2$. When $A_1 > A_2 > 0$ is configured, the crosstalk problem in the existing technology that the light is reflected by the touch object 4 at different positions to the same fingerprint recognition unit 21 may be minimized, and the accuracy and precision of fingerprint recognition may be improved.

At the same time, the display panel and display apparatus according to the present disclosure may reduce the fabrication difficulty and complexity of the angle limiting film 3 without affecting fingerprint retrieval, and may increase the transmittance for the light that has an angle of incidence with respect to the angle limiting film 3 smaller than the passing angle of the angle limiting film 3. Thus, the precision of fingerprint recognition may be improved.

Figure 12A:
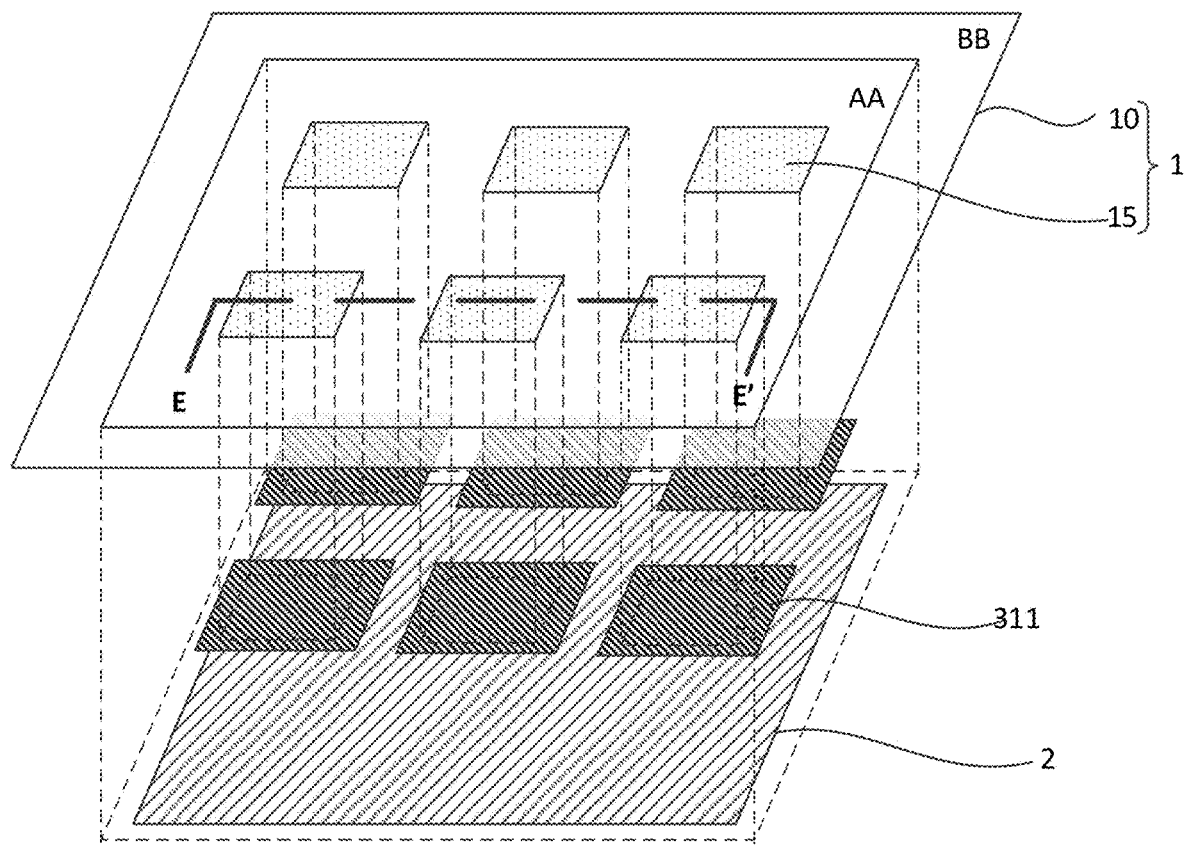
FIG. 12a illustrates a three dimensional structural view of an exemplary display panel according to the disclosed embodiments.
Figure 12B:
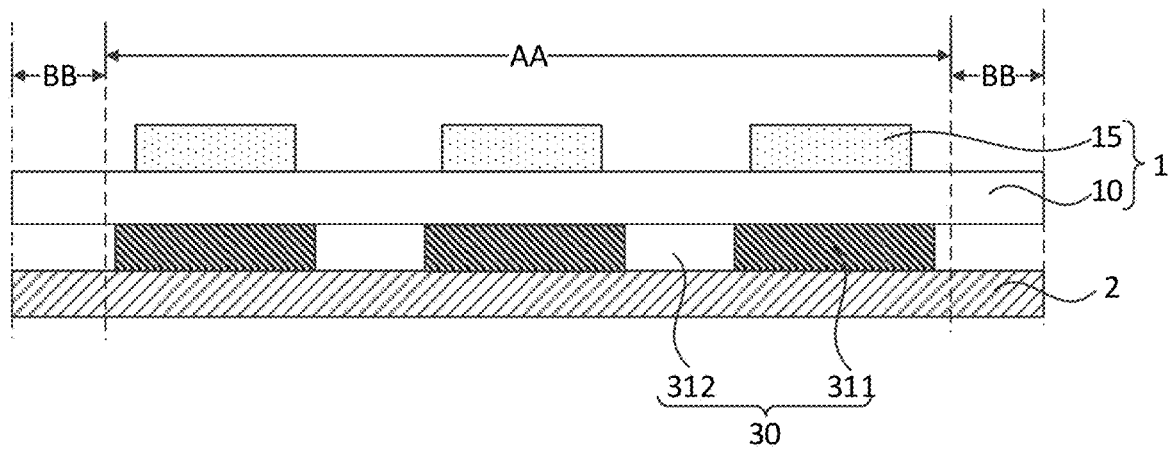

FIG. 12a illustrates a three dimensional structural view of an exemplary display panel according to the present disclosure. FIG. 12b illustrates a cross-sectional view along the EE' direction in FIG. 12a. The light emitted from the fingerprint recognition light source 22 may be used for fingerprint recognition. Referring to FIG. 12a and FIG. 12b, the display panel may include a display module 1, a fingerprint recognition module 2, and at least one layer of black matrix 30. The display module 1 may include an array substrate 10 and a plurality of pixel circuits 15. The array substrate 10 may include a display region AA and a non-display region BB surrounding the display region AA. The plurality of pixel circuits 15 may be disposed in the display region AA of the array substrate 10. The pixel circuit 15 may include a plurality of thin-film-transistors (not shown in FIG. 12a or FIG. 12b). The thin-film-transistor may include a gate electrode, a source electrode, and a drain electrode.

The fingerprint module 2 may be formed on a side of the array substrate 10 facing away from the thin-film-transistors (included in the pixel circuit 15) in the display region AA. The black matrix 30 may be disposed between the thin-film-transistors (included in the pixel circuit 15) and the fingerprint recognition module 2. The black matrix 30 may include a plurality of non-transparent regions 311 and a plurality of transparent regions 312 disposed between the non-transparent regions 311. The orthogonal projection of the gate electrode, the source electrode, and the drain electrode of the thin-film-transistor (included in the pixel circuit 15) on the array substrate 10 may fall within the orthogonal projection of the non-transparent region 311 on the array substrate 10.

In the present disclosure provided by the embodiments, the black matrix 30 may be configured between the thin-film-transistors and the fingerprint recognition module 2. A plurality of opening regions may be configured between the non-transparent regions 311 and transparent regions 312. The orthogonal projection of the gate electrode, the source electrode, and the drain electrode of the thin-film-transistor on the first substrate may fall within the orthogonal projection of the non-transparent regions 311 on the first substrate. When the light emitted from the fingerprint recognition light source 22 is used for fingerprint recognition, the non-transparent regions 311 of the black matrix 30 may be used to block the light emitted from fingerprint recognition module 2, to reduce the light reflected by the gate electrode, the source electrode, and the drain electrode of the thin-film-transistor, and to minimize the possibility that the light reflected by the gate electrode, the source electrode, and the drain electrode of the thin-film-transistor may irradiate on the fingerprint recognition module 2. Thus, the noise formed by the partially reflected light irradiating on the fingerprint recognition module 2 may be reduced.

In addition, the opening regions configured on the black matrix may allow the light emitted from the fingerprint recognition module 2 to pass through the opening regions to irradiate on the finger of the user that is pressed on the display panel, and may allow the light reflected by the fingerprint of the finger to pass through the opening regions. The configuration of the opening regions in the black matrix may increase the signal-to-noise ratio of the fingerprint recognition module 2, and may improve the precision of fingerprint recognition by the fingerprint recognition module 2.

In one embodiment, the non-transparent region 311 of the black matrix 30 may be made of black color metal, black color organic material, or other materials doped with a black pigment. Because these materials have an excellent ability to absorb light, when the light emitted from the fingerprint recognition light source 22 is used for fingerprint recognition, these material may likely absorb the light that is emitted from the fingerprint recognition module 2 and irradiates on the non-transparent regions 311 of the black matrix 30. Thus, the possibility that the light reflected by the gate electrode, the source electrode, and the drain electrode of the thin-film-transistor may irradiate into the fingerprint recognition module 2 may be reduced, and the precision of fingerprint recognition by the fingerprint recognition module 2 may be improved. Typically, the non-transparent region 311 of the black matrix 30 may be made of chromium.

For illustrative purposes, as shown in FIG. 12b, the black matrix 30 may be disposed between the array substrate 10 and the fingerprint recognition module 2. This is only a specific embodiment of the present disclosure. The locations of the black matrix 30 are not limited by the present disclosure.

Figure 13:
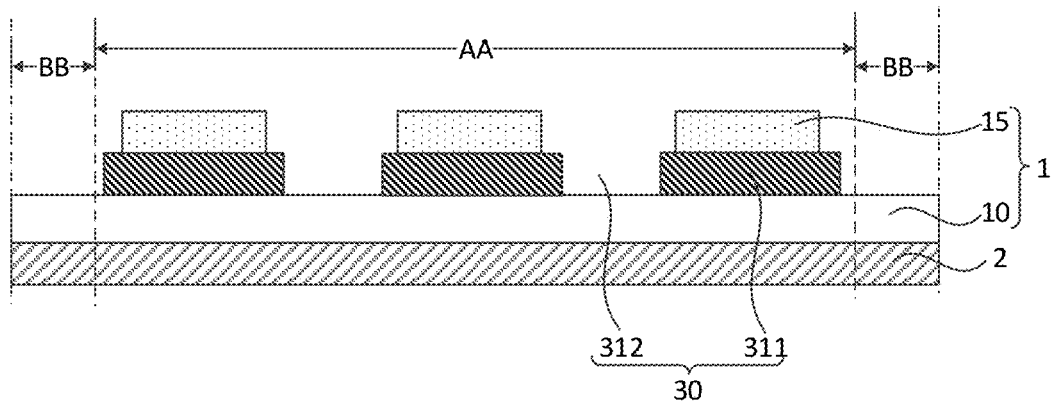
FIG. 13 illustrates a cross-sectional view of another exemplary display panel according to the disclosed embodiments.
Figure 14:
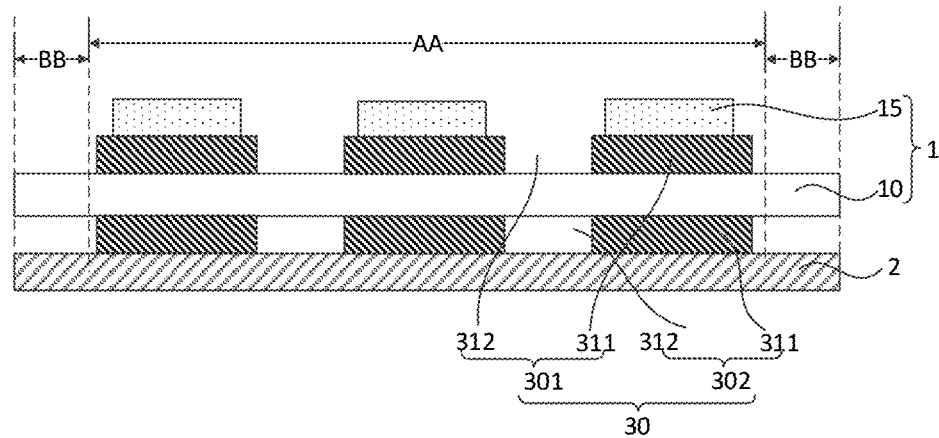
FIG. 14 illustrates a cross-sectional view of another exemplary display panel according to the disclosed embodiments.

FIG. 13 illustrates a cross-sectional view of another exemplary display panel according to the present disclosure. In one embodiment, the black matrix 30 may be disposed between the thin-film-transistors (included in the pixel circuits 15) and the array substrate 10, as shown in FIG. 13. FIG. 14 illustrates a cross-sectional view of another exemplary display panel according to the present disclosure. As shown in FIG. 14, the display panel may include two black matrices 30. A first black matrix layer 301 may be disposed between the thin-film-transistor (included in the pixel circuits 15) and the array substrate 10. A second black matrix layer may be disposed between the array substrate 10 and the fingerprint recognition module 2.

In the actual fabrication process, depending on the market needs, the array substrate 10 may be a rigid substrate, and for example, may be made a quartz or a glass material. Alternatively, the array substrate 10 may be flexible substrate, and for example, may be made of a polyimide material. The typical display panel structure will be described in detail below. However, the examples set forth are merely for illustrative purposes, and will not limit the present disclosure.

Figure 15:
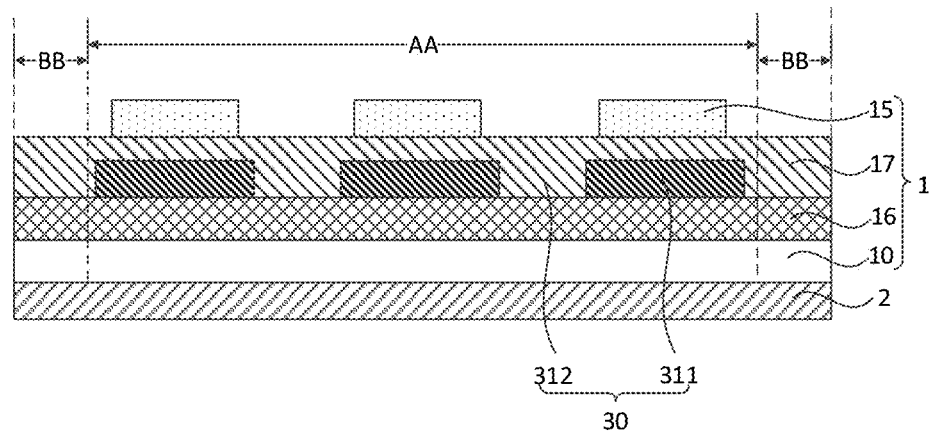
FIG. 15 illustrates a cross-sectional view of another exemplary display panel according to the disclosed embodiments.

FIG. 15 illustrates a cross-sectional view of another exemplary display panel according to the present disclosure. Specifically, referring to FIG. 15, the array substrate 10 in the display panel may be a rigid substrate. The black matrix 30 may be disposed between the thin-film-transistors (included in the pixel circuits 15) and the array substrate 10. The display panel may also include a first planarization layer 16 and a second planarization layer 17. The first planarization layer 16 may be disposed on a surface of the array substrate 10 adjacent to the black matrix 30. The second planarization layer 17 may be disposed on a surface of the black matrix 30 adjacent to the thin-film-transistors (included in the pixel circuits 15). The second planarization layer 17 may cover the non-transparent regions 311 of the black matrix 30, and may fill the transparent regions 312 of the black matrix 30. The array substrate 10 may be made of a quartz or glass material. The array substrate 10 may be used to provide support in the subsequent fabrication process for the pixel circuits 15, and the organic light emitting structures 11, etc.

In practice, due to the factors such as the limitation of the polishing accuracy of the surface of the array substrate 10 and the degree of cleanness of the array substrate 10, minor defects may occur on the array substrate 10. The first planarization layer 16 (disposed on the array substrate 10) may serve the purpose for filling the minor defects on the array substrate 10 and flattening the surface of the array substrate 10.

In the practical fabrication process for the black matrix 30, a film or layer may be deposited only in the non-transparent regions 311 of the black matrix 30 on the array substrate 10. Nothing may be deposited in the transparent regions 312 of the black matrix 30 on the array substrate 10. After the black matrix 30 is formed, the non-transparent regions 311 and the transparent regions 312 of the black matrix 30 may have a difference in thickness. In the subsequent fabrication process, a portion of the layers related to the pixel circuits 15 may be trapped in the transparent regions 312 of the black matrix 30. As such, certain components of the pixel circuits 15 may be shifted near the transparent regions 312 of the black matrix 30. The shift may cause defects in the pixel circuits 15, such as short circuit or open circuit, and may affect the display effect of the display panel.

In present disclosure, the second planarization layer 17 may be deposited near the thin-film-transistors (included in the pixel circuit 15) on the surface of the black matrix 30. The second planarization layer 17 may be used to cover the non-transparent regions 311 of the black matrix 30 and fill the transparent regions 312 of the black matrix 30 in order to eliminate the difference in thickness between the non-transparent regions 311 of the black matrix 30 and the transparent regions 312 of the black matrix 30. Thus, the defects caused by the shift of the certain components of the pixel circuits 15 formed in the subsequent fabrication process may be prevented, and the production yield of display panels may be increased. In one embodiment, the second planarization layer 17 may be deposited to fill only the transparent regions 312 of the black matrix 30.

In practice, the first planarization layer 16 and the second planarization layer 17 may be made of any insulation material. In one embodiment, because polyimide has stable physical and chemical properties, desired electrical insulation, simple fabrication process, and a low cost, the first planarization layer 16 and the second planarization layer 17 may be made of polyimide.

Figure 16:
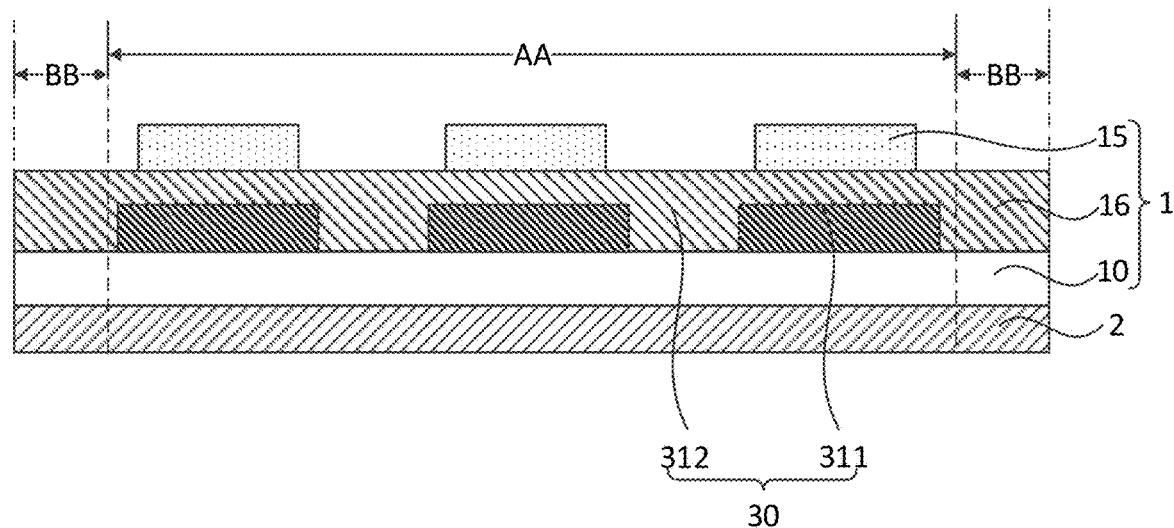
FIG. 16 illustrates a cross-sectional view of another exemplary display panel according to the disclosed embodiments.

FIG. 16 illustrates a cross-sectional view of another exemplary display panel according to the present disclosure. Specifically, referring to FIG. 16, the array substrate 10 in the display panel may be a flexible substrate 10. The black matrix 30 may be disposed between the thin-film-transistors (included in the pixel circuits 15) and the array substrate 10. The display panel may also include a first planarization layer 16. The first planarization layer 16 may be disposed on a surface of the black matrix 30 adjacent to the thin-film-transistors (included in the pixel circuits 15). The first planarization layer 16 may cover the non-transparent regions 311 of the black matrix 30 and fill the transparent regions 312 of the black matrix 30.

Similarly, in the present disclosure, the first planarization layer 16 may be configured on a surface of the black matrix 30 adjacent to the thin-film-transistors (included in the pixel circuits 15). The first planarization layer 16 may used to cover the non-transparent regions 311 of the black matrix 30 and fill the transparent regions 312 of the black matrix 30 in order to eliminate the difference in thickness between the non-transparent regions 311 of the black matrix 30 and the transparent regions 312 of the black matrix 30. Thus, the defects caused by the shift of certain components of pixel circuits 15 formed in the subsequent fabrication process may be prevented, and the production yield of display panels may be increased.

In practice, the array substrate 10 and the second planarization layer 17 may be made of any insulation material. In one embodiment, because polyimide has stable physical and chemical properties, desired electrical insulation, simple fabrication process, and a low cost, the array substrate 10 and the second planarization layer 17 may be made of polyimide.

In the display panel based on the present disclosure provided by various embodiments, the thin-film-transistors of the pixel circuits 15 may have a top-gate structure or a bottom-gate structure. In practice, the gate structure may be determined by the product requirements. The typical structures of display panels are described in detail below. However, the examples set forth are merely for illustrative purposes, and will not limit the present disclosure.

Figure 17:
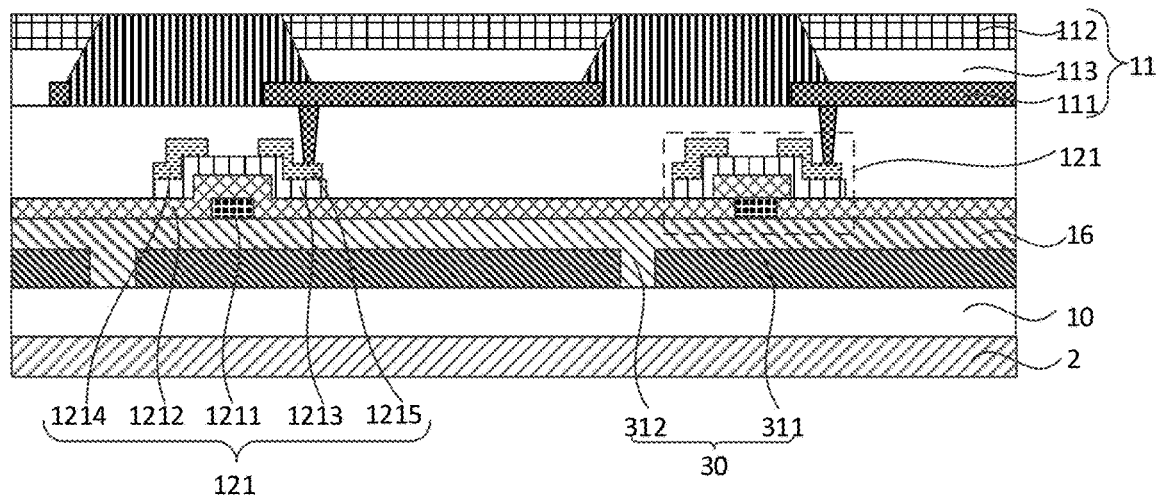
FIG. 17 illustrates a cross-sectional view of another exemplary display panel according to the disclosed embodiments.

FIG. 17 illustrates a cross-sectional view of another exemplary display panel according to the present disclosure. Specifically, referring to FIG. 17, only one thin-film-transistor 121 may be shown in the pixel circuit of the display panel for illustrative purposes. The thin-film-transistor 121 may have a bottom-gate structure, including a gate electrode 1211 formed on the array substrate 10, a first insulating layer 1212 formed on the gate electrode 1211, an active layer 1213 formed on the first insulating layer 1212, and a source electrode 1214 and a drain electrode 1215 formed on the active layer 1213.

Figure 18:
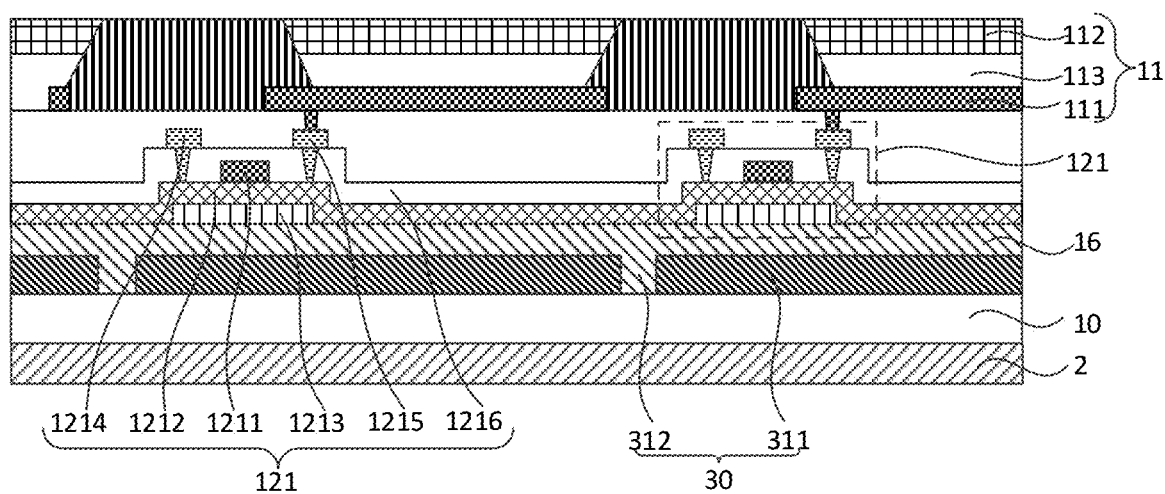
FIG. 18 illustrates a cross-sectional view of another exemplary display panel according to the disclosed embodiments.

FIG. 18 illustrates a cross-sectional view of another exemplary display panel according to the present disclosure. Specifically, referring to FIG. 18, only one thin-film-transistor 121 may be shown in the pixel circuit of the display panel for illustrative purposes. The thin-film-transistor 121 may have a top-gate structure, including an active layer 1213 formed on the array substrate 10, a first insulating layer 1212 formed on the active layer 1213, a gate electrode 1211 formed on the first insulating layer 1212, a second insulating layer 1216 formed on the gate electrode 1211, and a source electrode 1214 and a drain electrode 1215 formed on the second insulating layer 1216.

When the display panel is an organic light emitting display panel as shown in FIG. 17 or FIG. 18, the organic light emitting structure 11 may include a first electrode 111, a second electrode 112, and a light emitting layer 113 disposed between the first electrode 111 and the second electrode 112. In one embodiment, in operation, the first electrode 111 may be an anode, and the second electrode 112 may be a cathode. In another embodiment, the first electrode 111 may a cathode, and the second electrode 112 may be an anode.

Figure 19A:
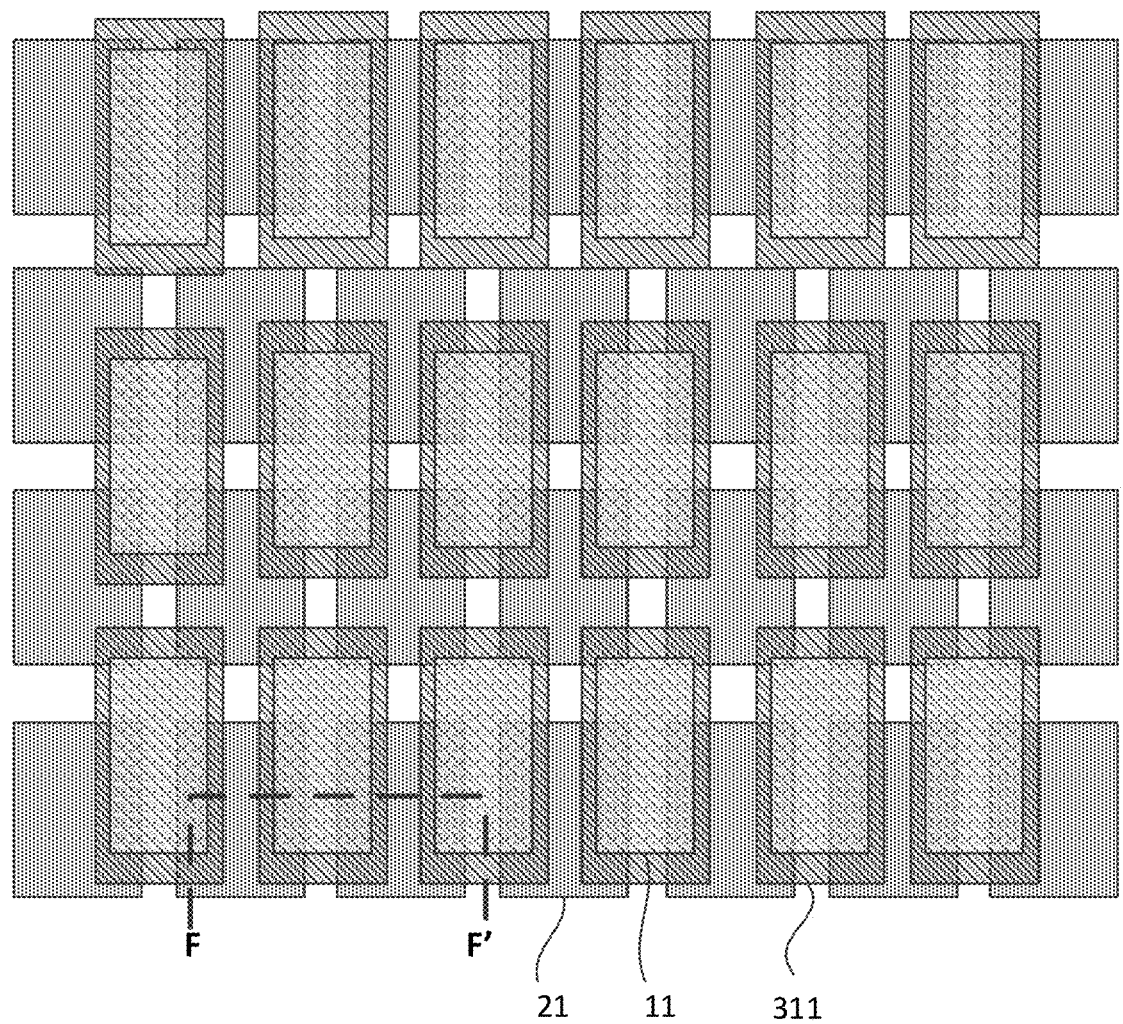
FIG. 19a illustrates a top-down view of another exemplary display panel according to the disclosed embodiments.
Figure 19B:
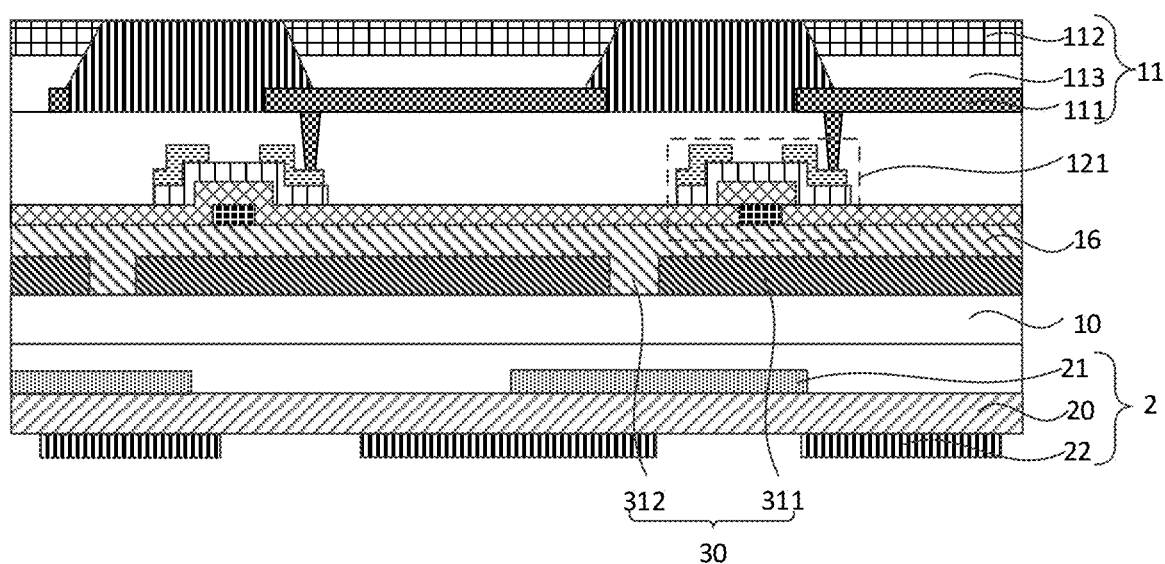

FIG. 19a illustrates a top-down view of another exemplary display panel according to the present disclosure. FIG. 19b illustrates a cross-sectional view along the FF' direction in FIG. 19a. Specifically, referring to FIG. 19a and FIG. 19b, the fingerprint recognition module 2 may include a first substrate 20, and a plurality of independent fingerprint recognition units 21 formed on the first substrate 20. The fingerprint recognition unit 21 may be configured on a side of the first substrate 20 adjacent to the array substrate 10. At least a portion of the orthogonal projection of the fingerprint recognition unit 21 on the array substrate 10 may fall within the orthogonal projection of the transparent region 312 of the black matrix 30 on the array substrate 10.

Having at least a portion of the orthogonal projection of the fingerprint recognition unit 21 on the array substrate 10 fall within the orthogonal projection of the transparent region 312 of the black matrix 30 on the array substrate 10 may have advantages. When the light emitted from the fingerprint recognition light source is used for fingerprint recognition, the shielding effect of the non-transparent regions 311 of the black matrix 30 to the light reflected by the fingerprint of the finger of the user may be reduced. Thus, the light reflected by the fingerprint of the finer of the user may pass through the opening regions or the transparent regions 312 of the black matrix as much as possible to irradiate on the fingerprint recognition units 21, and the signal-to-noise ratio of the fingerprint recognition unit 21 maybe increased.

In one embodiment, the fingerprint recognition light source 22 in the fingerprint recognition module 2 may be a collimated light source or a surface light source. Compared to the surface light source, the collimated light source may reduce the crosstalk caused by the light reflected by the fingerprint of the finger of the user to different fingerprint sensors. Thus, the precision of fingerprint recognition may be improved. However, because the collimated light source may be thicker than the surface light source, the use of the collimated light source may increase the thickness of the display panel.

Further, the black matrix may be configured between the thin-film-transistors and the fingerprint recognition module. The black matrix may include the non-transparent regions and the opening regions configured between the non-transparent regions. The orthogonal projection of the gate electrode, the source electrode, and the drain electrode of the thin-film-transistor on the first substrate may fall within the orthogonal projection of the corresponding non-transparent region on the first substrate. When the light emitted from the fingerprint recognition light source is used for fingerprint recognition, the non-transparent regions of the black matrix may block the light emitted from the fingerprint recognition module, reduce the light reflection by the gate electrode, the source electrode, and the drain electrode of the thin-film-transistor, minimize the possibility that the light reflected by the gate electrode, the source electrode, and the drain electrode may enter into the fingerprint recognition module, and reduce the noise or crosstalk caused by a portion of the reflected light that enters into the fingerprint recognition module. In addition, the opening regions may be configured on the black matrix. The light emitted from the fingerprint recognition module may be allowed to pass through the opening regions to irradiate on the finger pressed by the user on the display panel. The light reflected by the fingerprint of the finger of the user may be allowed to pass through the opening regions. The configuration may increase the signal-to-noise ratio of the fingerprint recognition module, and may improve the precision of fingerprint recognition by the fingerprint recognition module.

Figure 20A:
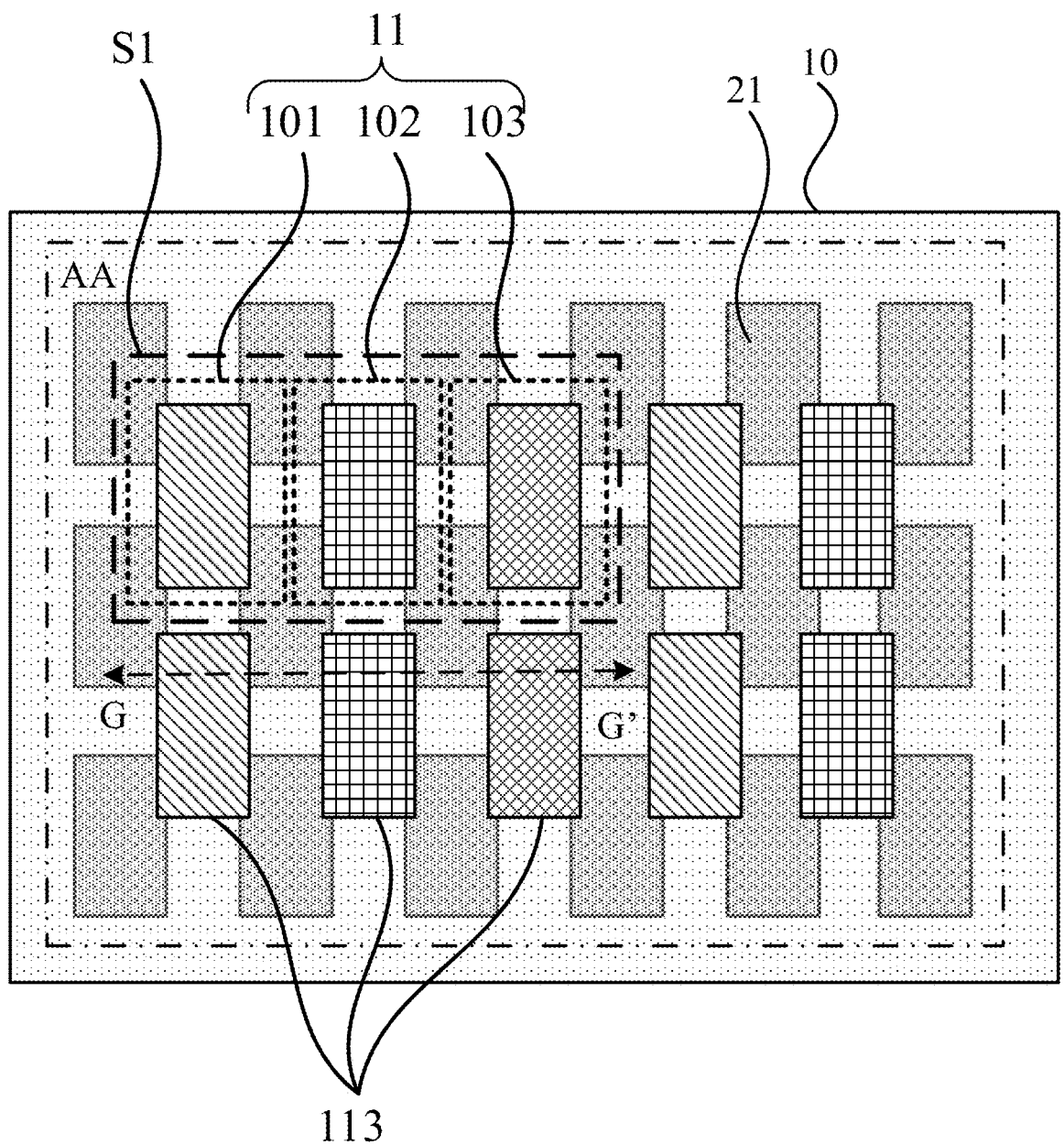
FIG. 20a illustrates a top-down view of another exemplary display panel according to the disclosed embodiments.
Figure 20B:
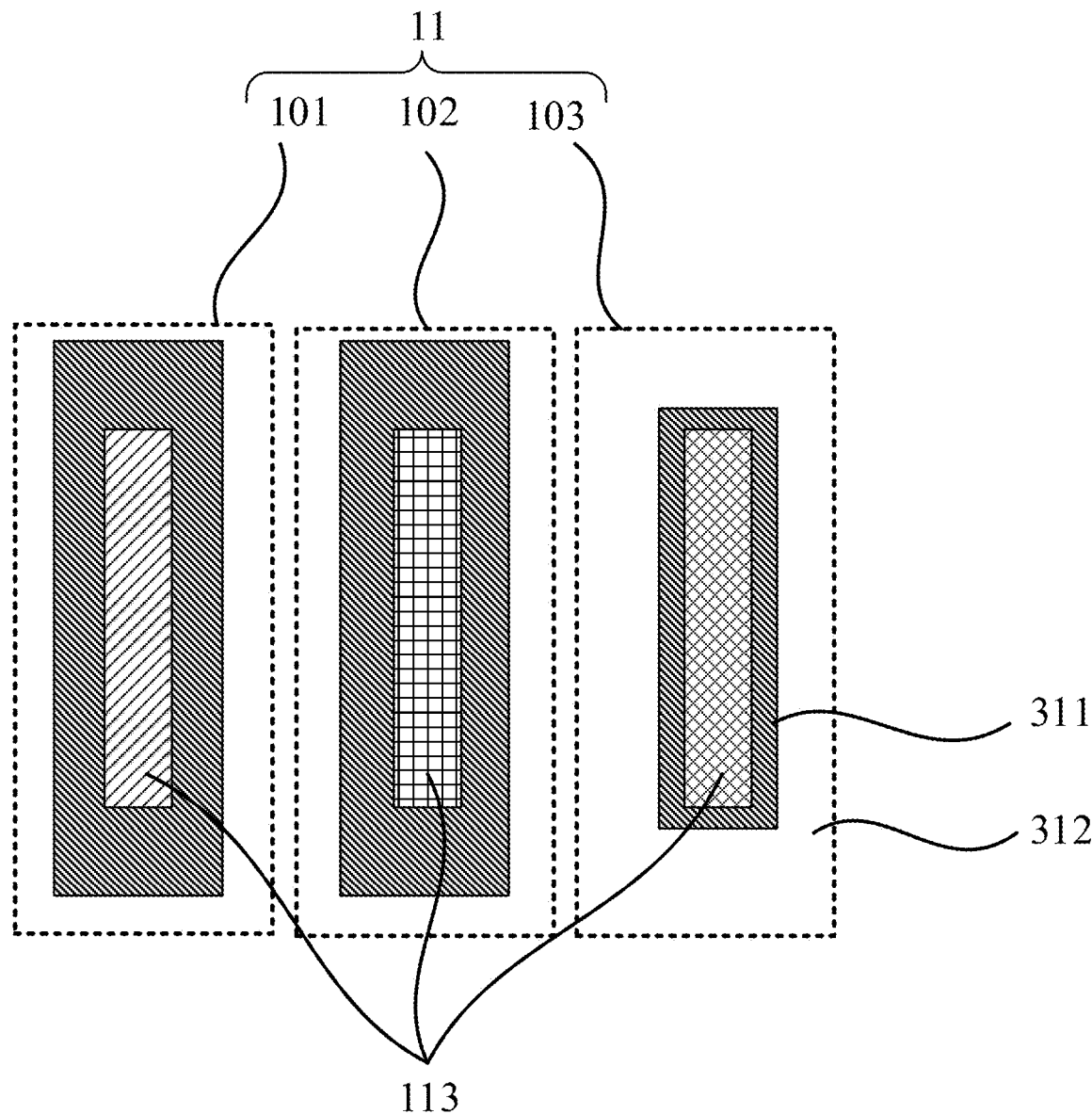
Figure 20C:
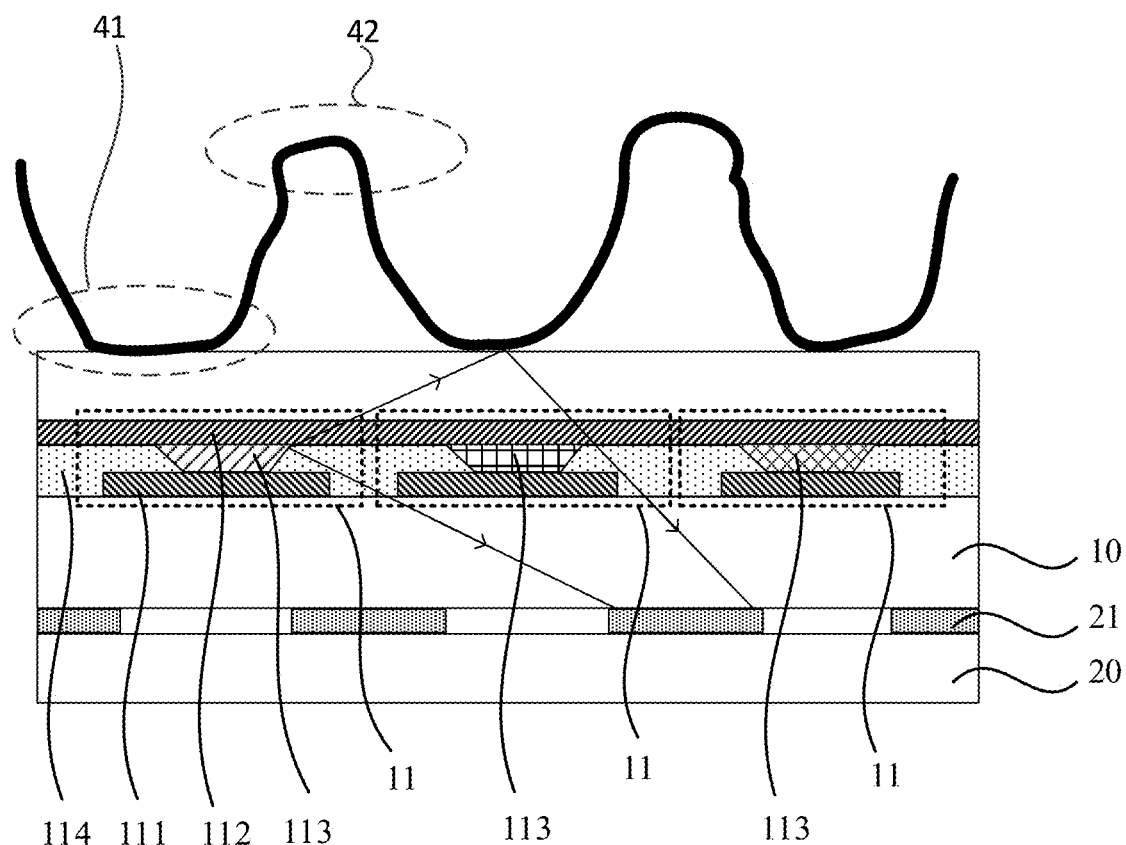

FIG. 20a illustrates a top-down view of another exemplary display panel according to the present disclosure. FIG. 20b illustrates an enlarged view of S1 area in FIG. 20a. FIG. 20c illustrates a cross-sectional view along the GG' direction in FIG. 20a. Referring to FIG. 20a, FIG. 20b, and FIG. 20c, when the light emitted from the organic light emitting structure 11 is used for fingerprint recognition, the display panel provided by the present disclosure may include an array substrate 10, a plurality of organic light emitting structures 11, and at least one fingerprint recognition unit 21.

The plurality of the organic light emitting structures 11 may be configured on the array substrate 10. The fingerprint recognition unit 21 may be configured in the display region AA on a side of the organic light emitting structure 11 adjacent to the array substrate 10. The fingerprint recognition unit 21 may recognize fingerprints based on the light reflected by the touch object (e.g., finger) 4 to the fingerprint recognition unit 21. The organic light emitting structure 11 may include a red organic light emitting structure 101, a green organic light emitting structure 102, and a blue organic light emitting structure 103. The light emitted from the red organic light emitting structure 101, or the green organic light emitting structure 102 may be used as the light source for the fingerprint recognition unit 21. As the light source for the fingerprint recognition unit 21, the light emitting area on the light emitting side facing away from the display panel for the red organic light emitting structure 101 or the green organic light emitting structure 102 may be smaller than the light emitting area on the light emitting side facing away from the display panel for the blue organic light emitting structure 103.

The present disclosure does not limit the number of the organic light emitting structures 11, or the arrangement of the red organic light emitting structure 101, the green organic light emitting structure 102, and the blue organic light emitting structure 103 in the organic light emitting structure 11.

Referring to FIG. 20b and FIG. 20c, each organic light emitting structure 11 may include a first electrode 111, a light emitting layer 113, and a second electrode 112 sequentially in the direction of the organic light emitting structures 11 facing away from the array substrate 10. The organic light emitting structure 11 may include a red organic light emitting structure 101, a green organic light emitting structure 102, and a blue organic light emitting structure 103. The organic light emitting structure 11 may include a light emitting layer 113. The light emitting layer 113 may have a transparent region 312 and a non-transparent region 311 in the direction of the light emitting side facing away from the display panel.

The light emitting layer 113 may include a first auxiliary function layer, a light emitting material layer, and a second auxiliary function layer. The first auxiliary function layer may be a hole-type auxiliary function layer, and may have a multilayer structure. For example, the first auxiliary function layer may include one or more of a hole injection layer, a hole transport layer, and an electron blocking layer. The second auxiliary function layer may be an electron-type auxiliary function layer, and may have a multilayer structure. For example, the second auxiliary function layer may include one or more of an electron transport layer, an electron injection layer, and a hole blocking layer.

Under the external electric field, electrons and holes may be injected from the second electrode 112 and the first electrode 111 into the light emitting material layer of the light emitting layer 113, and may be recombined to generate excitons. Under the external electric field, the excitons may diffuse, transfer energy to the light emitting molecules in the light emitting material layer, and excite electrons to transition from the ground state to the excited state. The excited state energy may be released through radiation transition, resulting in light. In one embodiment, the first electrode 111 may be an anode, and the second electrode 112 may be a cathode. In other embodiments, the first electrode 111 may be a cathode, and the second electrode 112 may be an anode. The electrode configuration is not limited by the present disclosure.

The display panel provided by the present disclosure may include a plurality of organic light emitting structures and at least one fingerprint recognition unit. The organic light emitting structure may include a red organic light emitting structure, a green organic light emitting structure, and a blue organic light emitting structure. When the light emitted from the organic light emitting structure is used for fingerprint recognition, the red organic light emitting structure, the green organic light emitting structure, and the blue light emitting structure may emit light as usual in the light emitting display phase. In the fingerprint recognition phase, because the light emitted from the blue organic light emitting structure has a relatively shorter wavelength, and the layers (such as organic insulation layer, inorganic insulation layer, polarizer layer, etc.) in the display panel have stronger absorption for light with shorter wavelength, the light emitted from the blue organic light emitting structure may have a lower transmittance, and the light emitted from the red organic light emitting structure or the green organic light emitting structure may be used as the light source for the fingerprint recognition unit.

Configured as the light source for the fingerprint recognition unit, the red organic light emitting structure or the green organic light emitting structure may have a light emitting area on the light emitting side facing away from the display panel smaller than the light emitting area on the light emitting side facing away from the display panel for the blue organic light emitting structure. Because the organic light emitting structure as the light source has a smaller light emitting area, stray light that is not reflected by the touch object (e.g., finger) but directly irradiates on the fingerprint recognition unit may be minimized. Because the only the light that is reflected by the touch object carries the fingerprint information, and the light (stray light) that is not reflected by the touch object and directly irradiates on the fingerprint recognition unit does not carry any fingerprint information, the present disclosure may improve the precision of fingerprint recognition by minimizing the stray light as well as the noise in fingerprint detection.

In one embodiment, referring to FIG. 20c, the display panel may also include a first substrate 20. The first substrate 20 may be disposed on a side of the array substrate 10 facing away from the organic light emitting structure 11. The fingerprint recognition unit 21 may be disposed between the array substrate 10 and the first substrate 20. The fingerprint recognition unit 21 and the first substrate 20 may be a part of the fingerprint recognition module. The fingerprint recognition module may also include a plurality of metal connecting lines and IC driver circuit (not shown).

In one embodiment, referring to FIG. 20b and FIG. 20c, each organic light emitting structure may include a first electrode 111, a light emitting layer 113, and a second electrode 112 sequentially arranged in a direction of the organic light emitting structure 11 facing away from the array substrate 10. The first electrode 11 may be a reflective electrode. For example, a reflective electrode may be configured sequentially with an indium tin oxide conductive film, a reflective electrode layer (Ag), and another indium tin oxide conductive film. The indium tin oxide conductive film may be made of high work function material, which is suitable for hole injection.

A pixel defining layer 114 may be formed between the light emitting layer 113 of the red organic light emitting structure 101, the light emitting layer 113 of the green organic light emitting structure 102, and the light emitting layer 113 of the blue organic light emitting structure 103. As shown in FIG. 20b and FIG. 20c, in one embodiment, both the red organic light emitting structure 101 and the green organic light emitting structure 102 may be used as the light source for fingerprint recognition. The area of the first electrode 111 of the red organic light emitting structure 101 and the green organic light emitting structure 102 may be greater than the area of the first electrode 111 of the blue organic light emitting structure 103.

The light emitted from the light emitting layer 113 of the organic light emitting structure 11 toward the array substrate 10 may be blocked by the first electrode 111 configured between the light emitting layer 113 and the fingerprint recognition unit 21. The reflective electrodes of the red organic light structure 101 and the green organic light emitting structure 102 as the light source for the fingerprint recognition unit 21 may extend further than the existing technology. Thus, the stray light that irradiates on the fingerprint recognition unit 21 may be blocked, and the precision of fingerprint recognition may be improved. In other words, the area of the reflective electrode for the blue organic light emitting structure 103 may remain the same as the existing technology. The reflective electrodes of the red organic light emitting structure 101 and the green organic light emitting structure 102 may be increased as compared to the existing technology in order to block the stray light.

In addition, the reflective electrode may be near or in contact with the light emitting function layer. The light emitting from the light emitting function layer toward the array substrate may be close to the edge of the reflective electrode. Therefore, it is possible to extend the reflective electrode by a certain distance to block the emitted from the light emitting function layer from irradiating on the fingerprint recognition unit. When the reflective electrode extends to certain extent, the stray light that may irradiate on the fingerprint recognition unit may be completely blocked. Thus, the precision of fingerprint recognition may be substantially improved.

In one embodiment, referring to FIG. 20b and FIG. 20c, when the light emitted from the organic light emitting structure is used for fingerprint recognition, the organic light emitting structure 11 as the light source for the fingerprint recognition unit may have a ratio of the area of the first electrode 111 over the light emitting layer 113 within the range approximately of 1.2 to 6. The organic light emitting structure 11 not as the light source for the fingerprint recognition unit may have a ratio of the area of the first electrode 111 over the light emitting layer 113 within the range approximately of 1 to 1.2.

For illustrative purposes, referring to FIG. 20b and FIG. 20c, the red organic light emitting structure 101 and the green organic light emitting structure 102 may be used as the light source for the fingerprint recognition unit. The non-transparent region 311 as shown in FIG. 20b may be the same as the orthogonal projection of the first electrode 111 of the organic light emitting structure 11 on the array substrate 10. Therefore, the ratio of the area of the non-transparent region 311 (i.e., the area of the first electrode 111) in the red organic light emitting structure 101 and the green organic light emitting structure 102 over the area of the light emitting layer 113 may be greater than the ratio of the area of the non-transparent region 311 in the blue organic light emitting structure 103 over the area of the light emitting layer 113. When the ratio of the area of the first electrode of the organic light emitting structure which is the light source for the fingerprint recognition unit over the area of the light emitting function layer may be configured to be in the range approximately of 1.2 to 6, the first electrode may effectively block the light emitted from the light emitting function layer from directly irradiating on the fingerprint recognition unit. That is, the stray light may be effectively blocked, and the noise of fingerprint detection may be minimized. Thus, the precision of fingerprint recognition may be improved.

The greater the ratio of the area of the first electrode in the organic light emitting structure that is used as the light source for the fingerprint recognition unit over the area of the light emitting function layer is, the more effective the first electrode may block the stray light. When the ratio of the area of the first electrode in the organic light emitting structure that is used as the light source for the fingerprint recognition unit over the area of the light emitting function layer is approximately 6, the first electrode may block the majority of the stray light, and the precision of fingerprint recognition may be substantially improved.

Figure 20D:
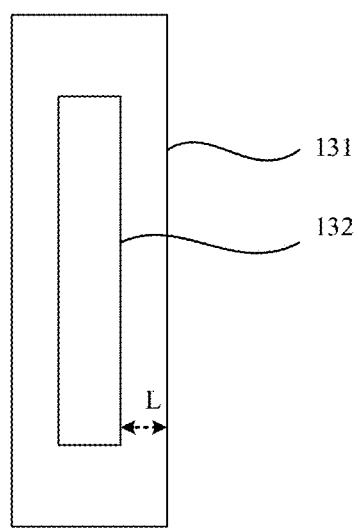
FIG. 20d illustrates a schematic view of an exemplary distance range between a first closed loop and a second closed loop according to the disclosed embodiments.

In one embodiment, referring to FIG. 20c and FIG. 20d, when the light emitted from the organic light emitting structure is used for fingerprint recognition, the orthogonal projection on the array substrate 10 of the boundary of the first electrode 111 in the organic light emitting structure 11 that is used as the light source for the fingerprint recognition unit 21 may form a first closed loop 131. The orthogonal projection on the array substrate 10 of the boundary of the light emitting layer 113 may form a second closed loop 132.

FIG. 20d illustrates a schematic view of an exemplary distance range between a first closed loop and a second closed loop according to the present disclosure. Referring to FIG. 20d, the first close loop 131 may surround the second closed loop 132. For a point on the first closed loop 131, a corresponding point on the second closed loop 132 may exist where a distance between the two points is a shortest distance L. The distance range between the first closed loop 131 and the second closed loop 132 may be a set of the shortest distances L for all the points on the first closed loop 131.

In one embodiment, the distance range between the first closed loop 131 and the second closed loop 132 may be approximately 3 μm to 30 μm. The distance range between the first closed loop 131 and the second closed loop 132 may represent the degree of extension in any direction within the plane where the first electrode is located. When the distance range between the first closed loop 131 and the second closed loop 132 is approximately 3 μm to 30 μm, the first electrode may effectively block stray light. Thus, the precision of fingerprint recognition may be improved.

Figure 20E:
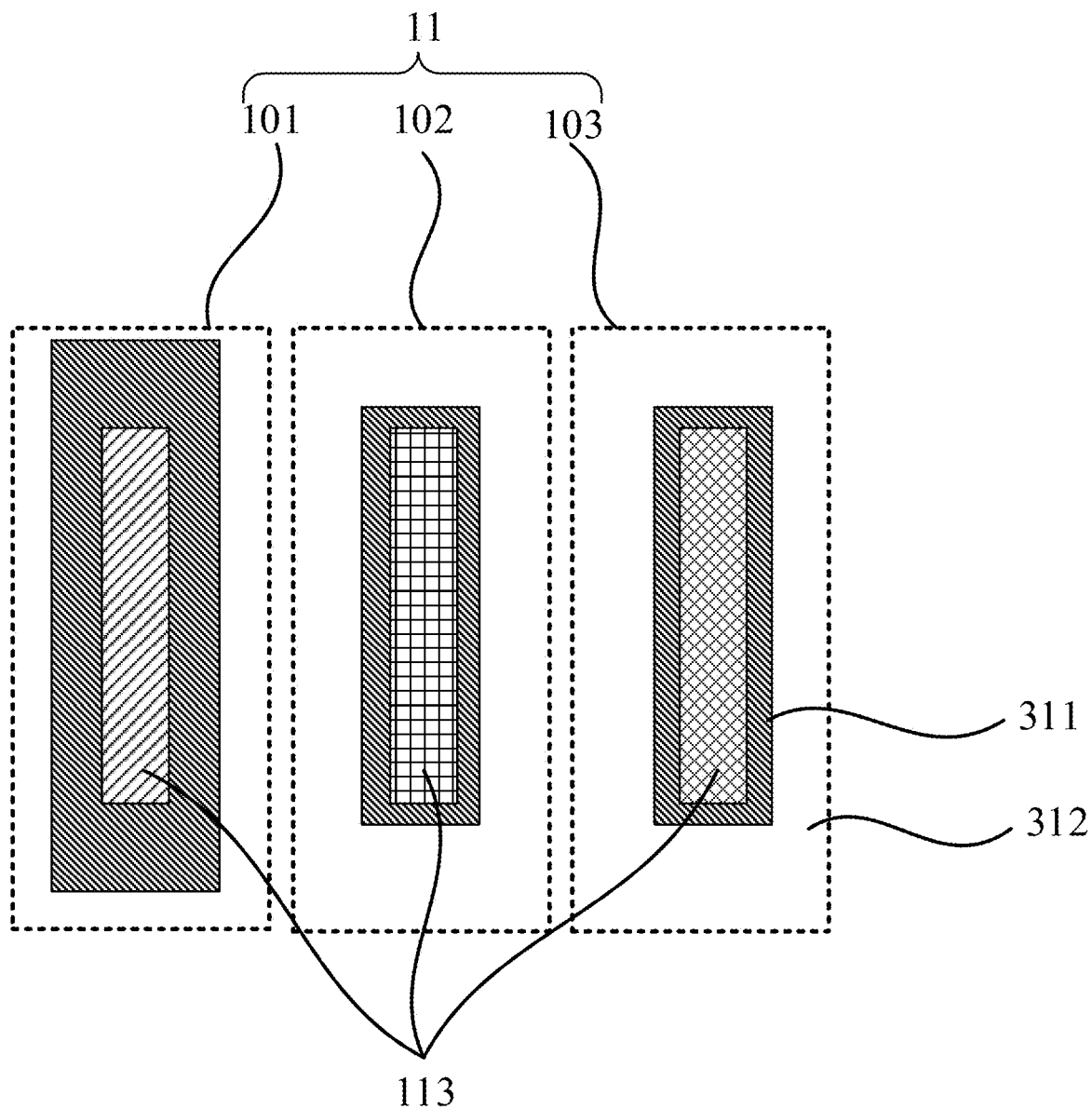

FIG. 20e illustrates another enlarged view of S1 area in FIG. 20a. As shown in FIG. 20e, when the light emitted from the organic light emitting structure 11 is used for fingerprint recognition, the light emitting area of the light emitting side facing away from the display panel for the red organic light emitting structure 101 that is used as the light source for the fingerprint recognition unit 21 may be smaller than the light emitting area of the light emitting side facing away from the display panel for the blue organic light emitting structure 103, and the light emitting area of the light emitting side facing away from the display panel for the red organic light emitting structure 101 that is used as the light source for the fingerprint recognition unit 21 may be smaller than the light emitting area of the light emitting side facing away from the display panel for the green organic light emitting structure 102.

Because only the red organic light emitting structure 101 is used for fingerprint recognition, only the light emitted from the light emitting side facing away from the display panel for the light emitting function layer in the red organic light emitting structure 101 may need to be blocked. For example, only the first electrode in the red organic light emitting structure 101 may need to be extended. No additional configuration may be necessary for the green organic light emitting structure 102 and the blue organic light emitting structure 103. The light emitting area for the green organic light emitting structure 102 and the blue organic light emitting structure 103 maybe greater than the light emitting area for the red organic light emitting structure 101. Thus, the configuration may not only ensure the precision of fingerprint recognition, but also ensure sufficient light emitting area that allows the light reflected by the touch object 4 (e.g., finger) to pass through such that the signal light intensity detected by the fingerprint recognition unit may be increased.

In addition, the operating voltage for the red organic light emitting structure 101 may be appropriately increased to increase the intensity of the light emitted from the light source such that the signal light intensity detected by the fingerprint recognition unit may be increased. In certain other embodiments, the green organic light emitting structure 102 may be configured as the light source for fingerprint recognition. The light emitting area of the light emitting side facing away from the display panel for the green organic light emitting structure 102 may be smaller than the light emitting area of the light emitting side facing away from the display panel for the blue organic light emitting structure 103, and the light emitting area of the light emitting side facing away from the display panel for the green organic light emitting structure 102 may be smaller than the light emitting area of the light emitting side facing away from the display panel for the red organic light emitting structure 101.

Figure 21:
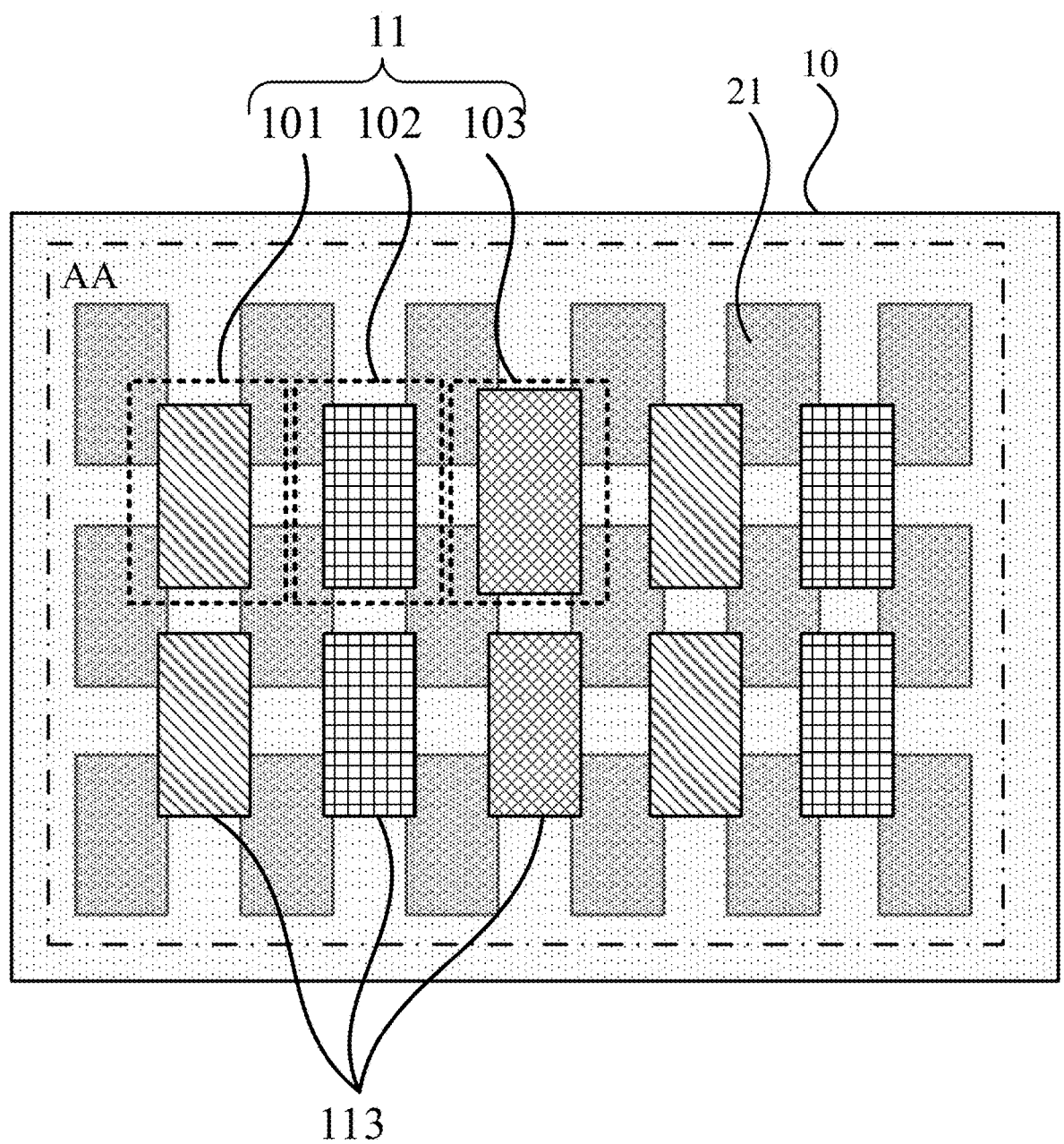
FIG. 21 illustrates a top-down view of another exemplary display panel according to the disclosed embodiments.

FIG. 21 illustrates a top-down view of another exemplary display panel according to the present disclosure. In one embodiment, as shown in FIG. 21, when the light emitted from the organic light emitting structure 11 is used for fingerprint recognition, the area of the light emitting layer for the blue organic light emitting structure 103 may be greater than the area of the light emitting layer for the red organic light emitting structure 101, and the area of the light emitting layer for the blue organic light emitting structure 103 may be greater than the area of the light emitting layer for the green organic light emitting structure 102.

Because the lifespan of the material for the light emitting layer in the blue organic light emitting structure 103 is shorter than the lifespan of the material for the light emitting layer in the red organic light emitting structure 101, the area of the light emitting layer in the blue organic light emitting structure 103 may be enlarged such that the light emitting layer in the blue organic light emitting structure 103 may operate at a lower operating voltage. For illustrative purposes, the operating voltage for the light emitting layer in the red organic light emitting structure 101 and the green organic light emitting structure 102 may be 3V. The operating voltage for the light emitting layer in the blue organic light emitting structure 103 may be 2V such that the lifespan of the blue organic light emitting structure 103 may be extended. Thus, a uniform and balanced lifespan of the red organic light emitting structure 101, the green organic light emitting structure 102, and the blue organic light emitting structure 103 may be achieved, and the lifespan of the entire display panel may be extended.

Figure 22:
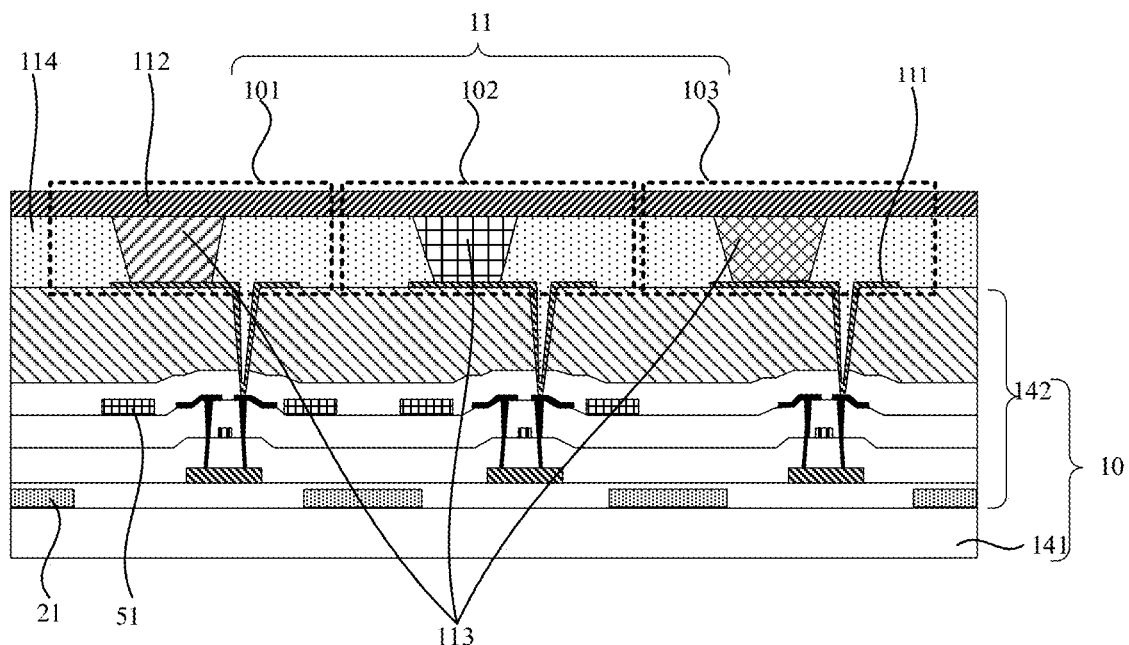
FIG. 22 illustrates a cross-sectional view of another exemplary display panel according to the disclosed embodiments.

FIG. 22 illustrates a cross-sectional view of another exemplary display panel according to the present disclosure. In one embodiment, referring to FIG. 22, when the light emitted from the organic light emitting structure 11 is used for fingerprint recognition, the array substrate 10 may also include a plurality of light shielding pads 51. The light shielding pad 51 may be disposed between the organic light emitting structure 11 that is used as the light source for the fingerprint recognition unit 21 and the fingerprint recognition unit 21. Each organic light emitting structure 11 may have a first electrode 111, a light emitting layer 113 and a second electrode 112 sequentially arranged in a direction of the organic light emitting structure 11 facing away from the array substrate 10.

The first electrode 111 may be a reflective electrode. The area of the combined orthogonal projection on the array substrate 10 of the first electrode 111 in the organic light emitting structure 11 that is used as the light source for the fingerprint recognition unit 21 and the light shielding pad 51 may be greater than the area of the orthogonal projection on the arrays substrate 10 of the first electrode 111 in the organic light emitting structure 11 that is not used as the light source for the fingerprint recognition unit 21. The combined orthogonal projection on the array substrate 10 of the first electrode 11 and the light shielding pad 51 may be the orthogonal projection on the arrays substrate 10 of the first electrode 111 combined with the orthogonal projection on the array substrate 10 of the light shielding pad 51. Specifically, when A and B are sets, the union of A and B is the set of all elements in A, all elements in B, and no other element.

In one embodiment, referring to FIG. 22, the orthogonal projection on the array substrate 10 of the boundary of the first electrode 111 in the organic light emitting structure 11 that is used as the light source for the fingerprint recognition unit 21 may fall within the orthogonal projection on the array substrate 10 of the light shielding pad 51. The effect of the configuration may be equivalent to extending the reflective electrode. In other word, the area of the reflective electrode in the blue organic light emitting structure 103 may remain unchanged. The area of the reflective electrode in the red organic light emitting structure 101 and the green organic light emitting structure 102 may be extended beyond the existing technology to block stray light. Thus, the embodiments provided by the present disclosure may effectively prevent stray light from irradiating on the fingerprint recognition unit.

In one embodiment, referring to FIG. 22, the array substrate 10 may include a second substrate 141 and a plurality of pixel driver circuits 142 disposed on the second substrate 141. The pixel driver circuits 142 may include data lines, scanning lines, and capacitor metal plates (not shown in FIG. 22). The light shielding pads 51 may be coplanar with the data lines, the scanning lines, or the capacitor metal plates to simplify the fabrication process. The display panel may not need an extra metal layer forming step in the fabrication process for the light shielding pads 51. Thus, the fabrication efficiency may be increased, and the production cost maybe reduced.

The light shielding pad 51 may be made of metallic materials or nonmetallic materials that shield light. In the present disclosure, the light shielding pads 51 may be used to prevent stray light from irradiating on the fingerprint recognition unit such that the precision of fingerprint recognition may be improved.

For example, the reflective electrode of the organic light emitting structure that is used as light source for fingerprint recognition may be extended, and at the same time, the pixel driver circuits may be configured to block a portion of stray light. The reflective electrode of the organic light emitting structure that is used as light source for fingerprint recognition may be extended, and at the same time, the light shielding pad may be configured to block a portion of stray light. The light shielding pad may be configured to block a portion of stray light, and at the same time, the pixel driver circuit may be configured to block a portion of stray light. The reflective electrode of the organic light emitting structure that is used as light source for fingerprint recognition may be extended such that the pixel driver circuit may block a portion of stray light, and at the same time, the light shielding pad may be configured to block a portion of stray light.

The present disclosure also provides a display panel. The display panel may include a display module, a fingerprint recognition module, and a light source. The display module may include an array substrate and a first polarizer layer disposed on the arrays substrate. The light emitting side of the display module may be located on a side of the first polarizer layer facing away from the array substrate. The fingerprint recognition module may be disposed on a side of the array substrate facing away from the first polarizer layer. The fingerprint recognition module may include a fingerprint recognition unit and a second polarizer layer disposed on a side of the fingerprint recognition unit adjacent to the display module. The light source may be disposed on a light emitting side of the first polarizer layer facing away from the display module. The fingerprint recognition unit may be used to recognize fingerprints based on the fingerprint signal light that is formed when the light emitted from the light source is reflected by the touch object to the fingerprint recognition unit. The first polarizer layer and the second polarizer layer may be coordinated to incur no loss in the fingerprint signal light that passes through the first polarizer layer and the second polarizer layer. The second polarizer layer may be used to reduce the intensity of the fingerprint noise light. The fingerprint noise light may be the light other than the fingerprint signal light.

In the present disclosure, a first polarizer layer may be configured on a light emitting side of the array substrate adjacent to the display module. The fingerprint recognition module may be configured on a side of the array substrate facing away from the first polarizer layer. The fingerprint recognition module may include a fingerprint recognition unit and a second polarizer layer disposed on a side of the fingerprint recognition unit adjacent to the display module. In the fingerprint recognition phase, the light emitted from the light source located on a side of the polarizer layer facing away from the display module may be reflected by the touch object pressed on the touch-control display screen to form a fingerprint signal light.

At this point, the first polarizer layer and the second polarizer layer may be coordinated to incur no loss in the fingerprint signal light that passes through the first polarizer layer and the second polarizer layer. At the same time, before the light (fingerprint noise light) that is not reflected by the touch object reaches the fingerprint recognition unit, the second polarizer layer may attenuate the intensity of the fingerprint noise light. Thus, the crosstalk by the fingerprint noise light may be reduced, the sign-to-noise ratio may be increased, and the precision of fingerprint recognition by the fingerprint recognition module may be improved.

In certain embodiments, the fingerprint noise light may include a portion of light leaked from the side of the organic light emitting structure in the display module pointing toward the fingerprint recognition module, and a portion of light emitted from the external light source and reflected by the metals (e.g., gate electrodes, the source electrodes, and the drain electrodes of the thin-film-transistors, and metal signal lines) in the display module.

With respect to the light leaked from the side of the organic light emitting structure in the display module pointing toward the fingerprint recognition module, the second polarizer layer may be a linear polarizer layer or a circular polarizer layer, and may reduce the intensity of the fingerprint noise light by half. With respect to the light reflected by the metals in the display module, the second polarizer layer may be a circular polarizer layer, and may completely eliminate the fingerprint noise light.

In one embodiment, when the second polarizer layer is a linear polarizer layer, in order to let the fingerprint signal light pass the first polarizer layer and the second polarizer layer without any intensity attenuation, the first polarizer layer may be a linear polarizer layer that has a polarization direction consistent with the second polarizer layer. When the second polarizer layer is a circular polarizer layer, in order to let the fingerprint signal light pass the first polarizer layer and the second polarizer layer without any intensity attenuation, the first polarizer layer may be a circular polarizer layer that matches the second polarizer layer.

Figure 23:
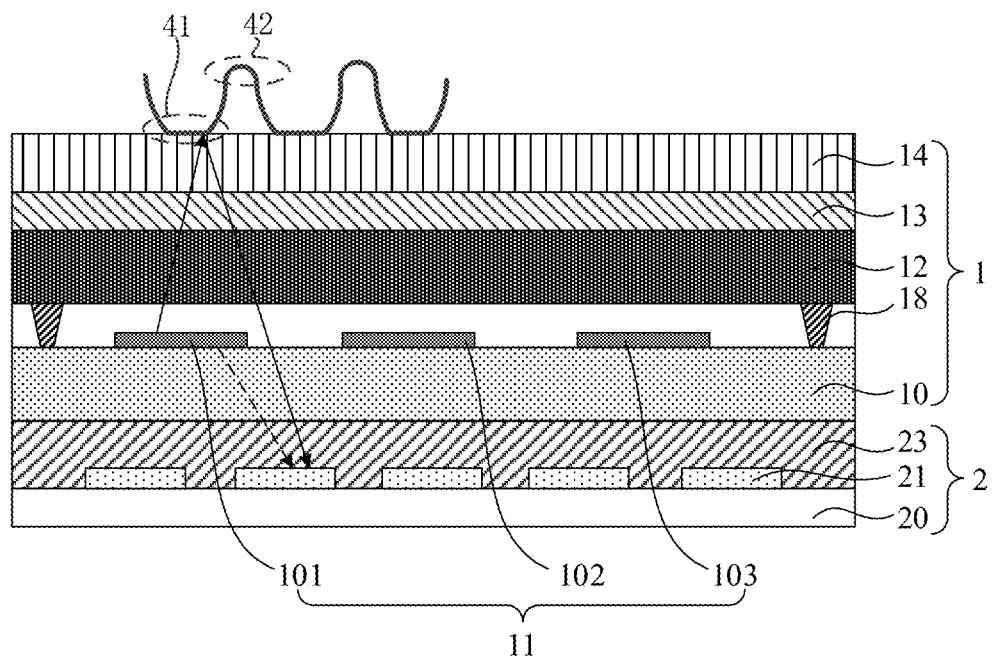
FIG. 23 illustrates a cross-sectional view of another exemplary display panel according to the disclosed embodiments.

FIG. 23 illustrates a cross-sectional view of another exemplary display panel according to the present disclosure. As shown in FIG. 23, the display panel according to the present disclosure may include a display module 1 and a fingerprint recognition module 2. The display module 1 may include an array substrate 10, and a first polarizer layer 13 disposed on the array substrate 10. The light emitting side of the display module 1 may be located on a side of the first polarizer layer 13 facing away from the array substrate 10. The fingerprint recognition module 2 may be located on a side of the array substrate 10 facing away from the first polarizer layer 13, and may include a fingerprint recognition unit 21 and a second polarizer layer 23 disposed on a side of the fingerprint recognition unit 21 adjacent to the display module 1.

The fingerprint recognition unit 21 may be used to recognize fingerprints based on the fingerprint signal light that is formed when the light emitted from the light source is reflected by the touch object to the fingerprint recognition unit 21. The display module 1 may also include an organic light emitting structure 11 disposed between the array substrate 10 and the polarizer layer 13, which generates the light to display images. In one embodiment, referring to FIG. 23, the organic light emitting structure 11 may include a red organic light emitting structure 101, a green organic light emitting structure 102, and a blue organic light emitting structure 103.

In one embodiment, the light emitted from the organic light emitting structure 11 may be used for fingerprint recognition. For illustrative purposes, a plurality of organic light emitting structures 11 and a plurality of fingerprint recognition units 21 may be arranged in arrays. The fingerprint recognition unit 21 may be configured in coordination with the organic light emitting structure 11. As a light source, one organic light emitting structure 11 may emit light that may be received by one or more fingerprint recognition units 21 configured in coordination with the organic light emitting structure 11.

The organic light emitting structure 11 may be the light source for image display, or the light source for fingerprint recognition. In either the display phase or the fingerprint recognition phase, the organic light emitting structure 11 may emit light. In certain embodiments, in the display phase, the entire organic light emitting structure 11 may be driven by light emitting driver signal. In the fingerprint recognition phase, only part of the organic light emitting structure 11 may be driven by light emitting driver signal. Therefore, the display module 1 according to the present disclosure may include a first display driver circuit (not shown) for providing the driver signal in the fingerprint recognition phase to drive at least a portion of the organic light emitting structure 11 to emit light to serve as the light source for the fingerprint recognition module 2.

For illustrative purposes, because the light emitted from the blue organic light emitting structure has shorter wavelength, and the layers (e.g., organic insulation layer, inorganic insulation layer, and polarizer layer, etc.) in the display panel attenuates more substantially the light with shorter wavelength, the light emitted from the blue organic light emitting structure may have a lower transmittance, and may be more likely to absorbed by the touch-control display panel. Moreover, the lifespan of the material for the blue organic light emitting structure may be shorter than the lifespan of the material for the red organic light emitting structure and the green organic light emitting structure. In the fingerprint recognition phase, the first display driver circuit may provide the driver signal to drive at least one of the red organic light emitting structure and the green organic light emitting structure.

In one embodiment, the display panel according to the present disclosure may also include a touch-control function layer. As long as the touch position can be detected, the structure and the position of the touch-control function layer are not limited by the present disclosure. After the finger touch position is detected, in the fingerprint recognition phase, the first display driver circuit may provide the driver signal to drive the organic light emitting structure in the region corresponding to the finger touch position to emit light.

In one embodiment, the polarizer layer 13 may be a first linear polarizer layer, and the second polarizer layer 23 may be a second linear polarizer layer. The first linear polarizer layer and the second linear polarizer layer may have a same polarization direction.

As shown in FIG. 23, the optical path in solid line may represent the light emitted from the light emitting side of the organic light emitting structure 11 and the fingerprint signal light reflected by the touch object. The optical path in the dashed line may represent the light leaked from the organic light emitting structure 11 toward the fingerprint recognition module 2. The organic light emitting structure may be, for example, the red organic light emitting structure 101. The emitted light may pass the first polarizer layer 13 to become a linearly polarized light. After the linearly polarized light is reflected by the touch object, the light (now the fingerprint signal light) may be still a linearly polarized light having the same polarization direction. The light may pass through the first polarization layer 13 again without attenuation. When the fingerprint signal light passes through the second polarizer layer 23, because the second polarizer layer 23 has a polarization direction consistent with the polarization direction of the first polarizer layer 13, the fingerprint signal light may pass the second polarizer layer 23 without attenuation, and may reach the fingerprint recognition unit 21.

The light leaked from the red organic light emitting structure 101 may be more uniform in the respective polarization directions. After passing through the second polarizer layer 23, the leaked light may become a polarized light having only one polarization direction. Therefore, the intensity of the polarized light may be reduced to half. Therefore, when the light leaked from the organic light emitting structure reaches the fingerprint recognition unit 21, the light intensity may be substantially reduced. Further, when the intensity of the fingerprint signal light remains unchanged, the intensity of the fingerprint noise light may be relatively weakened. Thus, the signal-to-noise ratio of the fingerprint recognition module 2 may be increased, and the precision of fingerprint recognition by the fingerprint recognition module 2 may be improved.

In one embodiment, the display panel according to the present disclosure may be a rigid display panel. Specifically, as shown in FIG. 23, the array substrate 10 may be a first glass substrate. The display module 1 may also include an encapsulation layer 12. The encapsulation layer 12 may also be a glass substrate. The organic light emitting structure 11 may be located between the first glass substrate 10 and the encapsulation layer 12. The first glass substrate 10 and the encapsulation layer 12 may be supported by the spacers 18. Air may be present between the first glass substrate 10 and the encapsulation layer 12. In one embodiment, the thickness of the air gap may be 4 µm. The display panel may also include a glass cover 14. The glass cover 14 may be bonded to a surface of the first polarizer layer 13 facing away from the organic light emitting structure 11 by a liquid optical adhesive.

In one embodiment, the thickness of the display module 1 may be 1410 µm. The fingerprint recognition module 2 may also include a first substrate 20. The fingerprint recognition unit 21 may be configured on a surface of the first substrate 20 adjacent to the display module 1. Therefore, the fingerprint recognition unit 21 may be directly formed on the first substrate 20. The configuration may not only be convenient for forming the fingerprint recognition unit 21, but also protect the fingerprint recognition unit 21 by the first substrate 20. In addition, the second polarizer layer 23 may be bonded to the array substrate 10 by an optical adhesive (not shown) such that the display module 1 and the fingerprint recognition module 2 are bonded together to form the display panel.

In addition, the first polarizer layer 13 according to the present disclosure may also include a first quarter wave plate and a third linear polarizer layer stacked together. The first quarter wave plate may be disposed on a side of the third polarizer layer adjacent to the organic light emitting structure 11. The second polarizer layer 23 may include a second quarter wave plate and a fourth linear polarizer layer stacked together. The second quarter wave plate may be disposed on a side of the fourth linear polarizer layer adjacent to the organic light emitting structure 11. The first quarter wave plate and the second quarter wave plate may be made of a same material and may have a same thickness.

Facing toward the transmission direction of the fingerprint signal light, and assuming the counterclockwise direction is the positive direction, the angle between the optical axis of the first quarter wave plate and the polarization direction of the third linear polarizer layer may be 45°, and the angle between the optical axis of the second quarter wave plate and the polarization direction of the fourth linear polarizer layer may be −45°. Alternatively, the angle between the optical axis of the first quarter wave plate and the polarization direction of the third linear polarizer layer may be −45°, and the angle between the optical axis of the second quarter wave plate and the polarization direction of the fourth linear polarizer layer may be 45°. Thus, the first polarizer layer 13 and the second polarizer layer 23 may be a circular polarizer layer.

For illustrative purposes, facing toward the transmission direction of the fingerprint signal light, and assuming the counterclockwise direction is the positive direction, the angle between the optical axis of the first quarter wave plate and the polarization direction of the third linear polarizer layer may be 45°, and the angle between the optical axis of the second quarter wave plate and the polarization direction of the fourth linear polarizer layer may be −45°. The first quarter wave plate and the second quarter wave plate may be made of calcite. The e axis of the first quarter wave plate and the second quarter wave plate may be the optical axis.

Figure 24A:
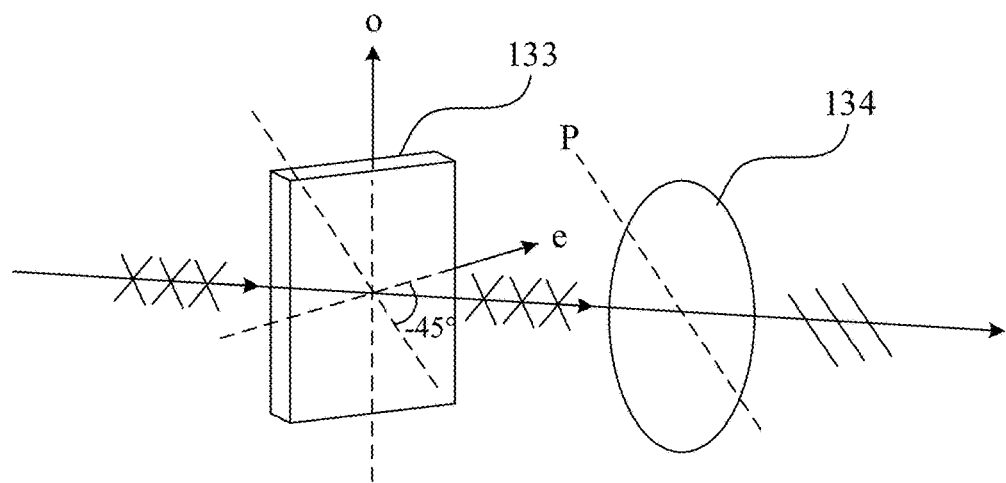
FIG. 24a illustrates an optical path diagram of light emitted from an exemplary organic light emitting structure before being reflected by a touch object according to the disclosed embodiments.

FIG. 24a illustrates an optical path diagram of light emitted from an exemplary organic light emitting structure before being reflected by a touch object according to the present disclosure. Referring to FIG. 23 and FIG. 24a, in the fingerprint recognition phase, before the light emitted from the organic light emitting structure 11 is reflected by the touch object, facing toward the light transmission direction, and assuming the counterclockwise direction is the positive direction, the angle between the e axis of the first quarter wave plate 133 and the polarization direction P of the third linear polarizer layer 134 may be −45°. After the natural light emitted from the organic light emitting structure 11 passes through the first quarter wave plate 133, the light may be still a natural light. After passing through the third polarizer layer 134, the natural light may become a linear polarized light having a polarization direction same as the polarization direction P of the third polarizer layer 134 in the second and fourth quadrants.

Figure 24B:
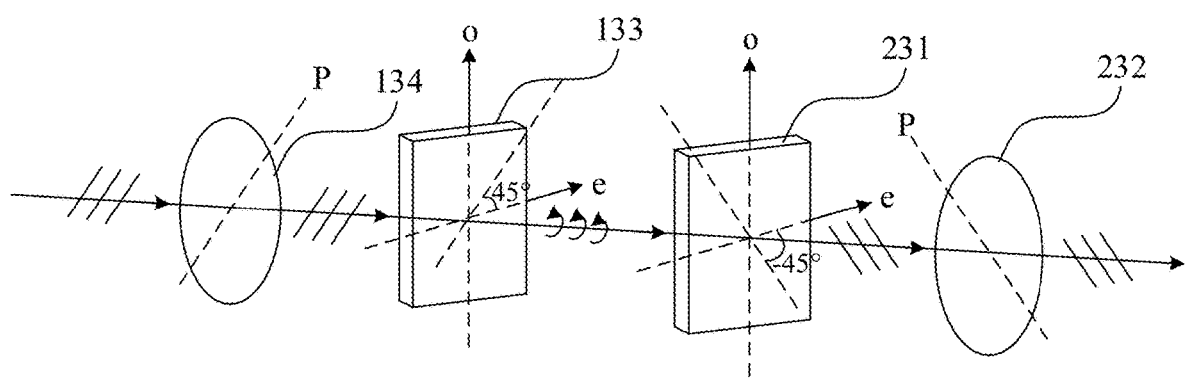
FIG. 24b illustrates an optical path diagram of light emitted from an exemplary organic light emitting structure after being reflected by a touch object according to the disclosed embodiments.

FIG. 24b illustrates an optical path diagram of light emitted from an exemplary organic light emitting structure after being reflected by a touch object according to the present disclosure. Referring to FIG. 24b, after the linear polarized light is reflected by the touch object to form the fingerprint signal light, the polarization direction may remain unchanged. However, facing toward the transmission direction of the fingerprint signal light, the angle between the e axis of the first quarter wave plate 133 and the polarization direction P of the third linear polarizer layer 134 may be 45°. The polarization direction of the fingerprint signal light may be in the first and the third quadrants.

After the fingerprint signal light passes through the third linear polarizer layer 134, the polarization state and the light intensity may remain unchanged. After passing through the first quarter wave plate 133, the fingerprint signal light may be changed into a left circular polarized light, and the light intensity may remain unchanged. After passing through the second quarter wave plate 231, the left circular polarized light may be changed into a linear polarized light having a polarization direction in the second and fourth quadrants while the light intensity remains unchanged. Finally, the linear polarized light may pass through the fourth linear polarizer layer 232 having a polarization direction parallel with the linear polarized light, and may remain as a linear polarized light with the light intensity unchanged.

Figure 25:
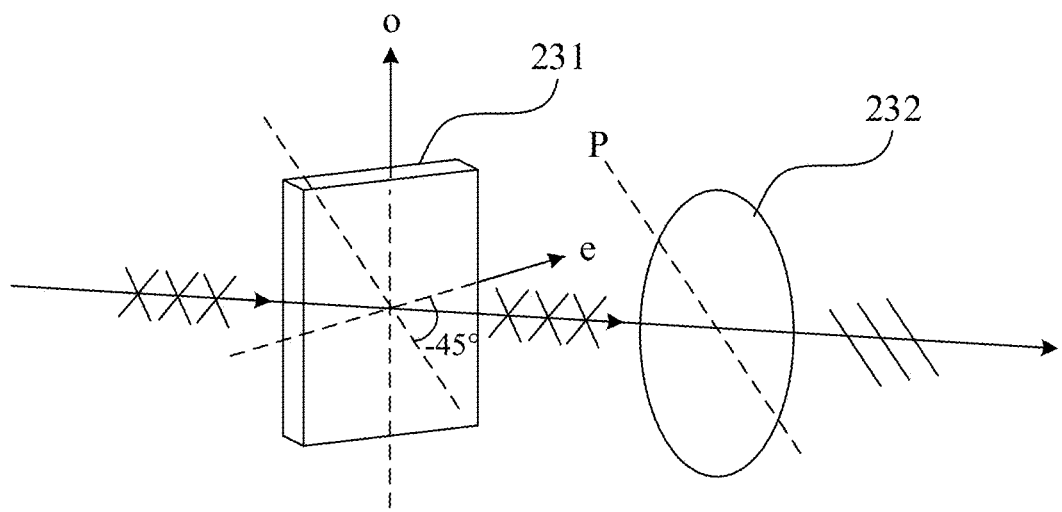
FIG. 25 illustrates an optical path diagram of fingerprint noise light emitted from an exemplary organic light emitting structure according to the disclosed embodiments.

FIG. 25 illustrates an optical path diagram of fingerprint noise light emitted from an exemplary organic light emitting structure according to the present disclosure. Referring to FIG. 25, the fingerprint noise light emitted from the organic light emitting structure may directly pass through the second polarizer layer. Facing toward the transmission direction of the fingerprint noise light, the angle between the e axis of the second quarter wave plate 231 and the polarization direction P of the fourth linear polarizer layer 232 may be −45°. After passing through the second quarter wave plate 231, the fingerprint noise light may be still a natural light. After passing through the fourth polarizer layer 232, the natural light may be changed into a linear polarized light having a polarization direction same as the polarization direction P of the fourth polarizer layer 232 in the second and fourth quadrants. However, the light intensity may be reduced by half. Thus, the second polarizer layer may reduce the intensity of the fingerprint noise light, and may increase the signal-to-noise ratio.

Figure 26:
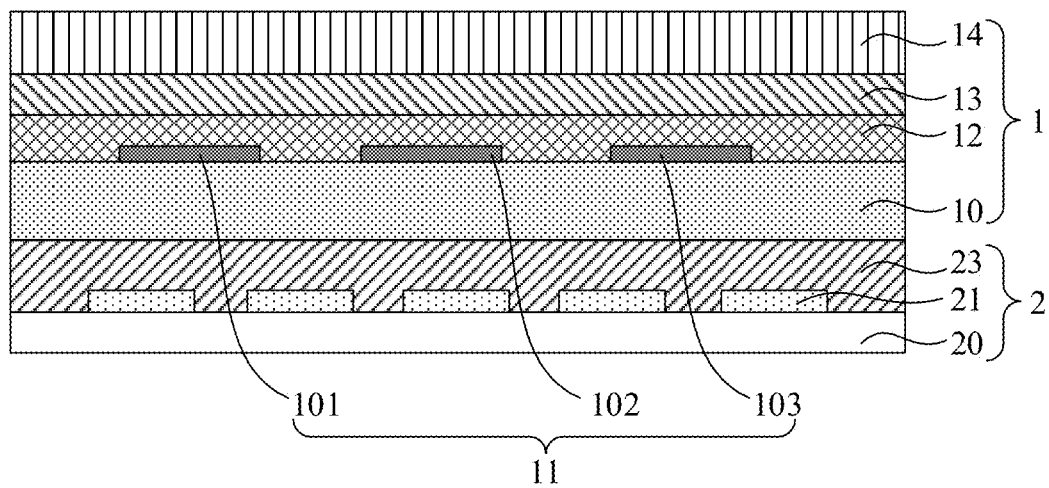
FIG. 26 illustrates a cross-sectional view of another exemplary display panel according to the disclosed embodiments.

FIG. 26 illustrates a cross-sectional view of another exemplary display panel according to the present disclosure. The display panel may be a flexible display panel. Specifically, as shown in FIG. 26, the array substrate 10 may be flexible substrate. The display module 1 may also include an encapsulation layer 12, for example, a thin film encapsulation layer, to replace the second glass substrate in the other embodiment. The thin film encapsulation layer 12 may cover the organic light emitting structure 11.

Figure 27:
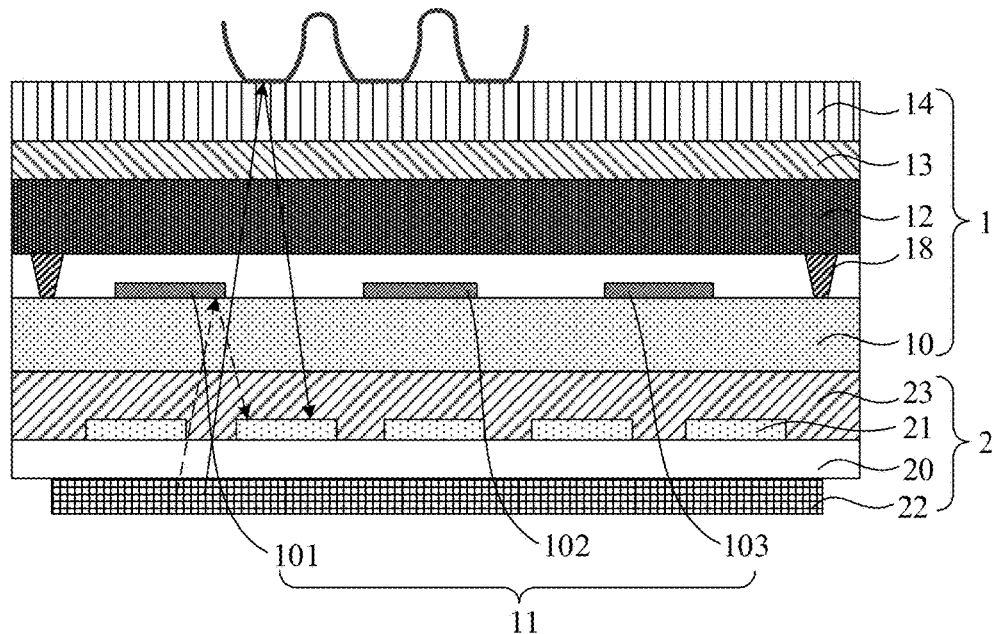
FIG. 27 illustrates a cross-sectional view of another exemplary display panel according to the disclosed embodiments.

FIG. 27 illustrates a cross-sectional view of another exemplary display panel according to the present disclosure. As shown in FIG. 27, the display panel according to the present disclosure may include a display module 1, an organic light emitting structure 11, a fingerprint recognition module 2, and a fingerprint recognition light source 22. The display module 1 may include an array substrate 10 and a first polarizer layer 13 disposed on the array substrate 10. The light emitting side of the display module 1 may be located on a side of the first polarizer layer 13 facing away from the array substrate 10. The organic light emitting structure 11 may be disposed between the arrays substrate 10 and the first polarizer layer 13 for providing the light for image display.

The fingerprint recognition module 2 may be located on a side of the array substrate 10 facing away from the first polarizer layer 13, and may include a plurality of fingerprint recognition units 21 and a second polarizer layer 23 disposed between the fingerprint recognition units 21 and the on a side the fingerprint recognition units 21 adjacent to the display module 1. The fingerprint recognition units 21 may be used to recognize fingerprints based on the light that is formed when the light emitted from the light source is reflected by the touch object to the fingerprint recognition units 21. The fingerprint recognition light source 22 may be located on a side of the fingerprint recognition module 2 facing away from the display module 1. The fingerprint recognition light source 22 may be used as the light source for the fingerprint recognition module 2.

The organic light emitting structure 11 may be used to generate the light for image display. The fingerprint recognition light source 22 may be used as the light source for the fingerprint recognition module 2. In the display phase, the fingerprint recognition light source may not emit light to avoid affecting the display effect. In the fingerprint recognition phase, the organic light emitting structure may not emit light to avoid crosstalk where the light leaked from the organic light emitting structure 11 and the light that is emitted from the organic light emitting structure 11 and is reflected by the touch object reach the fingerprint recognition units 21 to interfere fingerprint recognition. Therefore, based on the above configuration, the display module 1 according to the present disclosure may also include a second display driver circuit (not shown). The second display driver circuit may not output the display driver signal to drive the organic light emitting structure to emit light in the fingerprint recognition phase, and may not output the detection driver signal to drive the fingerprint recognition light source to emit light in the display phase.

In one embodiment, the first polarizer layer 13 may include a first quarter wave plate and a third linear polarizer layer stacked together. The first quarter wave plate may be located on a side of the third linear polarizer layer adjacent to the organic light emitting structure 11. The second polarizer layer 23 may include a second quarter wave plate and a fourth linear polarizer layer stacked together. The second quarter wave plate may be located on a side of the fourth linear polarizer layer adjacent to the organic light emitting structure 11. The first quarter wave plate and the second quarter wave plate may be made of a same material and may have a same thickness.

Facing toward the transmission direction of the fingerprint signal light, and assuming the counterclockwise direction is the positive direction, the angle between the optical axis of the first quarter wave plate and the polarization direction of the third polarizer layer may be 45°, and the angle between the optical axis of the second quarter wave plate and the polarization direction of the fourth polarizer layer may be −45°. Alternatively, the angle between the optical axis of the first quarter wave plate and the polarization direction of the third polarizer layer may be −45°, and the angle between the optical axis of the second quarter wave plate and the polarization direction of the fourth polarizer layer may be 45°.

For illustrative purposes, facing toward the transmission direction of the fingerprint signal light, and assuming the counterclockwise direction is the positive direction, the angle between the optical axis of the first quarter wave plate and the polarization direction of the third polarizer layer may be 45°, and the angle between the optical axis of the second quarter wave plate and the polarization direction of the fourth polarizer layer may be −45°. The first quarter wave plate and the second quarter wave plate may be made of calcite. The e axis of the first quarter wave plate and the second quarter wave plate may be the optical axis.

Referring to FIG. 27, the optical path in solid line may represent the light emitted from the light emitting side of the fingerprint recognition light source 22 and the fingerprint signal light reflected by the touch object, and the optical path in the dashed line may represent the light that is emitted from the fingerprint recognition light source 22 and reflected by the metals in the display module 1.

Figure 28A:
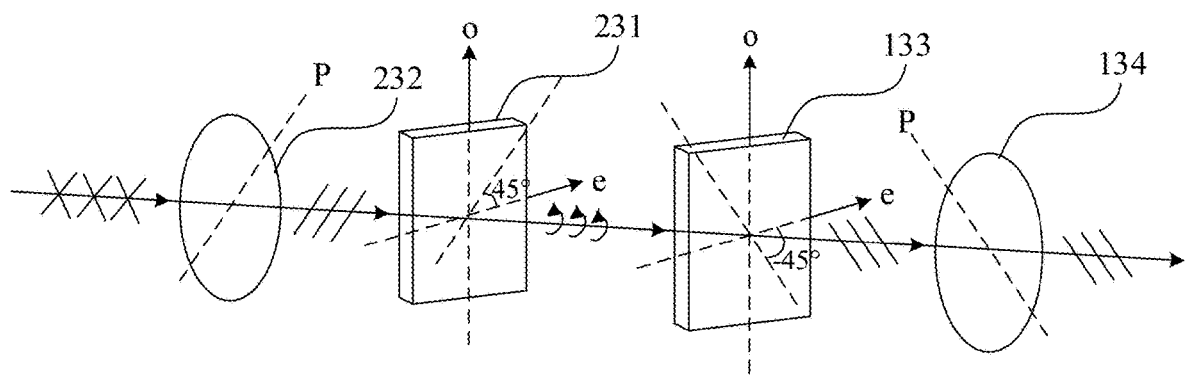
FIG. 28a illustrates an optical path diagram of light emitted from an exemplary backlight structure before being reflected by a touch object according to the disclosed embodiments.

FIG. 28a illustrates an optical path diagram of light emitted from an exemplary backlight structure before being reflected by a touch object according to the present disclosure. In the fingerprint recognition phase, referring to FIG. 28a, before the light emitted from the fingerprint recognition light source is reflected by the touch object, facing toward the transmission direction of the light, and assuming the counterclockwise direction is the positive direction, the angle between the axis of the first quarter wave plate 133 and the polarization direction P of the third linear polarizer layer 134 may be −45°, and the angle between the e axis of the second quarter wave plate 231 and the polarization direction of the fourth linear polarizer layer 232 may be 45°.

After passing through the fourth linear polarizer layer 232, the natural light emitted from the fingerprint recognition light source 22 may be changed into a linear polarized light having a polarization direction in the first and third quadrants. After passing through the second quarter wave plate 231, the linear polarized light may be changed into a left circular polarized light. After passing through the first quarter wave plate 133, the left circular polarized light may be changed into a linear polarized light having a polarization direction in the second and fourth quadrants, and parallel with the polarization direction of the third linear polarizer layer 134. After passing through the third linear polarizer layer 134, the polarization state of the linear polarized light may remain unchanged.

Figure 28B:
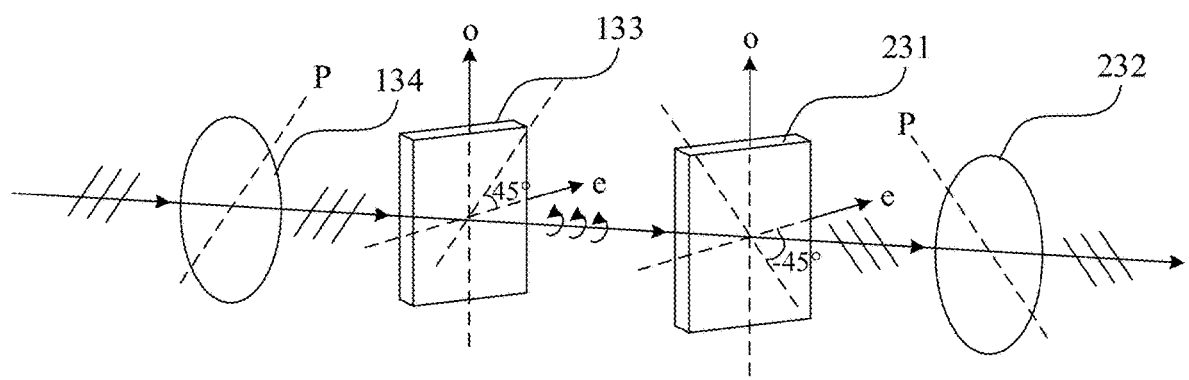
FIG. 28b illustrates an optical path diagram of light emitted from an exemplary backlight structure after being reflected by a touch object according to the disclosed embodiments.

FIG. 28b illustrates an optical path diagram of light emitted from an exemplary backlight structure after being reflected by a touch object according to the present disclosure. Referring to FIG. 28b, after being reflected by the touch object, the linear polarized light may become a fingerprint signal light, the polarization direction of which remains unchanged. However, facing toward the transmission direction the fingerprint signal light, the fingerprint signal light may be a linear polarized light having a polarization direction in the first and third quadrants.

After the fingerprint signal light passes through the third linear polarizer layer 134, the polarization state and the light intensity may remain unchanged. After passing through the first quarter wave plate 133, the fingerprint signal light may be changed into a left circular polarized light with the intensity unchanged. After passing through the second quarter wave plate 231, the left circular polarized light may be changed into a linear polarized light having a polarization direction in the second and fourth quadrants, and the light intensity may remain unchanged. Finally, after passing through the fourth linear polarizer layer 232 that has a polarization direction parallel with the polarization direction of the linear polarized fingerprint signal light, the polarization state and the light intensity of the linear polarized fingerprint signal light may remain unchanged.

Figure 29A:
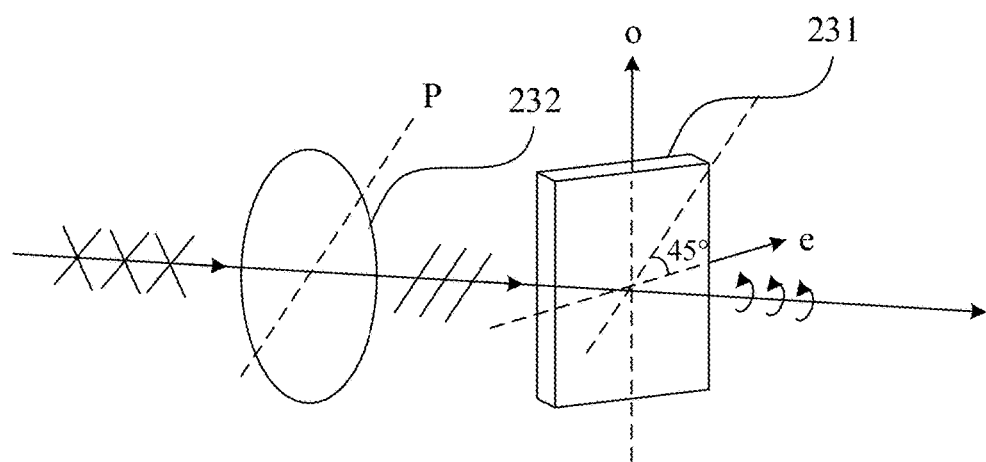
FIG. 29a illustrates an optical path diagram of fingerprint noise light emitted from an exemplary backlight structure before being reflected by a metal surface according to the disclosed embodiments.

The light emitted from the fingerprint recognition light source may be reflected by the metals to become fingerprint noise light. FIG. 29a illustrates an optical path diagram of fingerprint noise light emitted from an exemplary backlight structure before being reflected by a metal surface according to the present disclosure. Referring to FIG. 29a, after passing through the fourth linear polarizer layer 232, the natural light emitted from the fingerprint recognition light source 22 may be changed into a linear polarized light having a polarization direction in the first and third quadrants. After passing through the second quarter wave plate 231, the linear polarized light may be changed into a left circular polarized light. After being reflected by the metals, the left circular polarized light may be changed into right circular polarized light.

Figure 29B:
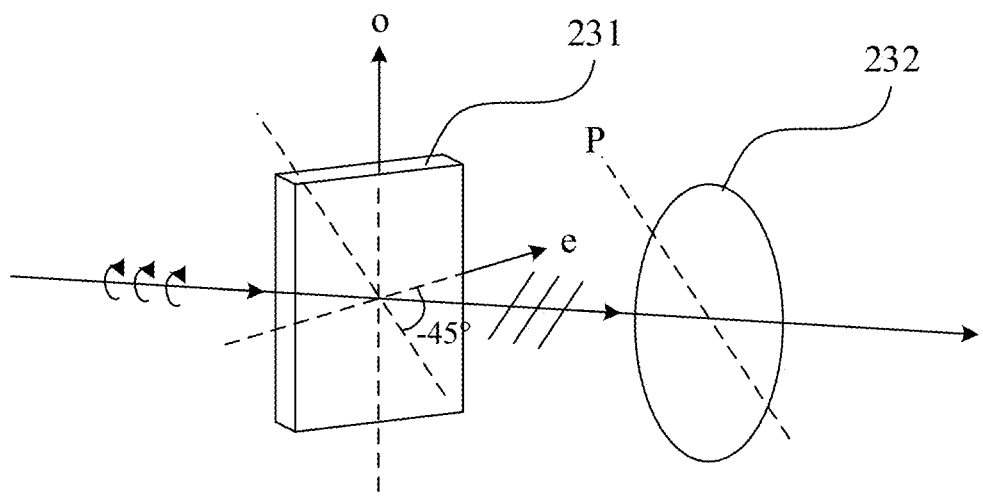
FIG. 29b illustrates an optical path diagram of fingerprint noise light emitted from an exemplary backlight structure before being reflected by a metal surface according to the disclosed embodiments.

FIG. 29b illustrates an optical path diagram of fingerprint noise light emitted from an exemplary backlight structure before being reflected by a metal surface according to the present disclosure. Referring to FIG. 29b, after passing through the second quarter wave plate 231, the right circular polarized light may be changed into a linear polarized light having a polarization direction in the first and third quadrants, which is perpendicular to the polarization direction of the fourth linear polarizer layer 232. So the fingerprint noise light may not pass through the fourth linear polarizer layer 232 to reach the fingerprint recognition unit 21. Thus, the second polarizer layer 23 may completely eliminate the fingerprint noise light reflected by the metals in the display module 1, and may increase the signal-to-noise ratio.

In one embodiment, the display panel according to the present disclosure may be a rigid display panel. Specifically, as shown in FIG. 27, the array substrate 10 may be a first glass substrate. The display module 1 may also include an encapsulation layer 12. The organic light emitting structure 11 maybe located between the first glass substrate 10 and the encapsulation layer 12. The first glass substrate 10 and the encapsulation layer 12 may be supported by spacers 18. Air gap may exist between the first glass substrate 10 and the encapsulation layer 12. In one embodiment, the thickness of the air gap may be 4 µm. The display panel may also include a glass cover 14. The glass cover 14 may be bonded to a surface of the first polarizer layer 13 facing away from the organic light emitting structure by a liquid optical adhesive. In one embodiment, the thickness of the display module may be 1410 µm.

In one embodiment, the fingerprint recognition module 2 may also include a first substrate 20. The fingerprint recognition unit 21 may be configured on a surface of the first substrate 20 adjacent to the display module 1. The fingerprint recognition light source 22 may be configured on a surface of the first substrate 20 facing away from the display module 1. Thus, the fingerprint recognition unit 21 may be directly formed on the first substrate 20. The configuration may not only be convenient for forming the fingerprint recognition unit 21, but also protect the fingerprint recognition unit 21 by the first substrate 20. In addition, the second polarizer layer 23 may be bonded to array substrate 10 by an optical adhesive (not shown) such that the display module 1 and the fingerprint recognition module 2 may be bonded together to form the display panel.

Figure 30:
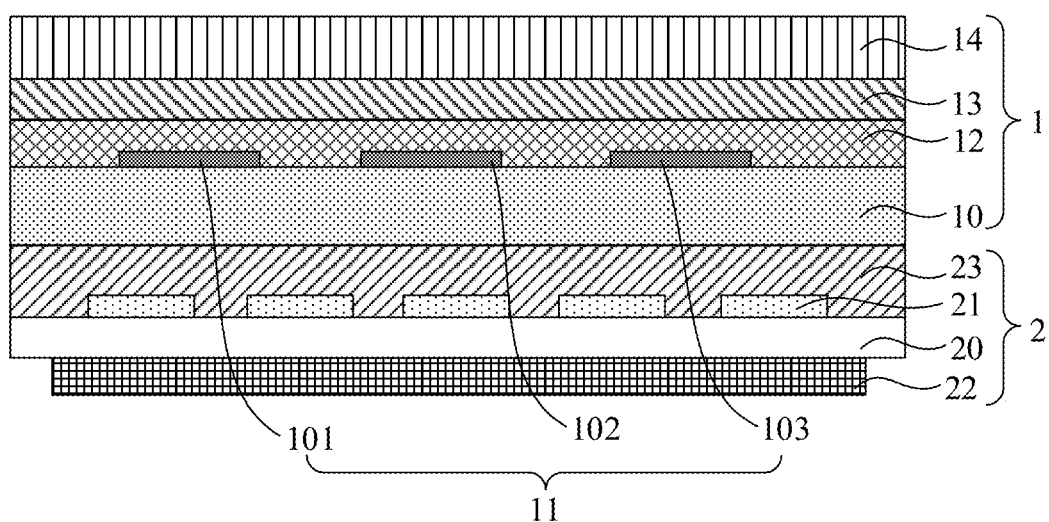
FIG. 30 illustrates a cross-sectional view of another exemplary display panel according to the disclosed embodiments.

FIG. 30 illustrates a cross-sectional view of another exemplary display panel according to the present disclosure. As shown in FIG. 30, the display panel may be a flexible display panel, and the encapsulation layer 12 may be a thin film encapsulation layer to replace the second glass substrate to cover the organic light emitting structures 11.

In certain embodiments, referring to FIG. 24a, FIG. 28a, and FIG. 28b, the direction of the optical axis of the quarter wave plate and the polarization direction of the linear polarizer layer are for illustrative purposes. In the embodiments of the present disclosure, the optical axis direction of the first quarter wave plate and the optical axis of the second quarter wave plate may not have any particular relationship, and the polarization direction of the third linear polarizer layer and the polarization direction of the fourth linear polarizer layer may not have any particular relationship either, as long as the angle between the optical axis of the first quarter wave plate and the polarization direction of the third linear polarizer layer, and the angle between the optical axis of the second quarter wave plate and the fourth linear polarizer layer satisfy the defined conditions.

Figure 31A:
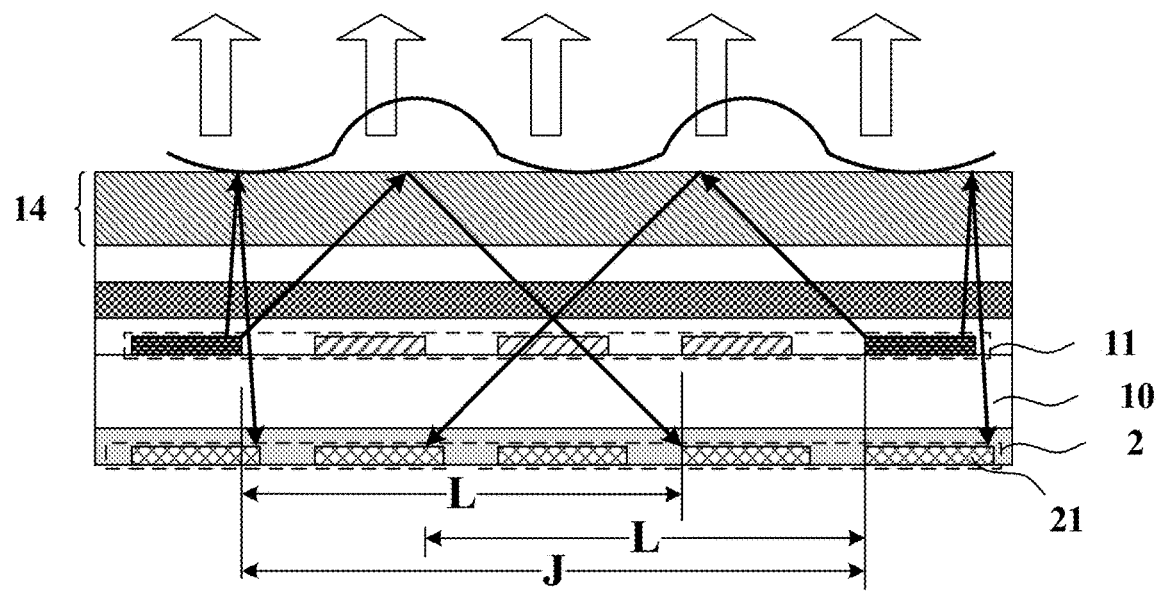
FIG. 31a illustrates a cross-sectional view of another exemplary display panel according to the disclosed embodiments.
Figure 31B:
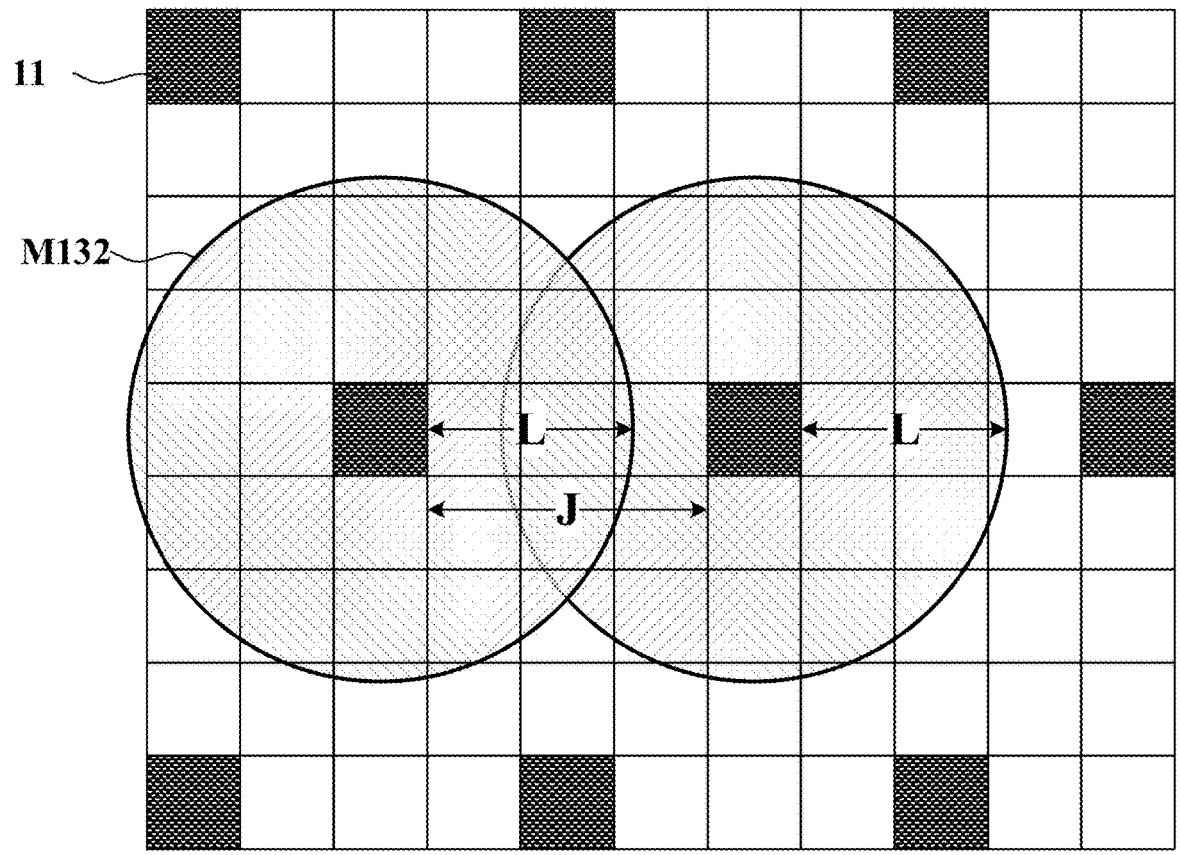
Figure 31C:
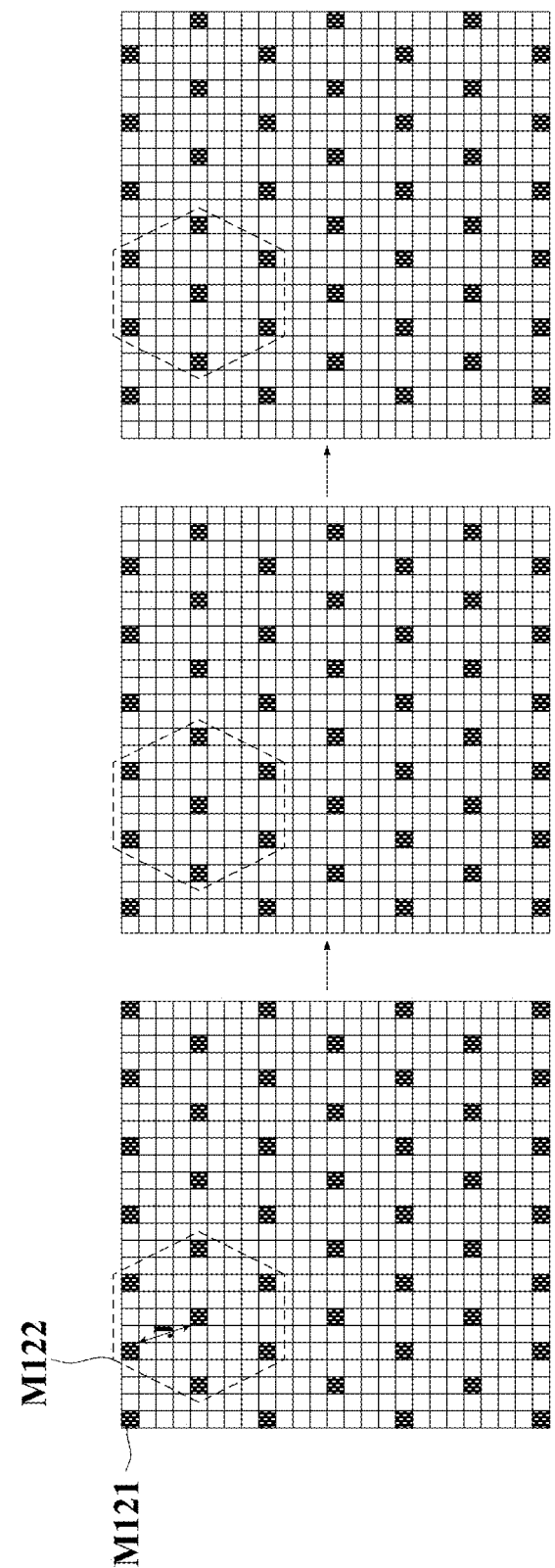
FIG. 31c illustrates a scanning view of the display panel in FIG. 31a in the fingerprint recognition phase.

FIG. 31a illustrates a cross-sectional view of another exemplary display panel according to the present disclosure. FIG. 31b illustrates a partial top-down view of the display panel in FIG. 31a. FIG. 31c illustrates a scanning view of the display panel in FIG. 31a in the fingerprint recognition phase. The display panel according to the present disclosure may include an array substrate 10, a glass cover 14, a plurality of organic light emitting structures 11 disposed on a side of the array substrate 10 facing toward the glass cover 14, and a fingerprint recognition module 2. A first surface of the glass cover 14 facing away from the array substrate 10 may be the light emitting side of the display panel.

In the fingerprint recognition phase, the light emitting from the organic light emitting structures 11 may be used for fingerprint recognition. The plurality of the organic light emitting structures 11 may be arranged in a first light emitting dot array M122 to emit light in a shifting mode. A distance J between any two adjacent organic light emitting structures 11 in the first light emitting dot array M122 may be greater than or equal to a minimum crosstalk distance L. The minimum crosstalk distance L may be defined as a maximum radius of an area on the fingerprint recognition module 2 formed by the light emitted from any one organic light emitting structure 11 and subsequently reflected by the first surface of the glass cover 14. In one embodiment, the fingerprint recognition module 2 may be configured on a side of the array substrate 10 facing away from the glass cover 14. The fingerprint recognition module 2 may include a plurality of fingerprint recognition units 21. The plurality of the fingerprint recognition units 21 may be configured in coordination with the plurality of the organic light emitting structures 11.

Figure 32:
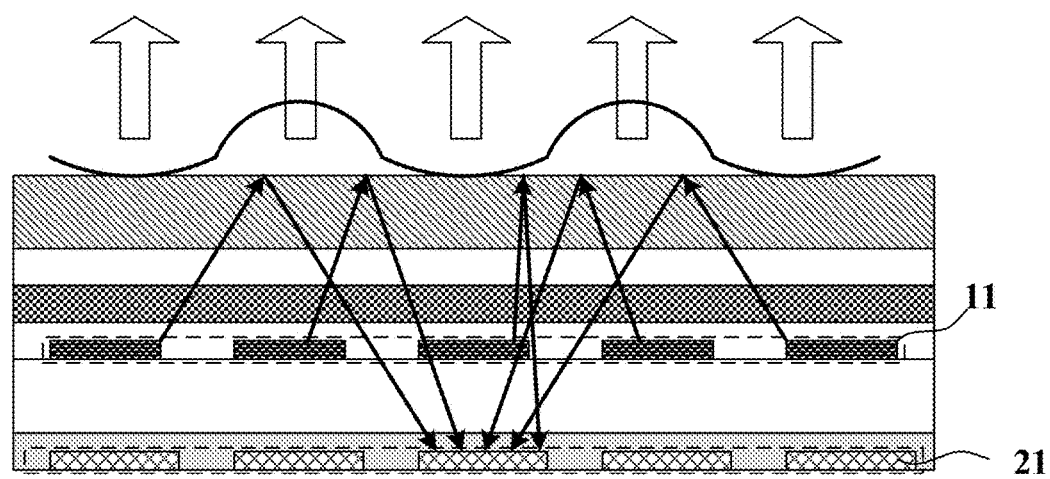
FIG. 32 illustrates a schematic view of interferences in an exemplary display panel according to the disclosed embodiments.

The reason that the first light emitting dot array M122 is used as the detection light source for the fingerprint recognition units 21 may be because the light emitted from the organic light emitting structure 11 has a wide range of angular distribution. FIG. 32 illustrates a schematic view of interferences in an exemplary display panel according to the present disclosure. As shown in FIG. 32, when all the organic light emitting structures 11 in the display panel emit light for fingerprint recognition at the same time, each fingerprint recognition unit 21 may receive crosstalk signals from many other organic light emitting structures 11 in addition to the fingerprint reflection light from the corresponding organic light emitting structure 11, thus causing degradation of the precision of fingerprint recognition.

In order to improve the precision of fingerprint recognition, the display panel according to the present disclosure may have a plurality of organic light emitting structures 11 emit light in a shifting mode according to the first light emitting dot array M122. The distance J between any two adjacent organic light emitting structures 11 in the first light emitting dot array M122 may be greater than or equal to the minimum crosstalk distance L. As shown in FIG. 31a and FIG. 31b, because the light emitted from the organic light emitting structure 11 may have a wide range of angular distribution, the light emitted from the organic light emitting structure 11 may be reflected by the first surface of the glass cover 14 to form a cover region M132 on the fingerprint recognition module 2. The fingerprint reflected light of any angle light emitted from the organic light emitting structure 11 may fall into the cover region M132, where the maximum radius of the cover region M132 is the minimum crosstalk distance L.

In one embodiment, because the distance J between any two adjacent organic light emitting structures 11 in the first light emitting dot array M122 is greater than or equal to the minimum crosstalk distance L, the fingerprint reflected light from any one of the light emitting organic light emitting structures 11 in the first light emitting dot array M122 will never irradiate on the fingerprint recognition unit 21 corresponding to other light emitting organic light emitting structure 11. That is, the fingerprint recognition unit 21 corresponding to any one of the organic light emitting structures 11 in the first light emitting dot array M122 may only receive the fingerprint reflected light from the corresponding organic light emitting structure 11. Therefore, in the display panel according to the present disclosure, the fingerprint recognition unit 21 may not receive crosstalk signals from other organic light emitting structures 11. The fingerprint recognition circuit in the display panel may recognize fingerprints accordingly based on the sensed signal generated by the fingerprint recognition unit 21. Thus, the precision of fingerprint recognition by the display panel may be improved.

The fingerprint reflected light may be the reflected light that is formed when the fingerprint of the finger of the user pressed on the first surface of the glass cover 14 reflects the light emitted from the organic light emitting structure 11. Relative to the thickness of the display panel, the distance between the fingerprint of the finger of the user and the first surface of the glass cover 14 may be very small, and may have little impact on the scale of the cover region M132. Therefore, when calculating the minimum crosstalk distance L, the reflection distance between the finger of the user and the first surface of the glass cover 14 is ignored.

Moreover, the radius L of the cover region M132 should be truly calculated from the center point of the organic light emitting structure 11. However, in practice, because there are a large number of organic light emitting structures 11 in the display panel, and the dimension of each organic light emitting structure 11 is small, an entire organic light emitting structure 11 may be treated as the origin point of the cover region M132. The radius L of the cover region M132 may be represented by a length between an edge of the organic light emitting structure 11 and an edge of the cover region M132. The size of the organic light emitting structure 11 in the center may not be counted in the minimum crosstalk distance L.

Those skilled in the art may appreciate the minimum crosstalk distance L depends on the thickness of the display panel, and the light emitting angle of the organic light emitting structures 11, etc. Different display panels may have different minimum crosstalk distance L. In certain other embodiments, the size of the organic light emitting structure 11 in the center may be counted into the minimum crosstalk distance L. No specific limitation is imposed in the present disclosure.

As previously described, the organic light emitting structure 11 may have a wide range of angular distribution. The minimum crosstalk distance L may be the maximum radius of the cover region M132 formed on the fingerprint recognition module 2 by the light that is formed when the light emitted from any organic light emitting structure 11 is reflected by the first surface of the glass cover 14. Obviously, the area on the fingerprint recognition module 2 defined by the light that is formed when the light emitted from the edge of the organic light emitting structure 11 at a maximum angle is reflected may be cover region M132. The light emitted from the organic light emitting structure 11 at any angle may be reflected into the cover region M132.

Figure 31D:
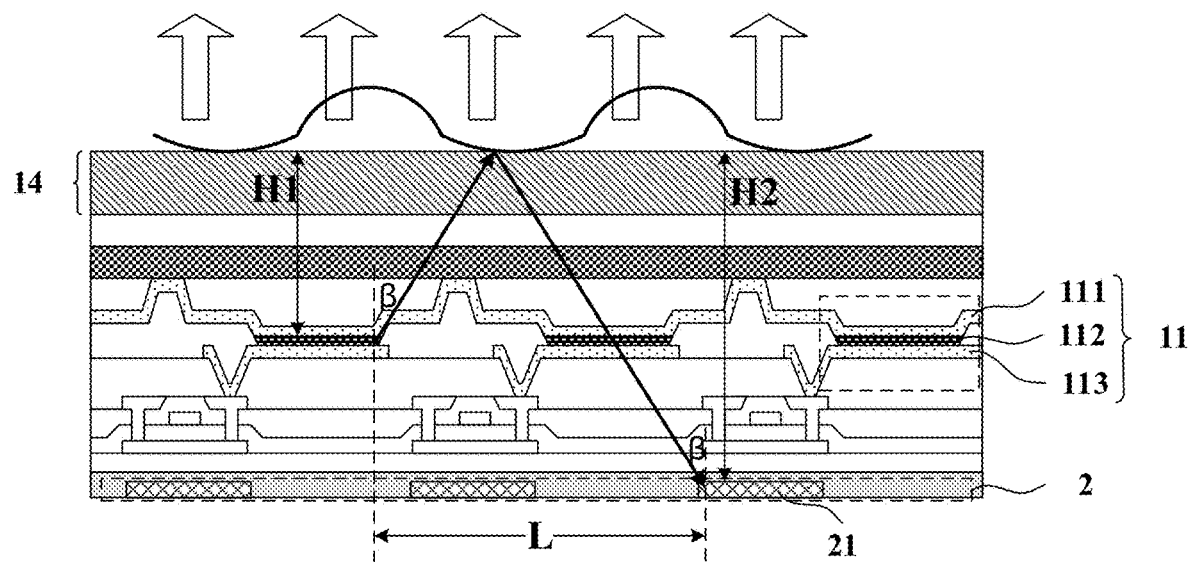

FIG. 31d illustrates a detailed schematic view of the display panel in FIG. 31a. As shown in FIG. 31d, in one embodiment, the organic light emitting structure 11 may include a first electrode 111, a light emitting layer 112, and a second electrode 113 sequentially configured in the direction facing away from the array substrate 10. One first electrode 111, one light emitting layer 112 configured corresponding to the first electrode 111, and a second electrode 113 corresponding to the first electrode 111 together may form an organic light emitting unit. When the organic light emitting structure 11 includes the organic light emitting units for three colors, the organic light emitting structure 11 may include three organic light emitting units of three different colors.

When signals are applied to the first electrode 111 and the second electrode 113, the light emitting layer 112 may emit light. The light emitted from the light emitting layer 112 may have a wide range of angular distribution. The fingerprint reflected signal may be basically a mirror reflection, i.e., the angle of reflection is equal to the angle of incidence. Therefore, $L=\tan \beta *H1+\tan \beta *H2$, where L is the minimum crosstalk distance L, $\beta$ is the angle between a direction corresponding to a pre-determined brightness of the organic light emitting structure 11 and a direction perpendicular to the organic light emitting layer, H1 is a height in a direction perpendicular to the display panel from the first surface of the glass cover 14 to the light emitting function layer, and H2 is a height in the direction perpendicular to the display panel from the first surface of the glass cover 14 to the fingerprint recognition module 2. The pre-determined brightness is less than or equal to about 10% of the brightness in the direction perpendicular to the organic light emitting layer.

In one embodiment, the angle of the light emitting from the organic light emitting structure 11 may be related to the brightness of the organic light emitting structure 11, and the brightness may be a subjective feeling of the light emitting intensity. The brightness in the direction perpendicular to the organic light emitting structure 11 may be defined as 100%. The lower the brightness percentage, the wider the corresponding light emitting angle (the angle between the direction of the emitted light and the direction perpendicular to the organic light emitting layer), the weaker the corresponding light intensity. When the brightness of the light emitted from the organic light emitting structure 11 is less than or equal to about 10%, the light emitted from the organic light emitting structure 11 may have a very weak intensity, and the light reflected by the first surface of the glass cover 14 may not cause any crosstalk to the fingerprint recognition unit 21. Thus, the light emitting angle of the organic light emitting structure 11 may set forth about 10% brightness as a critical value.

Based on the description, $\beta$ may be determined as follows: measuring the brightness in the direction perpendicular to the organic light emitting structure 11, determining a position that corresponds to about 10% of the brightness in the direction perpendicular to the organic light emitting structure, and determining $\beta$ based on the angle between the direction of the position and the direction perpendicular to the organic light emitting layer. Those skilled in the art may know that different display panels may have different intensities of the light emitted from the organic light emitting structure 11, and different levels of pre-determined brightness. In certain other embodiments, for example, the pre-determined brightness level may be about 12% or 9% of the brightness in the direction perpendicular to the organic light emitting layer. No specific limitation is imposed in the present disclosure.

FIG. 31*c* illustrates a scanning view of the display panel in FIG. 31*a* in the fingerprint recognition phase. In the fingerprint recognition phase, the display panel may use an image scanning method for fingerprint recognition. Specifically, the organic light emitting structures 11 in the first light emitting dot array M122 may emit light simultaneously. The sensed signal generated by the fingerprint recognition unit 21 corresponding to the light emitting organic light emitting structures 11 may be recorded. In a subsequent image frame, the organic light emitting structures 11 that emit light simultaneously may be shifted. The corresponding sensed signal may be recorded.

The process may be repeated until all the organic light emitting structures 11 have emitted light. The sensed signals acquired by the fingerprint recognition units 21 may be used for fingerprint recognition. Because the fingerprint recognition units 21 according to the present disclosure may not receive crosstalk signals, the precision of fingerprint recognition according to the present disclosure may be high. It may be understood by those skilled in the art that the first light emitting dot array may be a minimum repetition unit including a plurality of simultaneously light emitting organic light emitting structures 11, and may not be a dot array that limits the arrangement of the plurality of the simultaneously light emitting organic light emitting structures 11.

The present disclosure provides a display panel. In the fingerprint recognition phase, the plurality of the organic light emitting structures may be selected according to the first light emitting dot array to emit light simultaneously. Then, the positions of the simultaneously light emitting organic light emitting structures may be shifted. The distance between any two adjacent organic light emitting structures in the first light emitting dot array maybe greater than or equal to the minimum crosstalk distance. The minimum crosstalk distance may be the maximum radius of the cover region on the fingerprint recognition array that is formed when the light emitted from any one of the organic light emitting structures is reflected by the light emitting side to the fingerprint recognition array.

Obviously, the fingerprint reflected light emitted from any one of the simultaneously light emitting organic light emitting structures in the first light emitting dot array may not irradiate on the fingerprint recognition units that correspond to other simultaneously light emitting organic light emitting structures respectively. That is, the fingerprint recognition unit corresponding to any one of the simultaneously light emitting organic light emitting structures in the first light emitting dot array may only receive the fingerprint reflected light from the corresponding light emitting organic light emitting structure. Thus, the fingerprint recognition unit may not receive crosstalk signals from other organic light emitting structures. Accordingly, the fingerprint recognition circuit in the display panel may recognize fingerprints based on the sensed signals generated by the fingerprint recognition unit 2, and may improve the precision of fingerprint recognition by the display panel.

The display panel as shown in FIG. 31*a* may be only one of the structures for the display panel. In certain other embodiments of the present disclosure, other different structures for the display panel may be provided.

Figure 33:
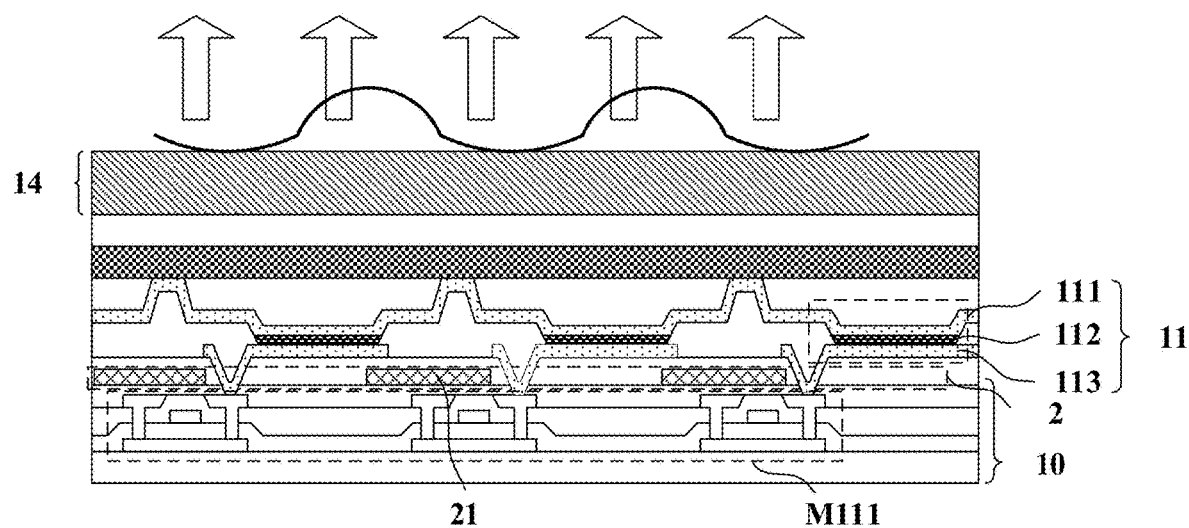
FIG. 33 illustrates a cross-sectional view of another exemplary display panel according to the disclosed embodiments.

The present disclosure also provides another display panel. The display panel may have a different structure as compared to the display panel as shown in FIG. 31*a*. FIG. 33 illustrates a cross-sectional view of another exemplary display panel according to the present disclosure. Specifically, as shown in FIG. 33, the display panel may include a thin-film-transistor array, a fingerprint recognition module 2, and a plurality of organic light emitting structures 11 stacked on a side of the array substrate 10 in a direction facing toward the glass cover 14. The fingerprint recognition module 2 may be configured between the thin-film-transistor array M111 and the plurality of the organic light emitting structures 11. The fingerprint recognition module 2 and the thin-film-transistor array M111 may be insulated from each other and stacked together. The fingerprint recognition module 2 and the plurality of the organic light emitting structures 11 may be insulated from each other.

The display panel may have a fingerprint recognition process similar to the fingerprint recognition process for the display panel as shown in FIG. 31*a*, and will not be repeated here. Because the fingerprint recognition module 2 is configured between the thin-film-transistor array M111 and the plurality of the organic light emitting structures 11, the configuration may not affect the aperture ratio of the first electrode in the organic light emitting structure 11. Thus, the arrangement of the fingerprint recognition units 21 in the fingerprint recognition module 2 may be determined by the product requirements, and may not be limited by the present disclosure.

The display panel may retrieve fingerprint information by using an image scanning method. In one image frame, the organic light emitting structures 11 may be controlled according to the first light emitting dot array M122 to emit light and acquire the fingerprint signals from the fingerprint recognition units 21 corresponding to the light emitting organic light emitting structures 11 respectively. In the next image frame, the light emitting organic light emitting structures 11 may be shifted. The light emitting organic light emitting structures 11 may continue to be shifted sequentially until all the organic light emitting structures 11 have emitted light across multiple image frames.

Obviously, the display panel may traverse multiple image frames to complete the fingerprint information retrieval. When a less number of the organic light emitting structures 11 are emitting light simultaneously, more image frames may be needed to complete the fingerprint information retrieval, and longer time may be needed for the fingerprint information retrieval.

Figure 34A:
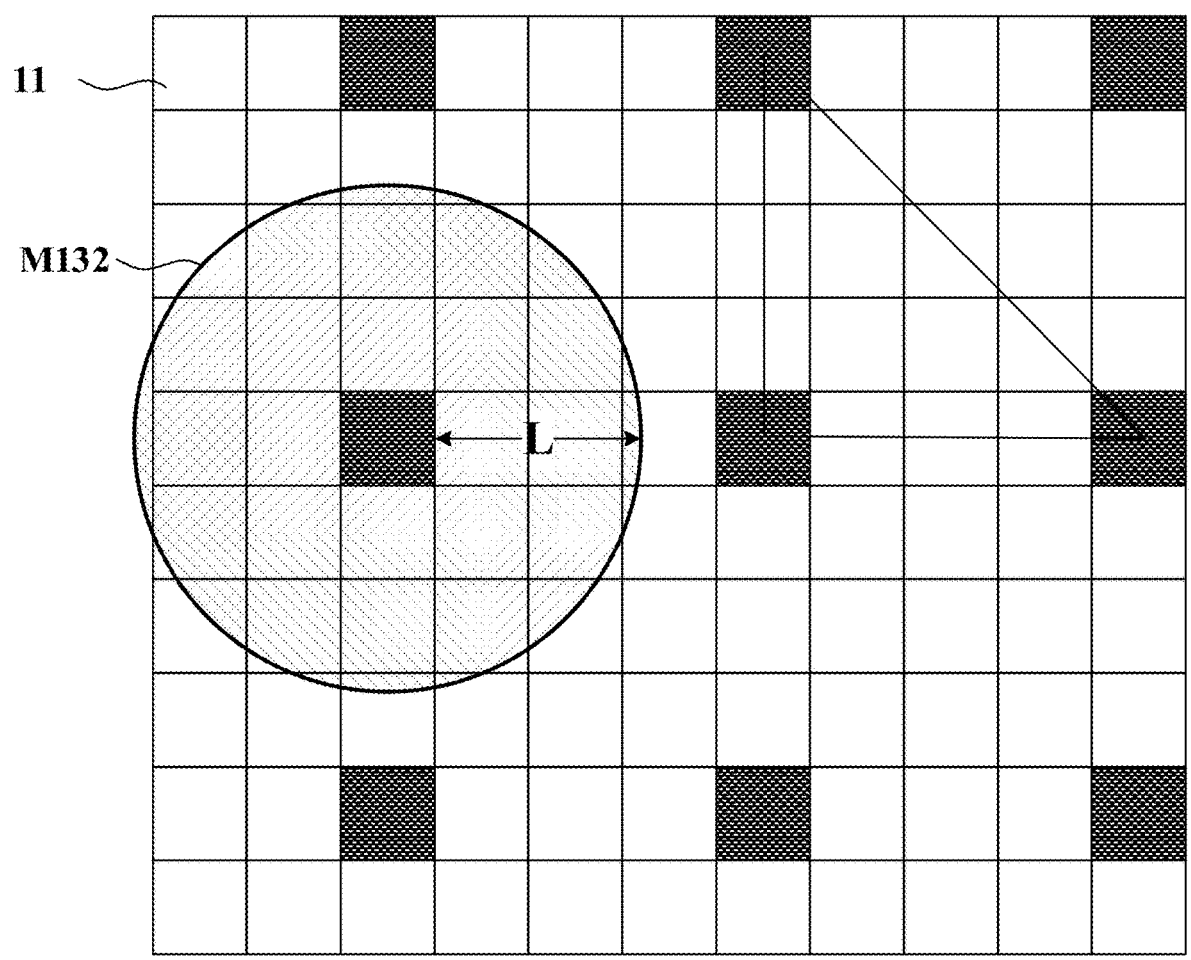
FIGS. 34a-34b illustrate image scanning views of two exemplary display panels in the fingerprint recognition phase according to the disclosed embodiments.
Figure 34B:
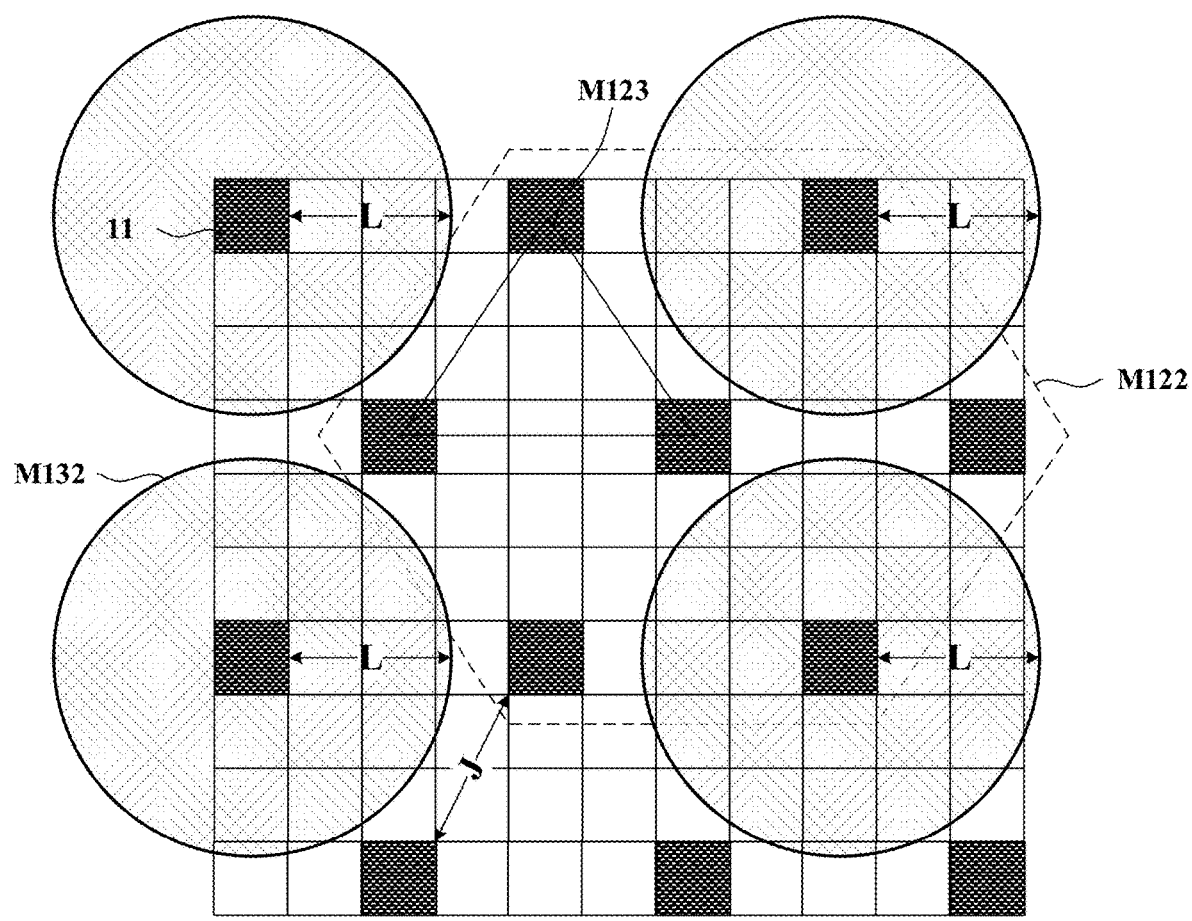

FIGS. 34*a*-34*b* illustrate image scanning views of two exemplary display panels in the fingerprint recognition phase according to the present disclosure. As shown in FIG. 34*a*, for example, the display panel may retrieve the fingerprint information by using an image scanning method. There may be 9 organic light emitting structures 11 emitting light simultaneously in one image frame (11*10 organic light emitting structures). It may take at least 12 image frames to complete the fingerprint information retrieval from the fingerprint recognition units 21 for all the organic light emitting structures 11. The time for retrieving fingerprint information from each image frame may be fixed.

In one embodiment, in order to reduce the time for retrieving fingerprint information, multiple organic light emitting structures 11 in the first light emitting dot array M122 as shown in FIG. 34*b* may form multiple shapes. The shape M123 in the multiple shapes as shown in FIG. 34*b* may have the smallest area and no right angle. Obviously, as compared to FIG. 34*a*, the distance between any two adjacent organic light emitting structures 11 in the first light emitting dot array M122 may be reduced, and more number of the organic light emitting structures 11 in one image frame may emit light simultaneously. Specifically, there may be 12 organic light emitting structures 11 that emit light simultaneously in one image frame (11*10 organic light emitting structures). Scanning at most 10 image frames may complete the fingerprint information retrieval from the fingerprint recognition units 21 for all the organic light emitting structures 11.

Multiple organic light emitting structures 11 in the first light emitting dot array M122 may form multiple shapes. In the multiple shapes, the shape M123 that has the smallest area may have no right angle. The configuration may increase the number of the simultaneously light emitting organic light emitting structures 11 while ensuring no signal crosstalk. Thus, the time required for fingerprint information retrieval may be substantially reduced.

Figure 35A:
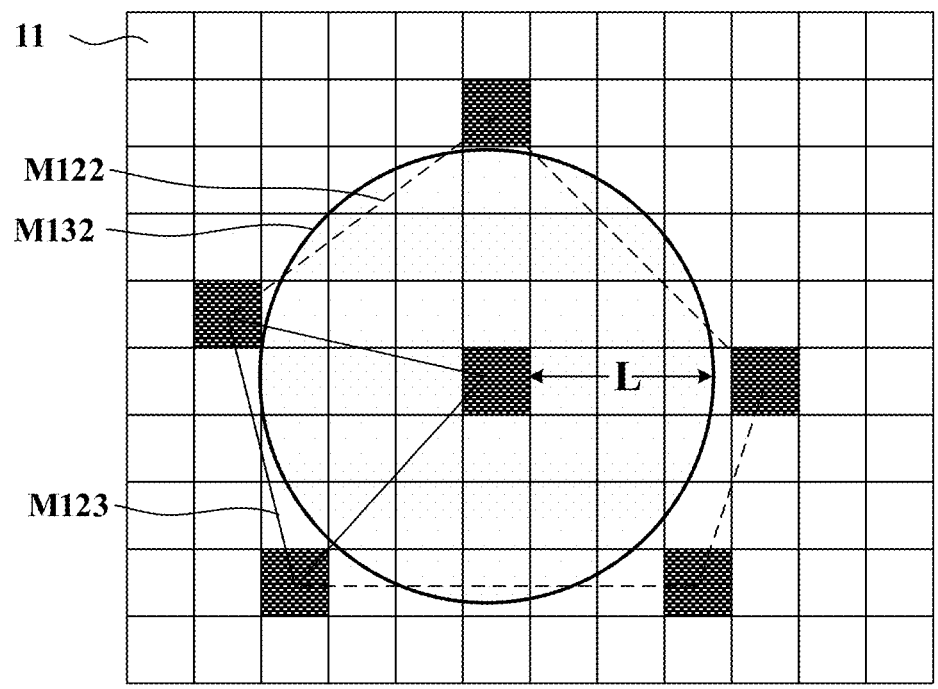
FIGS. 35a-35c illustrate schematic views of three exemplary first light emitting dot arrays according to the disclosed embodiments.
Figure 35B:
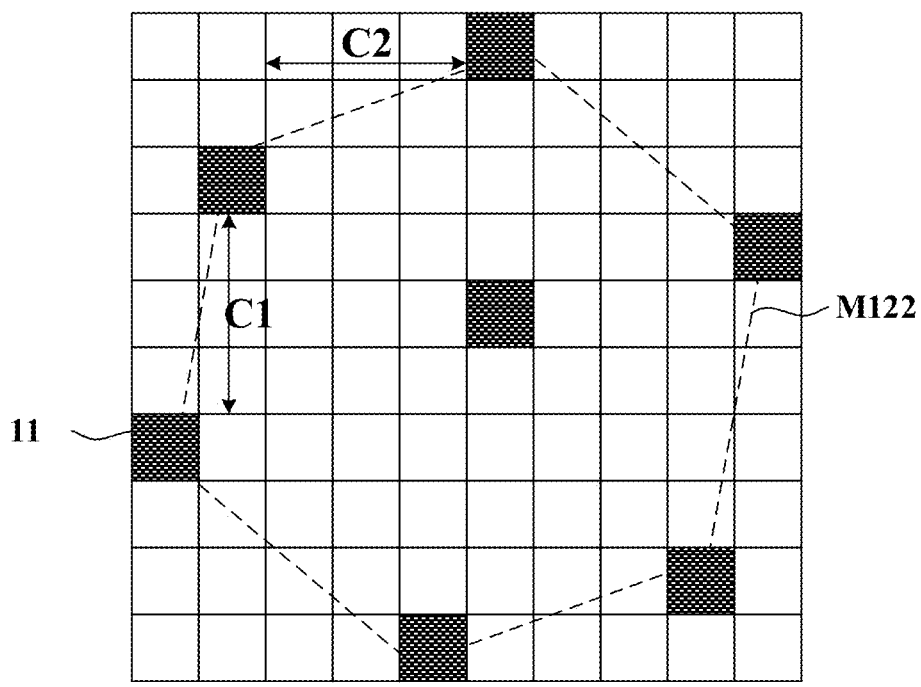
Figure 35C:
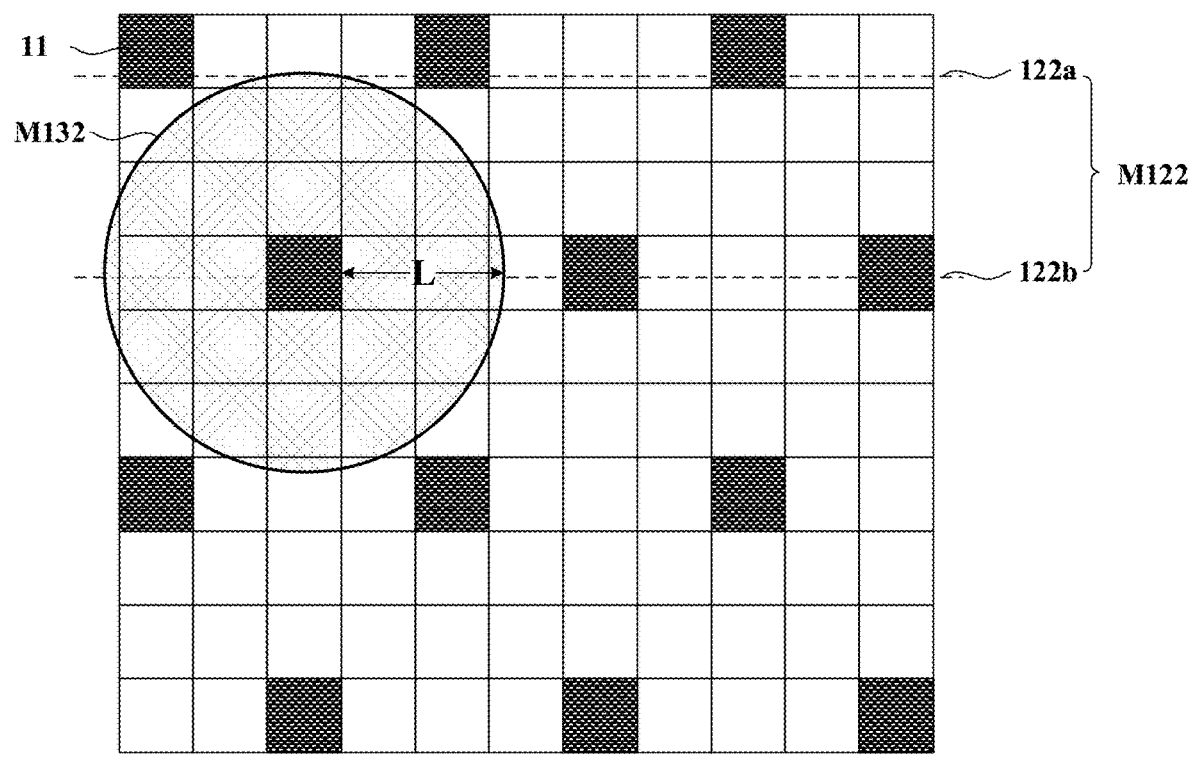

FIGS. 35*a*-35*c* illustrate schematic views of three exemplary first light emitting dot arrays according to the present disclosure. For illustrative purposes, the display panel provided by the present disclosure may include a pentagon-shaped light emitting dot array as the first light emitting dot array M122 as shown in FIG. 35*a*. The pentagon-shaped light emitting dot array may include one center organic light emitting structure 11 and five corner organic light emitting structures 11. Multiple organic light emitting structures 11 in the first light emitting dot array M122 may form multiple shapes. The shape M123 that has the smallest area in the multiple shapes may have no right angle. The pentagon-shaped light emitting dot array may increase the number of the simultaneously light emitting organic light emitting structures 11 while ensuring no signal crosstalk. Thus, the time required for fingerprint information retrieval may be reduced.

For illustrative purposes, the display panel provided by the present disclosure may include a hexagon-shaped light emitting dot array as the first light emitting dot array M122 as shown in FIG. 35*b*. The hexagon-shaped light emitting dot array may include one center organic light emitting structure 11 and six corner organic light emitting structures 11. Multiple organic light emitting structures 11 in the first light emitting dot array M122 may form multiple shapes. The shape M123 that has the smallest area in the multiple shapes may have no right angle. The hexagon-shaped light emitting dot array may increase the number of the simultaneously light emitting organic light emitting structures 11 while ensuring no signal crosstalk. Thus, the time required for fingerprint information retrieval may be reduced.

For illustrative purposes, the display panel provided by the present disclosure may include a first light emitting row 122*a* and a second light emitting row 122*b* as the first light emitting dot array M122 as shown in FIG. 35*c*. Any organic light emitting structure 11 in the first light emitting row 122*a* may not be in a same column with any organic light emitting structure 11 in the second light emitting row 122*b*. As compared to the image scanning method as shown in FIG. 34*a*, the configuration that any organic light emitting structure 11 in the first light emitting row 122*a* may not be in a same column with any organic light emitting structure 11 in the second light emitting row 122*b* may increase the number of the simultaneously light emitting organic light emitting structures 11 while ensuring no signal crosstalk. Specifically, there may be 12 organic light emitting structures 11 that emit light simultaneously in one image frame (11*10 organic light emitting structures). Scanning at most 10 image frames may complete the fingerprint information retrieval from the fingerprint recognition units 21 for all the organic light emitting structures 11. Thus, the time required for fingerprint information retrieval may be substantially reduced.

In any of the first light emitting dot arrays M122 described in the embodiments of the present disclosure, the distance J between any two adjacent organic light emitting structures 11 in the first light emitting dot array M122 may be equal to the minimum crosstalk distance L. Obviously, the fingerprint recognition units 21 corresponding to each organic light emitting structure 11 in the first light emitting dot array M122 may not receive the crosstalk signals from other simultaneously light emitting organic light emitting structures 11, and may ensure the accuracy of the fingerprint signals. At the same time, when the distance J between any two adjacent organic light emitting structures 11 in the first light emitting dot array M122 may be equal to the minimum crosstalk distance L, the number of the simultaneously light emitting organic light emitting structures 11 may be increased, the time required for the fingerprint signal retrieval may be reduced, and the efficiency of retrieving fingerprints may be improved.

In any of the first light emitting dot arrays M122 described in the embodiments of the present disclosure, for any two adjacent organic light emitting structures 11 located in different rows in the first light emitting dot array M122, a vertical distance C1 (as shown in FIG. 35b) from one organic light emitting structure 11 to a row of the other organic light emitting structure 11 may be smaller than the minimum crosstalk distance L. Further, for any two adjacent organic light emitting structures 11 located in different columns in the first light emitting dot array M122, a vertical distance C2 (as shown in FIG. 35b) from one organic light emitting structure 11 to a column of the other organic light emitting structure 11 may be smaller than the minimum crosstalk distance L.

The first light emitting dot array M122 may ensure that the fingerprint recognition units 21 corresponding to each organic light emitting structure 11 in the first light emitting dot array M122 will not receive the crosstalk signals from other simultaneously light emitting organic light emitting structures 11, and may ensure the accuracy of fingerprint recognition. At the same time, the configuration may increase the number of the simultaneously light emitting organic light emitting structures 11, reduce the time required for retrieving fingerprint signals, and improve the efficiency of retrieving fingerprints.

In order to better illustrate the fingerprint retrieval efficiency in the display panel provided by the present disclosure, a square array scanning method and a hexagon array scanning method may be used as the examples to describe the fingerprint retrieval efficiency in the display panel provided by the present disclosure. Assuming adjacent organic light emitting structures 11 must be separated by at least a distance of 20 linearly arranged organic light emitting structures 11 (distance between the centers of two organic light emitting structures) to avoid crosstalk. Specifically, the size of 20 linearly arranged organic light emitting structures 11 may be 20P (e.g., 20 pixels).

Figure 36A:
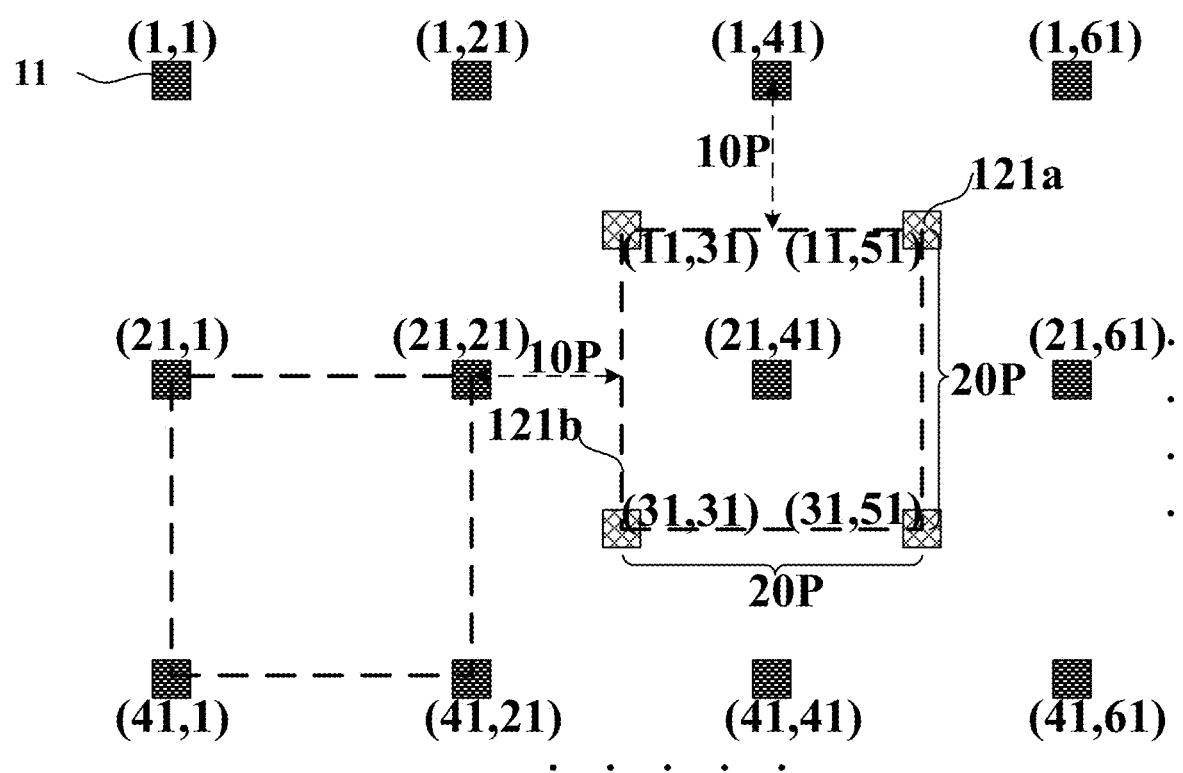
FIG. 36a illustrates a schematic view of an exemplary square array scanning method for an exemplary display panel according to the disclosed embodiments.

FIG. 36a illustrates a schematic view of an exemplary square array scanning method for an exemplary display panel according to the present disclosure. For the square array scanning method as shown in FIG. 36a, each light emitting organic light emitting structure 11 may have a coordinate (row, column), and the coordinate for the first organic light emitting structure 11 in the upper left corner may be (1,1). The first row of the light emitting organic light emitting structures 11 may have coordinates (1,1), (1,21), (1,41), . . . , the second row of the light emitting organic light emitting structures 11 may have coordinates (21,1), (21,21), (21,41), . . . , the third row of the light emitting organic light emitting structures 11 may have coordinates (41,1), (41,21), (41,41), . . . , and so on so forth, i.e., the coordinates for all the simultaneously light emitting organic light emitting structures 11 in one image frame.

Each light emitting organic light emitting structure 11 may be used as a center point to divide the organic light emitting layer including the organic light emitting structures 11 in the display panel in both horizontal and vertical directions. The organic light emitting structures 11 may be divided into a plurality of identical light emitting regions 121b. Each light emitting region 121b may have an identical size. Each light emitting region 121b may include a light emitting organic light emitting structure 11 and a plurality of dark organic light emitting structures 121a that surround the light emitting organic light emitting structure 11 and do not emit light. The light emitting organic light emitting structures 11 located at the peripheral position of the organic light emitting layer may have partial light emitting regions 121b.

For illustrative purposes, the light emitting organic light emitting structure 11 (21,41) may be at the center of a light emitting region 121b, which may also include four dark organic light emitting structures 121a. The coordinates for the four dark organic light emitting structures 121a may be (11,31), (11,51), (31,31), and (31,51). Obviously, the light emitting region 121b may have a length and a width of 20P, respectively. That is, the light emitting region 121b may have 20*20=400 number of the organic light emitting structures. The light emitting region 121b may have only one light emitting organic light emitting structure (21,41). That is, 1 in 400 organic light emitting structures may be a light emitting organic light emitting structure 11. Thus, the density of the light emitting organic light emitting structures 11 in the light emitting region 121b may be about 1/400.

The organic light emitting layer may be divided into a plurality of identical light emitting regions 121b. The density of the light emitting organic light emitting structures 11 in one image frame may be about 1/400. Therefore, 20*20=400 number of image frames may be scanned for all the organic light emitting structures 11 in the display panel to emit light once. FIG. 36a may only show some simultaneously light emitting organic light emitting structures 11 and the corresponding coordinates, and the dark organic light emitting structures 121a at the four corners of the light emitting region 121b and the corresponding coordinates.

Figure 36B:
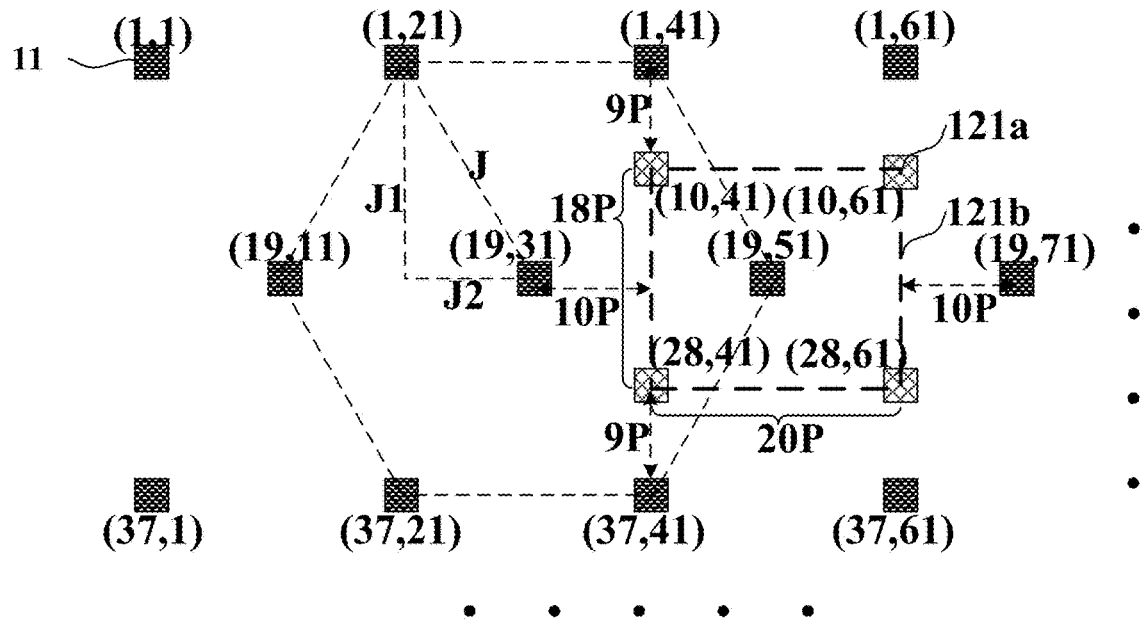
FIG. 36b illustrates a schematic view of an exemplary hexagon array scanning method for an exemplary display panel according to the disclosed embodiments.

FIG. 36b illustrates a schematic view of an exemplary hexagon array scanning method for an exemplary display panel according to the present disclosure. For the hexagon array scanning method as shown in FIG. 36b, each light emitting organic light emitting structure 11 may have a coordinate (row, column), and the coordinate for the first organic light emitting structure 11 in the upper left corner may be (1,1).

In the hexagon array, a distance J between any two adjacent light emitting organic light emitting structures 11 may be at least 20 organic light emitting structures 11 (20P). A distance J1 from a corner light emitting organic light emitting structure 11 not in the same row as the center light emitting organic light emitting structure 11 to the row where the center light emitting organic light emitting structure 11 is located may be $10P\sqrt{3} \approx 18P$. A distance J2 from a corner light emitting organic light emitting structure 11 not in the same row as the center light emitting organic light emitting structure 11 to the column where the center light emitting organic light emitting structure 11 is located may be 10P. Therefore, the coordinates for the first row of the light emitting organic light emitting structures 11 may be (1,1), (1,21), (1,41), . . . , the coordinates for the second row of the light emitting organic light emitting structures 11 may be (19,11), (19,31), (19,51), . . . , the coordinates for the third row of the light emitting organic light emitting structures 11 may be (37,1), (37,21), (37,41), . . . , and so on so forth, i.e., the coordinates for all the simultaneously light emitting organic light emitting structures 11 in one image frame.

Obviously, when the organic light emitting structures are emitting light, the distance between adjacent light emitting organic light emitting structures 11 in the same row may still be 20P, and the distance between adjacent rows where the light emitting organic light emitting structures 11 are located not in the same row may be reduced from 20P to about 18P.

In this case, a distance from a corner light emitting organic light emitting structure 11 not in the same row as the center light emitting organic light emitting structure 11 to the center light emitting organic light emitting structure 11 may be $\sqrt{(10P)^2+(18P)^2} \approx 20.59P > 20P$, and may effectively avoid crosstalk.

Each light emitting organic light emitting structure 11 may be used as a center point to divide the organic light emitting layer including the organic light emitting structures 11 in the display panel in both horizontal and vertical directions. The organic light emitting structures 11 may be divided into a plurality of identical light emitting regions 121*b*. Each light emitting region 121*b* may have an identical size. Each light emitting region 121*b* may include a light emitting organic light emitting structure 11 and a plurality of dark organic light emitting structures 121*a* that surround the light emitting organic light emitting structure 11 and do not emit light. The light emitting organic light emitting structures 11 located at the peripheral position of the organic light emitting layer may have partial light emitting regions 121*b*.

For illustrative purposes, the light emitting organic light emitting structure 11 (19,51) may be at the center of a light emitting region 121*b*, which may also include four dark organic light emitting structures 121*a*. The coordinates for the four dark organic light emitting structures 121*a* may be (10,41), (10,61), (28,41), and (28,61). Obviously, the light emitting region 121*b* may have a width of 20P in the row direction and a length of 18P in the column direction. That is, the light emitting region 121*b* may have 20*18=360 number of the organic light emitting structures. The light emitting region 121*b* may have only one light emitting organic light emitting structure (19,51). That is, 1 in 360 organic light emitting structures may be a light emitting organic light emitting structure 11. Thus, the density of the light emitting organic light emitting structures 11 in the light emitting region 121*b* may be about 1/360.

The organic light emitting layer may be divided into a plurality of identical light emitting regions 121*b*. The density of the light emitting organic light emitting structures 11 in one image frame may be about 1/360. Therefore, 20*18=360 number of image frames may be scanned for all the organic light emitting structures 11 in the display panel to emit light once. FIG. 36*b* may only show some simultaneously light emitting organic light emitting structures 11 and the corresponding coordinates, and the dark organic light emitting structures 121*a* at the four corners of the light emitting region 121*b* and the corresponding coordinates.

Obviously, the hexagon array scanning method as shown in FIG. 36*b* may be better than the square array scanning method as shown in FIG. 36*a*.

Figure 37:
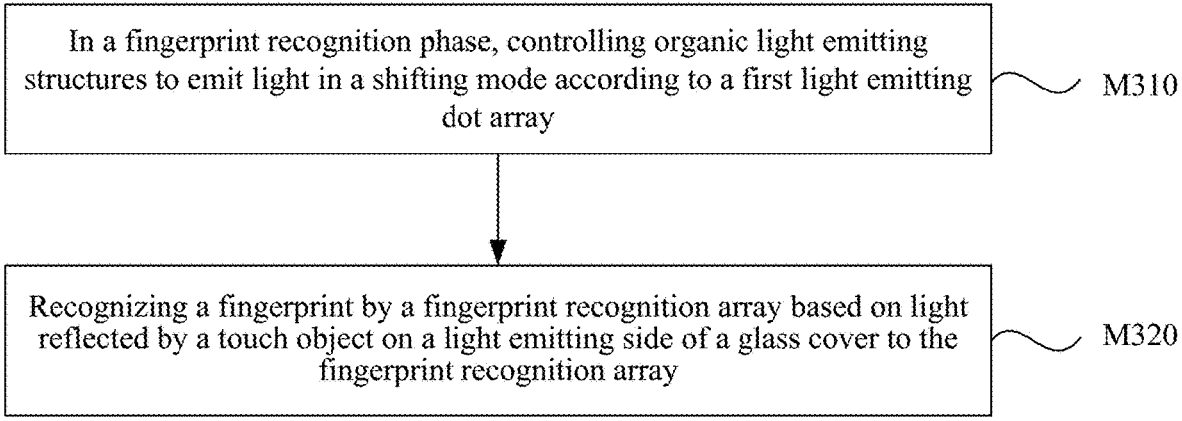
FIG. 37 illustrates a flow chart of an exemplary fingerprint recognition method for an exemplary display panel according to the disclosed embodiments.

The present disclosure also provides a fingerprint recognition method for the display panel. The display panel may be any of the display panels as shown in FIGS. 31*a*-31*d*, FIG. 33, FIGS. 34*a*-34*b*, and FIGS. 35*a*-35*c*. The display panel may include an array substrate 10, a glass cover 14, a plurality of organic light emitting structures 11 disposed on a side of the array substrate 10 facing toward the glass cover 14, and fingerprint recognition module 2. The glass cover 14 may have a first surface facing away from the array substrate 10 as the light emitting side of the display panel. FIG. 37 illustrates a flow chart of an exemplary fingerprint recognition method for an exemplary display panel according to the present disclosure. As shown in FIG. 37, the fingerprint recognition method provided by the present disclosure may include the following steps.

Step M310: in a fingerprint recognition phase, controlling organic light emitting structures to emit light in a shifting mode according to a first light emitting dot array where a distance between any two adjacent light emitting organic light emitting structures is greater than or equal to a minimum crosstalk distance, and the minimum crosstalk distance is a maximum radius of a cover region that is formed on a fingerprint recognition array when light emitted by any one of the simultaneous light emitting organic light emitting structures in the first light emitting dot array is reflected by a light emitting side of a glass cover.

Step M320: recognizing a fingerprint by a fingerprint recognition array based on light reflected by a touch object on a light emitting side of a glass cover to the fingerprint recognition array. In one embodiment, the touch object may be a finger of a user.

The display panel provided by the present disclosure may recognize fingerprints by using the image scanning method. Each organic light emitting structure in an image frame may emit light in a shifting mode according to the first light emitting dot array. Because the distance between any two adjacent light emitting organic light emitting structures is greater than or equal to the minimum crosstalk distance, the fingerprint reflected light that is formed when the light emitted from any one of the light emitting organic light emitting structures in the first light emitting dot array is reflected by the fingerprint of the finger of the user may not irradiate on any fingerprint recognition unit corresponding to other light emitting organic light emitting structures in the first light emitting dot array. Thus, the fingerprint recognition unit corresponding to each light emitting organic light emitting structure in the first light emitting dot array may receive only the fingerprint reflected light from the corresponding light emitting organic light emitting structure. That is, the fingerprint recognition unit may not receive any crosstalk signals from other light emitting structures. Accordingly, the sensed signals generated by the fingerprint recognition units may accurately represent the reflection that is formed when the light emitted from the corresponding organic light emitting structure is reflected by the fingerprint of the finger of the user. Thus, the display panel provided by the present disclosure may increase the accuracy of fingerprint recognition.

Figure 38:
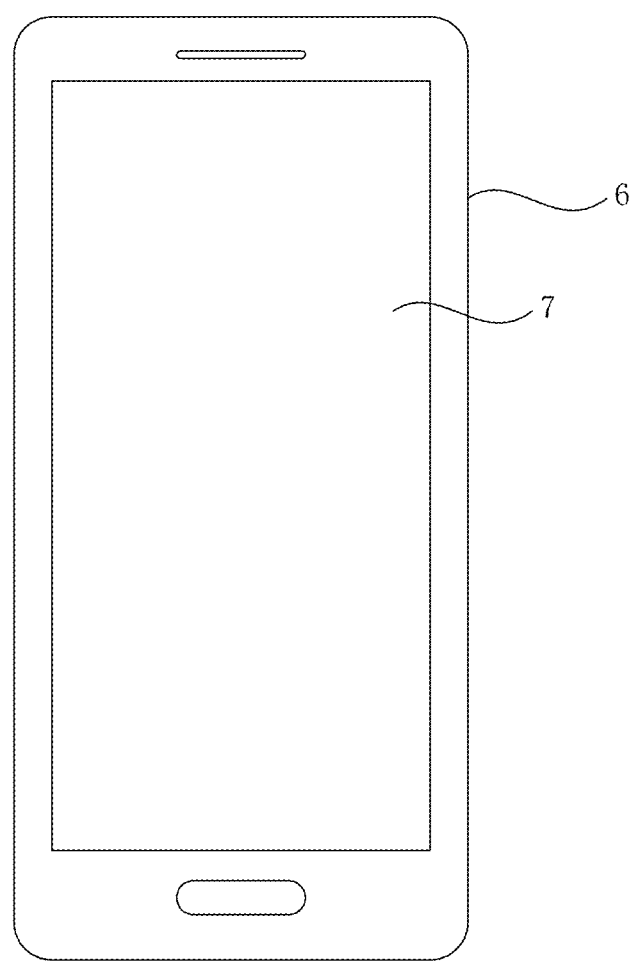
FIG. 38 illustrates a schematic view of an exemplary display apparatus according to the disclosed embodiments.

The present disclosure also provides a display apparatus. FIG. 38 illustrates a schematic view of an exemplary display apparatus according to the present disclosure. As shown in FIG. 38, the display apparatus 6 may include a display panel 7 according to the embodiments of the present disclosure. Thus, the display apparatus 6 according to the present disclosure may also have the beneficial effects as described in the embodiments of the present disclosure, and will not be repeated here. The display apparatus 6 as shown in FIG. 38 may be a smart phone, a computer, a television set, or a smart wearable device, etc. No limitation is imposed by the present disclosure.

Various embodiments have been described to illustrate the operation principles and exemplary implementations. It should be understood by those skilled in the art that the present invention is not limited to the specific embodiments described herein and that various other obvious changes, rearrangements, and substitutions will occur to those skilled in the art without departing from the scope of the invention. Thus, while the present invention has been described in detail with reference to the above described embodiments, the present invention is not limited to the above described embodiments, but may be embodied in other equivalent forms without departing from the scope of the present invention, which is determined by the appended claims.

What is claimed is:

1. A display panel, comprising:
   an array substrate;
   a plurality of light emitting units disposed on the array substrate, each having a plurality of sub-light emitting units; and
   a plurality of fingerprint recognition units, configured to recognize fingerprints based on light reflected by a touch object to the fingerprint recognition units, wherein:
      each fingerprint recognition unit is configured in coordination with at least one sub-light emitting unit;
      a shape and a size of each fingerprint recognition unit are the same as a shape and a size of a corresponding sub-light emitting structure; and
      an orthogonal projection of each fingerprint recognition unit on the array substrate has a shape with a first boundary, an orthogonal projection of the corresponding sub-light emitting structure on the array substrate has a shape with a second boundary, and the first and second boundaries are completely overlapped with each other on a top surface of the array substrate.

2. The display panel according to claim 1, wherein:
   each sub-light emitting unit includes an effective light emitting region and a first light transmittance region;
   the first light transmittance region is a light transmittance region that has a largest area in the sub-light emitting unit;
   each fingerprint recognition unit includes a photo diode with a PIN junction;
   the fingerprint recognition unit is configured to recognize a fingerprint based on light reflected by the touch object to the photo diode; and
   an orthogonal projection of the PIN junction of the photo diode in each fingerprint recognition unit on the array substrate is completely covered by an orthogonal projection of the first light transmittance region in the sub-light emitting unit corresponding to the fingerprint recognition unit on the array substrate.

3. The display panel according to claim 2, wherein:
   each sub-light emitting unit includes a plurality of second light transmittance regions;
   the second light transmittance region is a light transmittance region that has an area smaller than an area of the first light transmittance region; and
   the orthogonal projection of the photo diode on the array substrate covers an orthogonal projection of the second light transmittance region in a sub-light emitting unit corresponding to the fingerprint recognition unit on the array substrate.

4. The display panel according to claim 1, wherein:
   each fingerprint recognition unit corresponds to a light limiting unit; and
   an orthogonal projection of each fingerprint recognition unit on the array substrate and an orthogonal projection of a corresponding light emitting unit on the array substrate coincide with each other.

5. The display panel according to claim 1, wherein:
   the light emitting unit provides a light source for the fingerprint recognition unit; and
   the fingerprint recognition unit recognizes a fingerprint based on light formed when the light emitted from the light emitting unit is reflected by the touch object to the fingerprint recognition unit.

6. The display panel according to claim 1, further including a fingerprint recognition light source, wherein:
   the fingerprint recognition light source is located on a side of the array substrate facing away from the light emitting unit; and
   the fingerprint recognition unit recognizes fingerprint based on the light that is formed when the light emitted from the fingerprint recognition light source is reflected by the touch object to the fingerprint recognition unit.

7. The display panel according to claim 6, wherein:
   the fingerprint recognition light source is a collimated light source.

8. The display panel according to claim 1, further including a first substrate and an angle limiting film, wherein:
   the angle limiting film is formed between the array substrate and the first substrate, wherein the angle limiting film has a passing angle threshold which only allows incident light with an incident angle greater than the passing angle threshold to pass the angle limiting film,
   the first substrate is located on a side of the array substrate facing away from the light emitting unit; and
   the fingerprint recognition unit is located between the array substrate and the first substrate.

9. The display panel according to claim 8, further including a fingerprint recognition light source, wherein:
   the fingerprint recognition light source is located on a side of the first substrate facing away from the fingerprint recognition unit; and
   the fingerprint recognition unit recognizes fingerprint based on the light that is formed when the light emitted from the fingerprint recognition light source is reflected by the touch object to the fingerprint recognition unit.

10. The display panel according to claim 8, wherein:
    the fingerprint recognition light source is bonded to the first substrate by an optical adhesive.

11. The display panel according to claim 8, wherein:
    the first substrate is a glass substrate or a flexible substrate.

12. The display panel according to claim 1, wherein:
    the fingerprint recognition unit is located on a side of the light emitting unit facing away from the array substrate.

13. The display panel according to claim 1, wherein:
    the fingerprint recognition unit is located on a side of the light emitting unit adjacent to the array substrate.

14. The display panel according to claim 1, wherein:
    the orthogonal projection of the corresponding sub-light emitting structure is projected on the array substrate from an opposite side of the each fingerprint recognition unit.

15. A display apparatus, comprising a display panel, wherein the display panel includes:
    an array substrate;
    a plurality of light emitting units disposed on the array substrate, each having a plurality of sub-light emitting units; and
    a plurality of fingerprint recognition units, configured to recognize fingerprints based on light reflected by a touch object to the fingerprint recognition units, wherein:
       each fingerprint recognition unit is configured in coordination with at least one sub-light emitting unit;
       a shape and a size of each fingerprint recognition unit are the same as a shape and a size of a corresponding sub-light emitting structure; and
       an orthogonal projection of each fingerprint recognition unit on the array substrate has a shape with a first boundary, an orthogonal projection of a corresponding sub-light emitting structure on the array substrate has a shape with a second boundary, and the first and second boundaries are completely overlapped with each other on a top surface of the array substrate.

16. The display panel according to claim 15, wherein:
each sub-light emitting unit includes an effective light emitting region and a first light transmittance region;
the first light transmittance region is a light transmittance region that has a largest area in the sub-light emitting unit;
each fingerprint recognition unit includes a photo diode with a PIN junction;
the fingerprint recognition unit is configured to recognize a fingerprint based on light reflected by the touch object to the photo diode; and
an orthogonal projection of the PIN junction of the photo diode in each fingerprint recognition unit on the array substrate is completely covered by an orthogonal projection of the first light transmittance region in the sub-light emitting unit corresponding to the fingerprint recognition unit on the array substrate.

17. The display panel according to claim 16, wherein:
each sub-light emitting unit includes a plurality of second light transmittance regions;
the second light transmittance region is a light transmittance region that has an area smaller than an area of the first light transmittance region; and
the orthogonal projection of the photo diode on the array substrate covers an orthogonal projection of the second light transmittance region in a sub-light emitting unit corresponding to the fingerprint recognition unit on the array substrate.

18. A fingerprint recognition method for a display panel having an array substrate; a plurality of light emitting units disposed on the array substrate, each having a plurality of sub-light emitting units; and a plurality of fingerprint recognition units, configured to recognize fingerprints based on light reflected by a touch object to the fingerprint recognition units, wherein each fingerprint recognition unit is configured in coordination with at least one sub-light emitting unit; and an orthogonal projection of each fingerprint recognition unit on the array substrate has a shape with a first boundary, an orthogonal projection of a corresponding sub-light emitting structure on the array substrate has a shape with a second boundary, and the first and second boundaries are completely overlapped with each other on a top surface of the array substrate, the method comprising:
in a fingerprint recognition phase, controlling organic light emitting structures to emit light in a shifting mode according to a first light emitting dot array; and
recognizing a fingerprint by a fingerprint recognition array based on light reflected by a touch object on a light emitting side of a glass cover to the fingerprint recognition array.

19. The fingerprint recognition method according to claim 18, wherein:
each sub-light emitting unit includes an effective light emitting region and a first light transmittance region;
the first light transmittance region is a light transmittance region that has a largest area in the sub-light emitting unit;
each fingerprint recognition unit includes a photo diode;
the fingerprint recognition unit is configured to recognize a fingerprint based on light reflected by the touch object to the photo diode; and
an orthogonal projection of the photo diode in each fingerprint recognition unit on the array substrate is completely covered by an orthogonal projection of the first light transmittance region in the sub-light emitting unit corresponding to the fingerprint recognition unit on the array substrate.

20. The fingerprint recognition method according to claim 19, wherein:
each sub-light emitting unit includes a plurality of second light transmittance regions;
the second light transmittance region is a light transmittance region that has an area smaller than an area of the first light transmittance region; and
the orthogonal projection of the photo diode on the array substrate covers an orthogonal projection of the second light transmittance region in a sub-light emitting unit corresponding to the fingerprint recognition unit on the array substrate.

* * * * *